United States Patent
Nguyen et al.

(10) Patent No.: US 12,031,332 B2
(45) Date of Patent: Jul. 9, 2024

(54) ROOFING MATERIALS AND RELATED METHODS

(71) Applicant: GAF Energy LLC, Parsippany, NJ (US)

(72) Inventors: Thierry Nguyen, San Francisco, CA (US); William Sirski, San Jose, CA (US)

(73) Assignee: GAF Energy LLC, Parsippany, NJ (US)

(*) Notice: Subject to any disclaimer, the term of this patent is extended or adjusted under 35 U.S.C. 154(b) by 0 days.

(21) Appl. No.: 18/489,458

(22) Filed: Oct. 18, 2023

(65) Prior Publication Data

US 2024/0133180 A1    Apr. 25, 2024

Related U.S. Application Data

(60) Provisional application No. 63/419,185, filed on Oct. 25, 2022.

(51) Int. Cl.
| | | |
|---|---|---|
| *E04D 1/00* | (2006.01) | |
| *B32B 3/26* | (2006.01) | |
| *B32B 7/12* | (2006.01) | |
| *B32B 27/08* | (2006.01) | |
| *E04D 1/28* | (2006.01) | |

(52) U.S. Cl.
CPC .............. *E04D 1/28* (2013.01); *B32B 3/266* (2013.01); *B32B 7/12* (2013.01); *B32B 27/08* (2013.01); *B32B 2307/402* (2013.01); *B32B 2419/06* (2013.01)

(58) Field of Classification Search
CPC ........ E04D 1/28; B32B 3/266; B32B 2419/06
See application file for complete search history.

(56) References Cited

U.S. PATENT DOCUMENTS

| | | |
|---|---|---|
| 1,981,467 A | 11/1934 | Radtke |
| 3,156,497 A | 11/1964 | Lessard |

(Continued)

FOREIGN PATENT DOCUMENTS

| | | |
|---|---|---|
| CA | 2829440 A | 5/2019 |
| CH | 700095 A2 | 6/2010 |

(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Basil S Katcheves
(74) *Attorney, Agent, or Firm* — GREENBERG TRAURIG, LLP

(57) ABSTRACT

Roofing materials and related methods are provided. A roofing material comprises a first layer, and a second layer on the first layer. The first layer comprises a first thermoplastic polymer. The first layer has a first color. The second layer comprises a second thermoplastic polymer. The second layer has a second color. The second layer comprises a plurality of openings or a plurality of thermoplastic polymer pieces. The first layer is exposed through the second layer.

20 Claims, 7 Drawing Sheets

(56) References Cited

U.S. PATENT DOCUMENTS

| | | | |
|---|---|---|---|
| 3,436,878 A * | 4/1969 | Singer | E04D 13/076 52/95 |
| 3,581,779 A | 6/1971 | Gilbert, Jr. | |
| 4,258,948 A | 3/1981 | Hoffmann | |
| 4,349,220 A | 9/1982 | Carroll et al. | |
| 4,499,702 A | 2/1985 | Turner | |
| 4,636,577 A | 1/1987 | Peterpaul | |
| 4,668,315 A * | 5/1987 | Brady | E04D 11/02 156/304.6 |
| 5,167,579 A | 12/1992 | Rotter | |
| 5,305,570 A * | 4/1994 | Rodriguez | E04D 1/2916 52/520 |
| 5,437,735 A | 8/1995 | Younan et al. | |
| 5,590,495 A | 1/1997 | Bressler et al. | |
| 5,592,783 A * | 1/1997 | Jones | E04D 13/076 52/12 |
| 5,642,596 A | 7/1997 | Waddington | |
| 5,671,577 A * | 9/1997 | Todd | E04D 1/12 52/302.1 |
| 6,008,450 A | 12/1999 | Ohtsuka et al. | |
| 6,033,270 A | 3/2000 | Stuart | |
| 6,046,399 A | 4/2000 | Kapner | |
| 6,161,354 A * | 12/2000 | Gilbert | B29C 51/24 52/543 |
| 6,201,180 B1 | 3/2001 | Meyer et al. | |
| 6,202,357 B1 * | 3/2001 | Spradlin | E04D 13/076 52/12 |
| 6,220,329 B1 | 4/2001 | King et al. | |
| 6,308,482 B1 | 10/2001 | Strait | |
| 6,320,114 B1 | 11/2001 | Kuechler | |
| 6,320,115 B1 | 11/2001 | Kataoka et al. | |
| 6,336,304 B1 | 1/2002 | Mimura et al. | |
| 6,341,454 B1 | 1/2002 | Koleoglou | |
| 6,349,506 B1 * | 2/2002 | Pace | E04D 13/076 52/12 |
| 6,407,329 B1 | 6/2002 | Iino et al. | |
| 6,576,830 B2 | 6/2003 | Nagao et al. | |
| 6,928,781 B2 | 8/2005 | Desbois et al. | |
| 6,972,367 B2 | 12/2005 | Federspiel et al. | |
| 7,138,578 B2 | 11/2006 | Komamine | |
| 7,155,870 B2 | 1/2007 | Almy | |
| 7,178,295 B2 | 2/2007 | Dinwoodie | |
| 7,303,687 B2 * | 12/2007 | Groth | E04D 13/076 52/12 |
| 7,487,771 B1 | 2/2009 | Eiffert et al. | |
| 7,587,864 B2 | 9/2009 | McCaskill et al. | |
| 7,678,990 B2 | 3/2010 | McCaskill et al. | |
| 7,678,991 B2 | 3/2010 | McCaskill et al. | |
| 7,748,191 B2 | 7/2010 | Podirsky | |
| 7,819,114 B2 | 10/2010 | Augenbraun et al. | |
| 7,824,191 B1 | 11/2010 | Podirsky | |
| 7,832,176 B2 | 11/2010 | McCaskill et al. | |
| 7,882,671 B2 | 2/2011 | Douglas et al. | |
| 8,118,109 B1 | 2/2012 | Hacker | |
| 8,168,880 B2 | 5/2012 | Jacobs et al. | |
| 8,173,889 B2 | 5/2012 | Kalkanoglu et al. | |
| 8,182,906 B2 | 5/2012 | Smith | |
| 8,210,570 B1 | 7/2012 | Railkar et al. | |
| 8,276,329 B2 | 10/2012 | Lenox | |
| 8,312,693 B2 | 11/2012 | Cappelli | |
| 8,319,093 B2 | 11/2012 | Kalkanoglu et al. | |
| 8,333,040 B2 | 12/2012 | Shiao et al. | |
| 8,371,076 B2 | 2/2013 | Jones et al. | |
| 8,375,653 B2 | 2/2013 | Shiao et al. | |
| 8,404,967 B2 | 3/2013 | Kalkanoglu et al. | |
| 8,410,349 B2 | 4/2013 | Kalkanoglu et al. | |
| 8,418,415 B2 * | 4/2013 | Shiao | H02S 20/25 52/173.3 |
| 8,438,796 B2 | 5/2013 | Shiao et al. | |
| 8,468,754 B2 | 6/2013 | Railkar et al. | |
| 8,468,757 B2 | 6/2013 | Krause et al. | |
| 8,505,249 B2 | 8/2013 | Geary | |
| 8,512,866 B2 | 8/2013 | Taylor | |
| 8,513,517 B2 | 8/2013 | Kalkanoglu et al. | |
| 8,586,856 B2 | 11/2013 | Kalkanoglu et al. | |
| 8,595,985 B1 * | 12/2013 | Feldhaus | E04D 13/076 52/12 |
| 8,601,754 B2 | 12/2013 | Jenkins et al. | |
| 8,617,695 B2 | 12/2013 | Willham | |
| 8,629,578 B2 | 1/2014 | Kurs et al. | |
| 8,646,228 B2 | 2/2014 | Jenkins | |
| 8,656,657 B2 | 2/2014 | Livsey et al. | |
| 8,671,630 B2 | 3/2014 | Lena et al. | |
| 8,677,702 B2 | 3/2014 | Jenkins | |
| 8,695,289 B2 | 4/2014 | Koch et al. | |
| 8,713,858 B1 | 5/2014 | Xie | |
| 8,713,860 B2 | 5/2014 | Railkar et al. | |
| 8,733,038 B2 | 5/2014 | Kalkanoglu et al. | |
| 8,776,455 B2 | 7/2014 | Azoulay | |
| 8,789,321 B2 | 7/2014 | Ishida | |
| 8,793,940 B2 | 8/2014 | Kalkanoglu et al. | |
| 8,793,941 B2 | 8/2014 | Bosler et al. | |
| 8,826,607 B2 | 9/2014 | Shiao et al. | |
| 8,835,751 B2 | 9/2014 | Kalkanoglu et al. | |
| 8,844,208 B1 * | 9/2014 | Feldhaus | E04D 13/076 52/12 |
| 8,863,451 B2 | 10/2014 | Jenkins et al. | |
| 8,898,970 B2 | 12/2014 | Jenkins et al. | |
| 8,925,262 B2 | 1/2015 | Railkar et al. | |
| 8,943,766 B2 | 2/2015 | Gombarick et al. | |
| 8,946,544 B2 | 2/2015 | Jabos et al. | |
| 8,950,128 B2 | 2/2015 | Kalkanoglu et al. | |
| 8,959,848 B2 | 2/2015 | Jenkins et al. | |
| 8,966,838 B2 | 3/2015 | Jenkins | |
| 8,966,850 B2 | 3/2015 | Jenkins et al. | |
| 8,994,224 B2 | 3/2015 | Mehta et al. | |
| 9,010,030 B2 * | 4/2015 | Davis | E04D 13/076 52/12 |
| 9,032,672 B2 | 5/2015 | Livsey et al. | |
| 9,153,950 B2 | 10/2015 | Yamanaka et al. | |
| 9,166,087 B2 | 10/2015 | Chihlas et al. | |
| 9,169,646 B2 | 10/2015 | Rodrigues et al. | |
| 9,170,034 B2 | 10/2015 | Bosler et al. | |
| 9,178,465 B2 | 11/2015 | Shiao et al. | |
| 9,202,955 B2 | 12/2015 | Livsey et al. | |
| 9,212,832 B2 | 12/2015 | Jenkins | |
| 9,217,584 B2 | 12/2015 | Kalkanoglu et al. | |
| 9,270,221 B2 | 2/2016 | Zhao | |
| 9,273,885 B2 | 3/2016 | Rordigues et al. | |
| 9,276,141 B2 | 3/2016 | Kalkanoglu et al. | |
| 9,331,224 B2 | 5/2016 | Koch et al. | |
| 9,356,174 B2 | 5/2016 | Duarte et al. | |
| 9,359,014 B1 | 6/2016 | Yang et al. | |
| 9,412,890 B1 | 8/2016 | Meyers | |
| 9,528,270 B2 | 12/2016 | Jenkins et al. | |
| 9,605,432 B1 | 3/2017 | Robbins | |
| 9,711,672 B2 | 7/2017 | Wang | |
| 9,755,573 B2 | 9/2017 | Livsey et al. | |
| 9,786,802 B2 | 10/2017 | Shiao et al. | |
| 9,831,818 B2 | 11/2017 | West | |
| 9,912,284 B2 | 3/2018 | Svec | |
| 9,923,515 B2 | 3/2018 | Rodrigues et al. | |
| 9,938,729 B2 | 4/2018 | Coon | |
| 9,991,412 B2 | 6/2018 | Gonzalez et al. | |
| 9,998,067 B2 | 6/2018 | Kalkanoglu et al. | |
| D822,801 S * | 7/2018 | Karabacak | D23/267 |
| 10,027,273 B2 | 7/2018 | West et al. | |
| 10,115,850 B2 | 10/2018 | Rodrigues et al. | |
| 10,128,660 B1 | 11/2018 | Apte et al. | |
| 10,156,075 B1 | 12/2018 | McDonough | |
| 10,187,005 B2 | 1/2019 | Rodrigues et al. | |
| 10,256,765 B2 | 4/2019 | Rodrigues et al. | |
| 10,284,136 B1 | 5/2019 | Mayfield et al. | |
| 10,454,408 B2 | 10/2019 | Livsey et al. | |
| 10,530,292 B1 | 1/2020 | Cropper et al. | |
| 10,560,048 B2 | 2/2020 | Fisher et al. | |
| 10,563,406 B2 | 2/2020 | Kalkanoglu et al. | |
| D879,031 S | 3/2020 | Lance et al. | |
| 10,579,028 B1 | 3/2020 | Jacob | |
| 10,784,813 B2 | 9/2020 | Kalkanoglu et al. | |
| D904,289 S | 12/2020 | Lance et al. | |
| 11,012,026 B2 | 5/2021 | Kalkanoglu et al. | |
| 11,177,639 B1 | 11/2021 | Nguyen et al. | |

(56) References Cited

U.S. PATENT DOCUMENTS

| | | |
|---|---|---|
| 11,217,715 B2 | 1/2022 | Sharenko |
| 11,251,744 B1 | 2/2022 | Bunea et al. |
| 11,258,399 B2 | 2/2022 | Kalkanoglu et al. |
| 11,283,394 B2 | 3/2022 | Perkins et al. |
| 11,309,828 B2 | 4/2022 | Sirski et al. |
| 11,394,344 B2 | 7/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |
| 11,459,757 B2 | 10/2022 | Nguyen et al. |
| 11,486,144 B2 | 11/2022 | Bunea et al. |
| 11,489,482 B2 | 11/2022 | Peterson et al. |
| 11,496,088 B2 | 11/2022 | Sirski et al. |
| 11,508,861 B1 | 11/2022 | Perkins et al. |
| 11,512,480 B1 | 11/2022 | Achor et al. |
| 11,527,665 B2 | 12/2022 | Boitnott |
| 11,545,927 B2 | 1/2023 | Abra et al. |
| 11,545,928 B2 | 1/2023 | Perkins et al. |
| 11,658,470 B2 | 5/2023 | Nguyen et al. |
| 11,661,745 B2 | 5/2023 | Bunea et al. |
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0053360 A1 | 5/2002 | Kinoshita et al. |
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |
| 2004/0000334 A1 | 1/2004 | Ressler |
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1* | 9/2005 | Rodrigues ............. B32B 5/26 52/518 |
| 2005/0284070 A1* | 12/2005 | Binkley ............. B29C 65/56 52/543 |
| 2006/0026908 A1* | 2/2006 | Gregori ............. E04D 1/20 52/518 |
| 2006/0042683 A1 | 3/2006 | Gangemi |
| 2006/0046084 A1 | 3/2006 | Yang et al. |
| 2006/0105663 A1 | 5/2006 | Greulich et al. |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0264468 A1 | 11/2007 | Boyd et al. |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0315061 A1 | 2/2008 | Placer et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1 | 12/2010 | DeGenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0197504 A1* | 8/2011 | Hellwig ............. B32B 5/26 47/64 |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266553 A1 | 10/2012 | Shiao et al. |
| 2012/0266942 A1 | 10/2012 | Komatsu et al. |
| 2012/0279150 A1 | 11/2012 | Pislkak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0219818 A1* | 8/2013 | Cahill ............. E04F 13/0864 52/542 |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1* | 7/2014 | Beerer ............. E04D 1/28 156/60 |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0340516 A1 | 11/2015 | Kim et al. |
| 2015/0349173 A1 | 12/2015 | Morad et al. |
| 2016/0083962 A1 | 3/2016 | Hong et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0237390 A1 | 8/2017 | Hudson et al. |
| 2017/0331415 A1 | 11/2017 | Koppi et al. |

(56) References Cited

U.S. PATENT DOCUMENTS

| | | |
|---|---|---|
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0011060 A1* | 1/2020 | Haynes ................. E04D 1/20 |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0083619 A1 | 3/2021 | Hegedus |
| 2021/0115223 A1 | 4/2021 | Bonekamp et al. |
| 2021/0159353 A1 | 5/2021 | Li et al. |
| 2021/0301536 A1 | 9/2021 | Baggs et al. |
| 2021/0343886 A1 | 11/2021 | Sharenko et al. |
| 2022/0055263 A1 | 2/2022 | Meree et al. |
| 2022/0149213 A1 | 5/2022 | Mensink et al. |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| EP | 3772175 A1 | 2/2021 |
| JP | 10046767 A | 2/1998 |
| JP | 2002-106151 A | 4/2002 |
| JP | 2001-098703 A | 10/2002 |
| JP | 2009-062674 A | 3/2009 |
| JP | 2017-027735 A | 2/2017 |
| JP | 2018053707 A | 4/2018 |
| KR | 20090084060 A | 8/2009 |
| KR | 10-1348283 B1 | 1/2014 |
| KR | 10-2019-0000367 A | 1/2019 |
| KR | 10-2253483 B1 | 5/2021 |
| NL | 2026856 81 | 6/2022 |
| WO | 2010/151777 A2 | 12/2010 |
| WO | 2011/049944 A1 | 4/2011 |
| WO | 2015/133632 A1 | 9/2015 |
| WO | 2018/000589 A1 | 1/2018 |
| WO | 2019/201416 A1 | 10/2019 |
| WO | 2020-159358 A1 | 8/2020 |
| WO | 2021-247098 A1 | 12/2021 |

OTHER PUBLICATIONS

RGS Energy, 3.5kW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-US/roofing/tools/how-roofing-underlayment-helps-protect-your-home>> retrieved Nov. 1, 2021.

"F-Wave—REVIA Designer Slate Synthetic Shingles" brochure, 2023.

* cited by examiner

ROOFING MATERIALS AND RELATED METHODS

CROSS-REFERENCE TO RELATED APPLICATIONS

The present application claims priority to and benefit of U.S. Provisional Patent Application No. 63/419,185, filed Oct. 25, 2022 and entitled, "ROOFING MATERIALS AND RELATED METHODS," the entirety of which is herein incorporated by reference.

FIELD

This disclosure generally relates to roofing materials and related methods.

BACKGROUND

Roofing materials are exposed to various environmental conditions that cause the roofing materials to degrade over time including fading of color.

SUMMARY

Some embodiments relate to a roofing system. In some embodiments, the roofing system comprises a roofing substrate. In some embodiments, the roofing system comprises a roofing shingle. In some embodiments, the roofing shingle is located on the roofing substrate. In some embodiments, the roofing shingle comprises a first layer. In some embodiments, the first layer comprises a first thermoplastic polymer. In some embodiments, the roofing shingle comprises a second layer on the first layer. In some embodiments, the second layer comprises a second thermoplastic polymer. In some embodiments, a plurality of openings is formed in the second layer. In some embodiments, each of the plurality of openings extends through the second layer, from a first surface of the second layer to a second surface of the second layer. In some embodiments, the second surface of the second layer is opposite the first surface of the second layer. In some embodiments, the second surface of the second layer is an upper surface of the second layer. In some embodiments, at least a portion of an upper surface of the first layer is exposed through the plurality of openings of the second layer.

In some embodiments, the second layer directly contacts the first layer.

In some embodiments, the second layer is attached to the first layer by thermal bonding.

In some embodiments, the second layer is attached to the first layer by an adhesive layer.

In some embodiments, the adhesive layer is not exposed through the plurality of openings of the second layer.

In some embodiments, 10% to 90% of the upper surface of the first layer is exposed through the plurality of openings of the second layer.

In some embodiments, the roofing system further comprises a third layer. In some embodiments, the third layer is located on the second layer. In some embodiments, the third layer comprises a third thermoplastic polymer. In some embodiments, the third layer comprises a plurality of thermoplastic polymer pieces. In some embodiments, the plurality of thermoplastic polymer pieces of the third layer covers the first layer and the second layer such that at least a portion of the upper surface of the first layer and at least a portion of the upper surface of the second layer are exposed.

In some embodiments, the third layer directly contacts the second layer.

In some embodiments, the third layer is attached to the second layer by thermal bonding.

In some embodiments, the third layer is attached to the second layer by an adhesive layer.

In some embodiments, 10% to 90% of the upper surface of the first layer is exposed through the third layer.

In some embodiments, 10% to 90% of the upper surface of the second layer is exposed through the third layer.

In some embodiments, the first layer has a first color. In some embodiments, the second layer has a second color. In some embodiments, the first color and the second color are different. In some embodiments, an aesthetic appearance of the roofing shingle is substantially similar to an aesthetic appearance of an asphalt roofing shingle.

Some embodiments relate to a roofing shingle. In some embodiments, the roofing shingle comprises a first layer. In some embodiments, the first layer comprises a first thermoplastic polymer. In some embodiments, the roofing shingle comprises a second layer. In some embodiments, the second layer is located on the first layer. In some embodiments, the second layer comprises a second thermoplastic polymer. In some embodiments, a plurality of openings is formed in the second layer. In some embodiments, each of the plurality of openings extends through the second layer, from a first surface of the second layer to a second surface of the second layer. In some embodiments, the second surface of the second layer is opposite the first surface of the second layer. In some embodiments, the second surface of the second layer is an upper surface of the second layer. In some embodiments, at least a portion of an upper surface of the first layer is exposed through the plurality of openings of the second layer.

In some embodiments, the second layer directly contacts the first layer.

In some embodiments, the second layer is attached to the first layer by thermal bonding.

In some embodiments, the second layer is attached to the first layer by an adhesive layer.

In some embodiments, the adhesive layer is not exposed through the plurality of openings of the second layer.

In some embodiments, 10% to 90% of the upper surface of the first layer is exposed through the plurality of openings of the second layer.

In some embodiments, the first layer has a first color. In some embodiments, the second layer has a second color. In some embodiments, the first color and the second color are different. In some embodiments, an aesthetic appearance of the roofing shingle is substantially similar to an aesthetic appearance of an asphalt roofing shingle.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
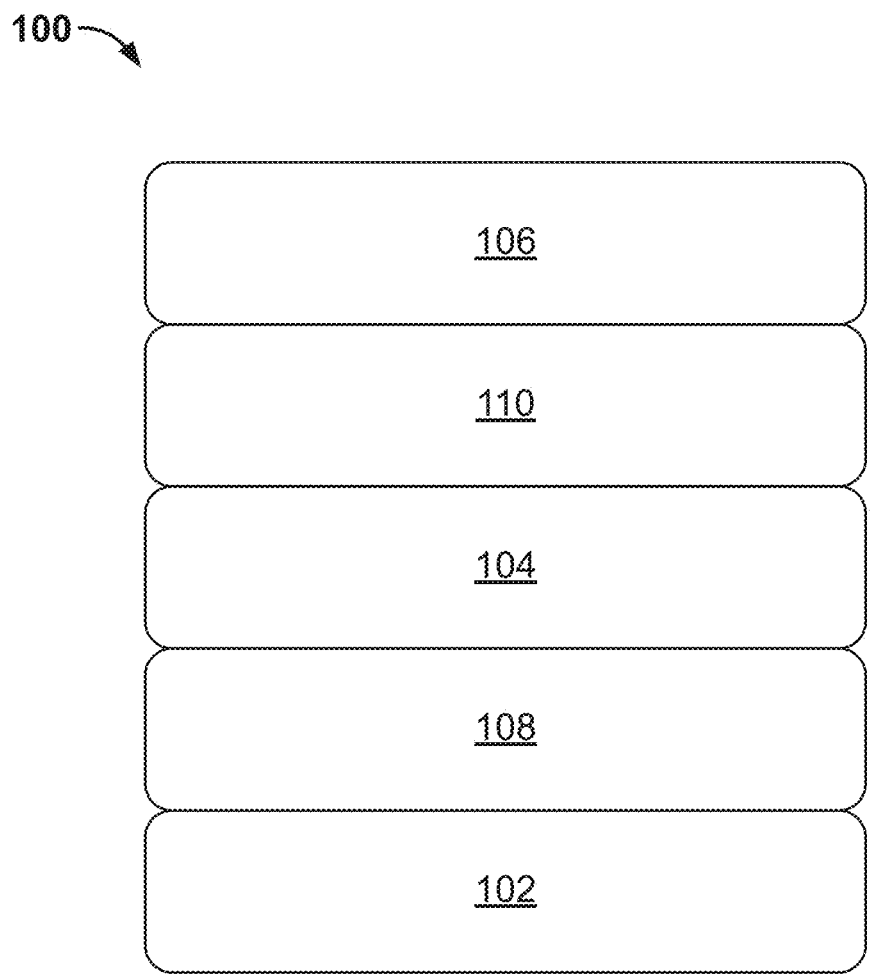
FIG. 1 is a schematic diagram of a cross-section of a roofing material, according to some embodiments.

Some embodiments relate to roofing materials and related systems and related methods. In some embodiments, layers having different colors, different shapes, different shaped openings, or combinations thereof, are overlayed on each other, so as to obtain the roofing material. In some embodiments, the roofing material has a desired color pattern. In some embodiments, an aesthetic appearance of the roofing material is substantially similar to an aesthetic appearance of a photovoltaic module. In some embodiments, an aesthetic appearance of the roofing material is substantially similar to an aesthetic appearance of a roofing shingle. In some embodiments, an aesthetic appearance of the roofing material is substantially similar to an aesthetic appearance of a strip shingle. In some embodiments, an aesthetic appearance of the roofing material is substantially similar to an aesthetic appearance of a laminated shingle.

As used herein, the term "substantially similar aesthetic appearance" refers to materials having a similar overall appearance, texture, gloss, and/or color. In some embodiments, the roofing material includes an appearance, texture, gloss, and/or color that is similar to those of the photovoltaic module or the roofing shingle. In some embodiments, the color is measured under a CIELAB color space system. In some embodiments, the gloss can be quantified in accordance with the ASTM E430 Standard Test Methods for Measurement of Gloss of High-Gloss Surfaces by Abridged Goniophotometry. In an embodiment, the appearance of each of the roofing material, and the photovoltaic module or the roofing shingle, are visually perceptible by and subjective to a human.

In some embodiments, the roofing material comprises a first layer.

In some embodiments, the first layer comprises at least one polymer. In some embodiments, the at least one polymer comprises at least one thermoplastic polymer. In some embodiments, the at least one polymer comprises at least one thermoplastic polyolefin (TPO). In some embodiments, the at least one polymer comprises at least one of polyethylene, polypropylene, any copolymer thereof, any homopolymer thereof, any polymer blend thereof, or any combination thereof. In some embodiments, the thermoplastic polyolefin comprises at least one of a copolymer of propylene and ethylene, a blend of propylene and ethylene, a copolymer of ethylene alpha-olefin, a propylene homopolymer, an ethylene homopolymer, a propylene block copolymer, an ethylene block copolymer, a propylene elastomer, an ethylene elastomer, or any combination thereof. In some embodiments, the thermoplastic polymer comprises at least one of a copolymer comprising ethylene and octene, a copolymer comprising ethylene and hexane, a copolymer comprising ethylene and butene, polyethylene (including raw and/or recycled low density polyethylene (LDPE)), linear low density polyethylene (LLDPE), high density polyethylene (HDPE)), polypropylenes (e.g., isotactic polypropylene (IPP) and/or atactic polypropylene (APP/IPP)), amorphous polyalpha olefins (APAO), amorphous polyolefins (APO), or any combination thereof. In some embodiments, the at least one polymer comprises polyethylene terephthalate (PET). In some embodiments, the at least one polymer comprises an acrylic polymer, such as, for example, polymethyl methacrylate. In some embodiments, the at least one polymer comprises ethylene tetrafluoroethylene (ETFE).

Examples of the at least one polymer include, for example and without limitation, at least one of Vistamaxx® 6102, Vistamaxx® 8880, both of which are polypropylenes (e.g., isotactic polypropylene (IPP)) that are available from ExxonMobil, Irving, Tex.; Elvalay®, which is a terpolymer that is available from Dow/DuPont, Wilmington, Del.; Fusabond®, which is a chemically modified ethylene acrylate copolymer and/or a modified polyethylene, that is available from Dow/DuPont, Wilmington, Del.; RT2304, which is an amorphous polyalpha olefin (APAO) that is available from Rextac APAO Polymers LLC, Odessa, Tex.; Eastoflex® P1023, which is an amorphous polyolefin (APO) that comprises a propylene homopolymer, and is available from Eastman Chemical Company, Kingsport, Tenn.; Eastoflex® E1060, which is an amorphous polyolefin (APO) that comprises a copolymer of propylene and ethylene, and is available from Eastman Chemical Company, Kingsport, Tenn.; Eastoflex® M1025, which is an amorphous polyolefin (APO) that comprises a blend of propylene homopolymer and copolymers of propylene and ethylene, and is available from Eastman Chemical Company, Kingsport, Tenn.; Engage® 7487, which is a polyolefin elastomer (POE) that is available from Dow Inc., Midland, Mich., or any combination thereof.

In some embodiments, the first layer comprises 10% to 90% by weight of the at least one polymer based on a total weight of the first layer. In some embodiments, the first layer comprises 10% to 85% by weight of the at least one polymer based on the total weight of the first layer. In some embodiments, the first layer comprises 10% to 80% by weight of the at least one polymer based on the total weight of the first layer. In some embodiments, the first layer comprises 10% to 75% by weight of the at least one polymer based on the total weight of the first layer. In some embodiments, the first layer comprises 10% to 70% by weight of the at least one polymer based on the total weight of the first layer. In some embodiments, the first layer comprises 10% to 65% by weight of the at least one polymer based on the total weight of the first layer. In some embodiments, the first layer comprises 10% to 60% by weight of the at least one polymer based on the total weight of the first layer. In some embodiments, the first layer comprises 10% to 55% by weight of the at least one polymer based on the total weight of the first layer. In some embodiments, the first layer comprises 10% to 50% by weight of the at least one polymer based on the total weight of the first layer. In some embodiments, the first layer comprises 10% to 45% by weight of the at least one polymer based on the total weight of the first layer. In some embodiments, the first layer comprises 10% to 40% by weight of the at least one polymer based on the total weight of the first layer. In some embodiments, the first layer comprises 10% to 35% by weight of the at least one polymer based on the total weight of the first layer. In some embodiments, the first layer comprises 10% to 30% by weight of the at least one polymer based on the total weight of the first layer. In some embodiments, the first layer comprises 10% to 25% by weight of the at least one polymer based on the total weight of the first layer. In some embodiments, the first layer comprises 10% to 20% by weight of the at least one polymer based on the total weight of the first layer. In some embodiments, the first layer comprises 10% to 15% by weight of the at least one polymer based on the total weight of the first layer.

In some embodiments, the first layer comprises 15% to 90% by weight of the at least one polymer based on the total weight of the first layer. In some embodiments, the first layer comprises 20% to 90% by weight of the at least one polymer based on the total weight of the first layer. In some embodiments, the first layer comprises 25% to 90% by weight of the at least one polymer based on the total weight of the first layer. In some embodiments, the first layer comprises 30% to 90% by weight of the at least one polymer based on the total weight of the first layer. In some embodiments, the first layer comprises 35% to 90% by weight of the at least one polymer based on the total weight of the first layer. In some embodiments, the first layer comprises 40% to 90% by weight of the at least one polymer based on the total weight of the first layer. In some embodiments, the first layer comprises 45% to 90% by weight of the at least one polymer based on the total weight of the first layer. In some embodiments, the first layer comprises 50% to 90% by weight of the at least one polymer based on the total weight of the first layer. In some embodiments, the first layer comprises 55% to 90% by weight of the at least one polymer based on the total weight of the first layer. In some embodiments, the first layer comprises 60% to 90% by weight of the at least one polymer based on the total weight of the first layer. In some embodiments, the first layer comprises 65% to 90% by weight of the at least one polymer based on the total weight of the first layer. In some embodiments, the first layer comprises 70% to 90% by weight of the at least one polymer based on the total weight of the first layer. In some embodiments, the first layer comprises 75% to 90% by weight of the at least one polymer based on the total weight of the first layer. In some embodiments, the first layer comprises 80% to 90% by weight of the at least one polymer based on the total weight of the first layer. In some embodiments, the first layer comprises 85% to 90% by weight of the at least one polymer based on the total weight of the first layer.

In some embodiments, the first layer comprises 20% to 90% by weight of the at least one polymer based on the total weight of the first layer. In some embodiments, the first layer comprises 20% to 80% by weight of the at least one polymer based on the total weight of the first layer. In some embodiments, the first layer comprises 20% to 70% by weight of the at least one polymer based on the total weight of the first layer. In some embodiments, the first layer comprises 30% to 90% by weight of the at least one polymer based on the total weight of the first layer. In some embodiments, the first layer comprises 30% to 80% by weight of the at least one polymer based on the total weight of the first layer. In some embodiments, the first layer comprises 30% to 70% by weight of the at least one polymer based on the total weight of the first layer. In some embodiments, the first layer comprises 40% to 90% by weight of the at least one polymer based on the total weight of the first layer. In some embodiments, the first layer comprises 40% to 80% by weight of the at least one polymer based on the total weight of the first layer. In some embodiments, the first layer comprises 40% to 70% by weight of the at least one polymer based on the total weight of the first layer. In some embodiments, the first layer comprises 40% to 60% by weight of the at least one polymer based on the total weight of the first layer. In some embodiments, the first layer comprises 20% to 80% by weight of the at least one polymer based on the total weight of the first layer. In some embodiments, the first layer comprises 30% to 80% by weight of the at least one polymer based on the total weight of the first layer. In some embodiments, the first layer comprises 40% to 80% by weight of the at least one polymer based on the total weight of the first layer. In some embodiments, the first layer comprises 50% to 80% by weight of the at least one polymer based on the total weight of the first layer.

In some embodiments, the first layer comprises at least one additive. In some embodiments, the at least one additive comprises at least one filler. In some embodiments, the at least one filler comprises at least one of limestone, glass, calcium carbonate, barium sulfate, calcium sulfate, talc, perlite, silica, fumed silica, precipitated silica, quartz, aluminum trihydrate, magnesium hydroxide, ammonium polyphosphate, colemanite, titanium dioxide, calcium sulfate, fly ash, graphene nanoparticles, carbon black, recycled materials (e.g., such as one or more of recycled rubber tires, recycled shingles, recycled thermoplastic resins), basalt, roofing granules, graphite, clay, or any combination thereof. In some embodiments, the at least one additive comprises at least one of group stabilizers, antioxidants, nucleating agents, colorants, pigments, dyes, coloring agents, mold release agents, dispersing agents, UV light absorbers, UV stabilizers, fire retardants, mold release agents, anti-static agents, or any combination thereof.

In some embodiments, the first layer comprises at least one colorant. In some embodiments, the at least one colorant comprises at least one dye. In some embodiments, the colorant comprises at least one pigment. In some embodiments, the first layer comprises at least one coloring agent. In some embodiments, the at least one colorant comprises at least one of infrared reflective pigments, infrared reflective dyes, phosphorescence pigments, phosphorescence dyes, fluorescence pigments, fluorescence dyes, color pigments, color dyes, reflective pigments, reflective dyes, or any combination thereof. In some embodiments, the at least one pigment comprises at least one of metallic pigments, metallic powders such as aluminum, heavy metal-based pigments, heavy-metal free pigments, organic pigments, or any combination thereof. In some embodiments, the at least one pigment comprises at least one of carbon black, titanium dioxide, chromium oxide, chromium iron oxide, titanium oxide, magnesium oxide, magnesium hydroxide, zinc oxide, calcium carbonate, black iron oxide, red iron oxide, yellow iron oxide, green iron oxide, mixed metal oxides, bismuth vanadate, phthalocyanine blue, phthalocyanine green, quinacridone reds, anthraquinone, perylene reds, polyazos, or any combination thereof. In some embodiments, An example of a metallic pigment includes, without limitation, Polybatch White P8555 SD, which is available from A. Schulman Inc. and which is identified as a white color concentrate having a coated rutile titanium dioxide concentration of 50% by weight in a propylene homopolymer carrier resin; Ampacet 110235, which is a white pigmented polyethylene concentrate available from the Ampacet Corporation; and Ampacet 110868. Examples of black pigments include, without limitation, various carbon blacks and organic concentrates, such as Ampacet 190303, which is a black pigmented polyethylene resin concentrate; and Ampacet 190671A, which is another black pigmented resin concentrate from Ampacet Corporation. In some embodiments, the pigments include a gray color obtained by mixing white pigment and black pigment to achieve a desired shade of gray. Examples of a commercially available gray concentrate include, without limitation, Ampacet 190697 and Ampacet 190870. Examples of organic pigment concentrates include, without limitation, Ampacet 150623, a red pigmented polyethylene resin concentrate; Ampacet 150380, a red pigment concentrate; Ampacet 150703 Red PE MB; Ampacet 150623 Red UV PE MB; Ampacet 130283 Yellow UV PE MB; Ampacet 140085 Orange PE MB; Ampacet Dark Green 170560; Ampacet Olympic Blue 160972; and Ampacet Sapphire Blue 160904. An example of a heavy metal containing pigment includes, without limitation, Ampacet LP20631 Orange PE MB which is identified as a lead molybdate/lead chromate pigment concentrate.

In some embodiments, the first layer does not comprise the at least one additive. In some embodiments, the first layer does not comprise at least one of the at least one additives.

In some embodiments, the first layer comprises 10% to 90% by weight of the at least one additive based on the total weight of the first layer. In some embodiments, the first layer comprises 10% to 85% by weight of the at least one additive based on the total weight of the first layer. In some embodiments, the first layer comprises 10% to 80% by weight of the at least one additive based on the total weight of the first layer. In some embodiments, the first layer comprises 10% to 75% by weight of the at least one additive based on the total weight of the first layer. In some embodiments, the first layer comprises 10% to 70% by weight of the at least one additive based on the total weight of the first layer. In some embodiments, the first layer comprises 10% to 65% by weight of the at least one additive based on the total weight of the first layer. In some embodiments, the first layer comprises 10% to 60% by weight of the at least one additive based on the total weight of the first layer. In some embodiments, the first layer comprises 10% to 55% by weight of the at least one additive based on the total weight of the first layer. In some embodiments, the first layer comprises 10% to 50% by weight of the at least one additive based on the total weight of the first layer. In some embodiments, the first layer comprises 10% to 45% by weight of the at least one additive based on the total weight of the first layer. In some embodiments, the first layer comprises 10% to 40% by weight of the at least one additive based on the total weight of the first layer. In some embodiments, the first layer comprises 10% to 35% by weight of the at least one additive based on the total weight of the first layer. In some embodiments, the first layer comprises 10% to 30% by weight of the at least one additive based on the total weight of the first layer. In some embodiments, the first layer comprises 10% to 25% by weight of the at least one additive based on the total weight of the first layer. In some embodiments, the first layer comprises 10% to 20% by weight of the at least one additive based on the total weight of the first layer. In some embodiments, the first layer comprises 10% to 15% by weight of the at least one additive based on the total weight of the first layer.

In some embodiments, the first layer comprises 15% to 90% by weight of the at least one additive based on the total weight of the first layer. In some embodiments, the first layer comprises 20% to 90% by weight of the at least one additive based on the total weight of the first layer. In some embodiments, the first layer comprises 25% to 90% by weight of the at least one additive based on the total weight of the first layer. In some embodiments, the first layer comprises 30% to 90% by weight of the at least one additive based on the total weight of the first layer. In some embodiments, the first layer comprises 35% to 90% by weight of the at least one additive based on the total weight of the first layer. In some embodiments, the first layer comprises 40% to 90% by weight of the at least one additive based on the total weight of the first layer. In some embodiments, the first layer comprises 45% to 90% by weight of the at least one additive based on the total weight of the first layer. In some embodiments, the first layer comprises 50% to 90% by weight of the at least one additive based on the total weight of the first layer. In some embodiments, the first layer comprises 55% to 90% by weight of the at least one additive based on the total weight of the first layer. In some embodiments, the first layer comprises 60% to 90% by weight of the at least one additive based on the total weight of the first layer. In some embodiments, the first layer comprises 65% to 90% by weight of the at least one additive based on the total weight of the first layer. In some embodiments, the first layer comprises 70% to 90% by weight of the at least one additive based on the total weight of the first layer. In some embodiments, the first layer comprises 75% to 90% by weight of the at least one additive based on the total weight of the first layer. In some embodiments, the first layer comprises 80% to 90% by weight of the at least one additive based on the total weight of the first layer. In some embodiments, the first layer comprises 85% to 90% by weight of the at least one additive based on the total weight of the first layer.

In some embodiments, the first layer comprises 20% to 90% by weight of the at least one additive based on the total weight of the first layer. In some embodiments, the first layer comprises 20% to 80% by weight of the at least one additive based on the total weight of the first layer. In some embodiments, the first layer comprises 20% to 70% by weight of the at least one additive based on the total weight of the first layer. In some embodiments, the first layer comprises 30% to 90% by weight of the at least one additive based on the total weight of the first layer. In some embodiments, the first layer comprises 30% to 80% by weight of the at least one additive based on the total weight of the first layer. In some embodiments, the first layer comprises 30% to 70% by weight of the at least one additive based on the total weight of the first layer. In some embodiments, the first layer comprises 40% to 90% by weight of the at least one additive based on the total weight of the first layer. In some embodiments, the first layer comprises 40% to 80% by weight of the at least one additive based on the total weight of the first layer. In some embodiments, the first layer comprises 40% to 70% by weight of the at least one additive based on the total weight of the first layer. In some embodiments, the first layer comprises 40% to 60% by weight of the at least one additive based on the total weight of the first layer. In some embodiments, the first layer comprises 20% to 80% by weight of the at least one additive based on the total weight of the first layer. In some embodiments, the first layer comprises 30% to 80% by weight of the at least one additive based on the total weight of the first layer. In some embodiments, the first layer comprises 40% to 80% by weight of the at least one additive based on the total weight of the first layer. In some embodiments, the first layer comprises 50% to 80% by weight of the at least one additive based on the total weight of the first layer.

In some embodiments, the first layer has a thickness of 10 mils to 50 mils. In some embodiments, the first layer has a thickness of 10 mils to 48 mils. In some embodiments, the first layer has a thickness of 10 mils to 46 mils. In some embodiments, the first layer has a thickness of 10 mils to 45 mils. In some embodiments, the first layer has a thickness of 10 mils to mils. In some embodiments, the first layer has a thickness of 10 mils to 44 mils. In some embodiments, the first layer has a thickness of 10 mils to 42 mils. In some embodiments, the first layer has a thickness of 10 mils to 40 mils. In some embodiments, the first layer has a thickness of 10 mils to 38 mils. In some embodiments, the first layer has a thickness of 10 mils to 36 mils. In some embodiments, the first layer has a thickness of 10 mils to 35 mils. In some embodiments, the first layer has a thickness of 10 mils to 34 mils. In some embodiments, the first layer has a thickness of 10 mils to 32 mils. In some embodiments, the first layer has a thickness of 10 mils to 30 mils. In some embodiments, the first layer has a thickness of 10 mils to 28 mils. In some embodiments, the first layer has a thickness of 10 mils to 26 mils. In some embodiments, the first layer has a thickness of 10 mils to 25 mils. In some embodiments, the first layer has a thickness of 10 mils to 24 mils. In some embodiments, the first layer has a thickness of 10 mils to 22 mils. In some embodiments, the first layer has a thickness of 10 mils to 20 mils. In some embodiments, the first layer has a thickness of 10 mils to 18 mils. In some embodiments, the first layer has a thickness of 10 mils to 16 mils. In some embodiments, the first layer has a thickness of 10 mils to 15 mils. In some embodiments, the first layer has a thickness of 10 mils to 14 mils. In some embodiments, the first layer has a thickness of 10 mils to 12 mils.

In some embodiments, the first layer has a thickness of 12 mils to 50 mils. In some embodiments, the first layer has a thickness of 14 mils to 50 mils. In some embodiments, the first layer has a thickness of 15 mils to 50 mils. In some embodiments, the first layer has a thickness of 16 mils to 50 mils. In some embodiments, the first layer has a thickness of 18 mils to 50 mils. In some embodiments, the first layer has a thickness of 20 mils to 50 mils. In some embodiments, the first layer has a thickness of 22 mils to 50 mils. In some embodiments, the first layer has a thickness of 24 mils to 50 mils. In some embodiments, the first layer has a thickness of 25 mils to 50 mils. In some embodiments, the first layer has a thickness of 26 mils to 50 mils. In some embodiments, the first layer has a thickness of 28 mils to 50 mils. In some embodiments, the first layer has a thickness of 30 mils to 50 mils. In some embodiments, the first layer has a thickness of 32 mils to 50 mils. In some embodiments, the first layer has a thickness of 34 mils to 50 mils. In some embodiments, the first layer has a thickness of 35 mils to 50 mils. In some embodiments, the first layer has a thickness of 36 mils to 50 mils. In some embodiments, the first layer has a thickness of 38 mils to 50 mils. In some embodiments, the first layer has a thickness of 40 mils to 50 mils. In some embodiments, the first layer has a thickness of 42 mils to 50 mils. In some embodiments, the first layer has a thickness of 44 mils to 50 mils. In some embodiments, the first layer has a thickness of 45 mils to 50 mils. In some embodiments, the first layer has a thickness of 46 mils to 50 mils. In some embodiments, the first layer has a thickness of 48 mils to 50 mils. In some embodiments, the first layer has a thickness of 20 mils to 40 mils. In some embodiments, the first layer has a thickness of 20 mils to 30 mils. In some embodiments, the first layer has a thickness of 30 mils to 40 mils. In some embodiments, the first layer has a thickness of 15 mils to 40 mils. In some embodiments, the first layer has a thickness of 15 mils to 30 mils.

In some embodiments, the first layer has a first color. In some embodiments, the first layer has a CIELAB color value comprising an L value range of $0 \leq L^* \leq 100$. In some embodiments, the first layer has a CIELAB color value comprising an L value range of $0 \leq L^* \leq 90$. In some embodiments, the first layer has a CIELAB color value comprising an L value range of $0 \leq L^* \leq 80$. In some embodiments, the first layer has a CIELAB color value comprising an L value range of $0 \leq L^* \leq 70$. In some embodiments, the first layer has a CIELAB color value comprising an L value range of $0 \leq L^* \leq 60$. In some embodiments, the first layer has a CIELAB color value comprising an L value range of $0 \leq L^* \leq 50$. In some embodiments, the first layer has a CIELAB color value comprising an L value range of $0 \leq L^* \leq 40$. In some embodiments, the first layer has a CIELAB color value comprising an L value range of $0 \leq L^* \leq 30$. In some embodiments, the first layer has a CIELAB color value comprising an L value range of $0 \leq L^* \leq 20$. In some embodiments, the first layer has a CIELAB color value comprising an L value range of $0 \leq L^* \leq 10$. In some embodiments, the first layer has a CIELAB color value comprising an L value range of $0 \leq L^* \leq 1$.

In some embodiments, the first layer has a CIELAB color value comprising an L value range of $10 \leq L^* \leq 100$. In some embodiments, the first layer has a CIELAB color value comprising an L value range of $20 \leq L^* \leq 100$. In some embodiments, the first layer has a CIELAB color value comprising an L value range of $30 \leq L^* \leq 100$. In some embodiments, the first layer has a CIELAB color value comprising an L value range of $40 \leq L^* \leq 100$. In some embodiments, the first layer has a CIELAB color value comprising an L value range of $50 \leq L^* \leq 100$. In some embodiments, the first layer has a CIELAB color value comprising an L value range of $60 \leq L^* \leq 100$. In some embodiments, the first layer has a CIELAB color value comprising an L value range of $70 \leq L^* \leq 100$. In some embodiments, the first layer has a CIELAB color value comprising an L value range of $80 \leq L^* \leq 100$. In some embodiments, the first layer has a CIELAB color value comprising an L value range of $90 \leq L^* \leq 100$.

In some embodiments, the first layer has a CIELAB color value comprising an L value range of $0 \leq L^* \leq 40$. In some embodiments, the first layer has a CIELAB color value comprising an L value range of $0 \leq L^* \leq 35$. In some embodiments, the first layer has a CIELAB color value comprising an L value range of $0 \leq L^* \leq 30$. In some embodiments, the first layer has a CIELAB color value comprising an L value range of $0 \leq L^* \leq 25$. In some embodiments, the first layer has a CIELAB color value comprising an L value range of $0 \leq L^* \leq 20$. In some embodiments, the first layer has a CIELAB color value comprising an L value range of $0 \leq L^* \leq 15$. In some embodiments, the first layer has a CIELAB color value comprising an L value range of $0 \leq L^* \leq 10$. In some embodiments, the first layer has a CIELAB color value comprising an L value range of $0 \leq L^* \leq 5$. In some embodiments, the first layer has a CIELAB color value comprising an L value range of $0 \leq L^* \leq 4$. In some embodiments, the first layer has a CIELAB color value comprising an L value range of $0 \leq L^* \leq 3$. In some embodiments, the first layer has a CIELAB color value comprising an L value range of $0 \leq L^* \leq 2$. In some embodiments, the first layer has a CIELAB color value comprising an L value range of $0 \leq L^* \leq 1$.

In some embodiments, the first layer has a CIELAB color value comprising an a* value of $-128 \leq a^* \leq 127$. In some embodiments, the first layer has a CIELAB color value comprising an b* value of $-128 \leq b^* \leq 127$.

In some embodiments, the first layer has a plurality of openings extending through the first layer. For example, in some embodiments, the first layer has a plurality of openings extending through the first layer from a first surface of the first layer to a second surface of the first layer, wherein the second surface of the first layer is opposite the first surface of the first layer. In some embodiments, the first layer has a plurality of openings extending through the first layer, so as to define a plurality of roofing shingle tabs. In some embodiments, for example, the first layer is shaped in a form of a plurality of roofing shingle tabs (e.g., in the form of dragon teeth of a roofing shingle). In some embodiments, the plurality of roofing shingle tabs comprises one tab, two tabs, three tabs, four tabs, five tabs, or six or more tabs. In some embodiments, the plurality of openings extending through the first layer has at least one of a circular shape, an oval shape, an elliptical shape, a rectangular shape, a square shape, a quadrilateral shape, a triangular shape, or any combination thereof. In some embodiments, the first layer does not comprise any openings.

In some embodiments, at least one of the plurality of openings has a dimension in a range of 0.5 mm to 100 mm. In some embodiments, at least one of the plurality of openings has a dimension in a range of 0.5 mm to 95 mm. In some embodiments, at least one of the plurality of openings has a dimension in a range of 0.5 mm to 90 mm. In some embodiments, at least one of the plurality of openings has a dimension in a range of 0.5 mm to 85 mm. In some embodiments, at least one of the plurality of openings has a dimension in a range of 0.5 mm to 80 mm. In some embodiments, at least one of the plurality of openings has a dimension in a range of 0.5 mm to 75 mm. In some embodiments, at least one of the plurality of openings has a dimension in a range of 0.5 mm to 70 mm. In some embodiments, at least one of the plurality of openings has a dimension in a range of 0.5 mm to 65 mm. In some embodiments, at least one of the plurality of openings has a dimension in a range of 0.5 mm to 60 mm. In some embodiments, at least one of the plurality of openings has a dimension in a range of 0.5 mm to 55 mm. In some embodiments, at least one of the plurality of openings has a dimension in a range of 0.5 mm to 50 mm. In some embodiments, at least one of the plurality of openings has a dimension in a range of 0.5 mm to 45 mm. In some embodiments, at least one of the plurality of openings has a dimension in a range of 0.5 mm to 40 mm. In some embodiments, at least one of the plurality of openings has a dimension in a range of 0.5 mm to 35 mm. In some embodiments, at least one of the plurality of openings has a dimension in a range of 0.5 mm to 30 mm. In some embodiments, at least one of the plurality of openings has a dimension in a range of 0.5 mm to 25 mm. In some embodiments, at least one of the plurality of openings has a dimension in a range of 0.5 mm to 20 mm. In some embodiments, at least one of the plurality of openings has a dimension in a range of 0.5 mm to 15 mm. In some embodiments, at least one of the plurality of openings has a dimension in a range of 0.5 mm to 10 mm. In some embodiments, at least one of the plurality of openings has a dimension in a range of 0.5 mm to 5 mm.

In some embodiments, at least one of the plurality of openings has a dimension in a range of 1 mm to 100 mm. In some embodiments, at least one of the plurality of openings has a dimension in a range of 5 mm to 100 mm. In some embodiments, at least one of the plurality of openings has a dimension in a range of 10 mm to 100 mm. In some embodiments, at least one of the plurality of openings has a dimension in a range of 15 mm to 100 mm. In some embodiments, at least one of the plurality of openings has a dimension in a range of 20 mm to 100 mm. In some embodiments, at least one of the plurality of openings has a dimension in a range of 25 mm to 100 mm. In some embodiments, at least one of the plurality of openings has a dimension in a range of 30 mm to 100 mm. In some embodiments, at least one of the plurality of openings has a dimension in a range of 35 mm to 100 mm. In some embodiments, at least one of the plurality of openings has a dimension in a range of 40 mm to 100 mm. In some embodiments, at least one of the plurality of openings has a dimension in a range of 45 mm to 100 mm. In some embodiments, at least one of the plurality of openings has a dimension in a range of 50 mm to 100 mm. In some embodiments, at least one of the plurality of openings has a dimension in a range of 55 mm to 100 mm. In some embodiments, at least one of the plurality of openings has a dimension in a range of 60 mm to 100 mm. In some embodiments, at least one of the plurality of openings has a dimension in a range of 65 mm to 100 mm. In some embodiments, at least one of the plurality of openings has a dimension in a range of 70 mm to 100 mm. In some embodiments, at least one of the plurality of openings has a dimension in a range of 75 mm to 100 mm. In some embodiments, at least one of the plurality of openings has a dimension in a range of 80 mm to 100 mm. In some embodiments, at least one of the plurality of openings has a dimension in a range of 85 mm to 100 mm. In some embodiments, at least one of the plurality of openings has a dimension in a range of 90 mm to 100 mm. In some embodiments, at least one of the plurality of openings has a dimension in a range of 95 mm to 100 mm.

In some embodiments, at least one of the plurality of openings has a dimension in a range of 1 mm to 40 mm. In some embodiments, at least one of the plurality of openings has a dimension in a range of 1 mm to 35 mm. In some embodiments, at least one of the plurality of openings has a dimension in a range of 1 mm to 30 mm. In some embodiments, at least one of the plurality of openings has a dimension in a range of 1 mm to 25 mm. In some embodiments, at least one of the plurality of openings has a dimension in a range of 1 mm to 20 mm. In some embodiments, at least one of the plurality of openings has a dimension in a range of 1 mm to 15 mm. In some embodiments, at least one of the plurality of openings has a dimension in a range of 1 mm to 10 mm. In some embodiments, at least one of the plurality of openings has a dimension in a range of 5 mm to 40 mm. In some embodiments, at least one of the plurality of openings has a dimension in a range of 10 mm to 40 mm. In some embodiments, at least one of the plurality of openings has a dimension in a range of 15 mm to 40 mm. In some embodiments, at least one of the plurality of openings has a dimension in a range of 20 mm to 40 mm. In some embodiments, at least one of the plurality of openings has a dimension in a range of 25 mm to 40 mm. In some embodiments, at least one of the plurality of openings has a dimension in a range of 30 mm to 40 mm. In some embodiments, at least one of the plurality of openings has a dimension in a range of 35 mm to 40 mm. In some embodiments, at least one of the plurality of openings has a dimension in a range of 1 mm to 20 mm. In some embodiments, at least one of the plurality of openings has a dimension in a range of 3 mm to 15 mm.

In some embodiments, the roofing material comprises a second layer on the first layer. In some embodiments, the second layer is different from the first layer.

In some embodiments, the second layer comprises at least one polymer. In some embodiments, the at least one polymer comprises at least one thermoplastic polymer. In some embodiments, the at least one polymer comprises at least one thermoplastic polyolefin (TPO). In some embodiments, the at least one polymer comprises at least one of polyethylene, polypropylene, any copolymer thereof, any homopolymer thereof, any polymer blend thereof, or any combination thereof. In some embodiments, the thermoplastic polyolefin comprises at least one of a copolymer of propylene and ethylene, a blend of propylene and ethylene, a copolymer of ethylene alpha-olefin, a propylene homopolymer, an ethylene homopolymer, a propylene block copolymer, an ethylene block copolymer, a propylene elastomer, an ethylene elastomer, or any combination thereof. In some embodiments, the thermoplastic polymer comprises at least one of a copolymer comprising ethylene and octene, a copolymer comprising ethylene and hexane, a copolymer comprising ethylene and butene, polyethylene (including raw and/or recycled low density polyethylene (LDPE)), linear low density polyethylene (LLDPE), high density polyethylene (HDPE)), polypropylenes (e.g., isotactic polypropylene (IPP) and/or atactic polypropylene (APP/IPP)), amorphous polyalpha olefins (APAO), amorphous polyolefins (APO), or any combination thereof. In some embodiments, the at least one polymer comprises polyethylene terephthalate (PET). In some embodiments, the at least one polymer comprises an acrylic polymer, such as, for example, polymethyl methacrylate. In some embodiments, the at least one polymer comprises ethylene tetrafluoroethylene (ETFE). In some embodiments, the at least one polymer of the second layer is the same as the at least one polymer of the first layer.

Examples of the at least one polymer include, for example and without limitation, at least one of Vistamaxx® 6102, Vistamaxx® 8880, both of which are polypropylenes (e.g., isotactic polypropylene (IPP)) that are available from ExxonMobil, Irving, Tex.; Elvalay®, which is a terpolymer that is available from Dow/DuPont, Wilmington, Del.; Fusabond®, which is a chemically modified ethylene acrylate copolymer and/or a modified polyethylene, that is available from Dow/DuPont, Wilmington, Del.; RT2304, which is an amorphous polyalpha olefin (APAO) that is available from Rextac APAO Polymers LLC, Odessa, Tex.; Eastoflex® P1023, which is an amorphous polyolefin (APO) that comprises a propylene homopolymer, and is available from Eastman Chemical Company, Kingsport, Tenn.; Eastoflex® E1060, which is an amorphous polyolefin (APO) that comprises a copolymer of propylene and ethylene, and is available from Eastman Chemical Company, Kingsport, Tenn.; Eastoflex® M1025, which is an amorphous polyolefin (APO) that comprises a blend of propylene homopolymer and copolymers of propylene and ethylene, and is available from Eastman Chemical Company, Kingsport, Tenn.; Engage® 7487, which is a polyolefin elastomer (POE) that is available from Dow Inc., Midland, Mich., or any combination thereof.

In some embodiments, the second layer comprises 10% to 90% by weight of the at least one polymer based on a total weight of the second layer. In some embodiments, the second layer comprises 10% to 85% by weight of the at least one polymer based on the total weight of the second layer. In some embodiments, the second layer comprises 10% to 80% by weight of the at least one polymer based on the total weight of the second layer. In some embodiments, the second layer comprises 10% to 75% by weight of the at least one polymer based on the total weight of the second layer. In some embodiments, the second layer comprises 10% to 70% by weight of the at least one polymer based on the total weight of the second layer. In some embodiments, the second layer comprises 10% to 65% by weight of the at least one polymer based on the total weight of the second layer. In some embodiments, the second layer comprises 10% to 60% by weight of the at least one polymer based on the total weight of the second layer. In some embodiments, the second layer comprises 10% to 55% by weight of the at least one polymer based on the total weight of the second layer. In some embodiments, the second layer comprises 10% to 50% by weight of the at least one polymer based on the total weight of the second layer. In some embodiments, the second layer comprises 10% to 45% by weight of the at least one polymer based on the total weight of the second layer. In some embodiments, the second layer comprises 10% to 40% by weight of the at least one polymer based on the total weight of the second layer. In some embodiments, the second layer comprises 10% to 35% by weight of the at least one polymer based on the total weight of the second layer. In some embodiments, the second layer comprises 10% to 30% by weight of the at least one polymer based on the total weight of the second layer. In some embodiments, the second layer comprises 10% to 25% by weight of the at least one polymer based on the total weight of the second layer. In some embodiments, the second layer comprises 10% to 20% by weight of the at least one polymer based on the total weight of the second layer. In some embodiments, the second layer comprises 10% to 15% by weight of the at least one polymer based on the total weight of the second layer.

In some embodiments, the second layer comprises 15% to 90% by weight of the at least one polymer based on the total weight of the second layer. In some embodiments, the second layer comprises 20% to 90% by weight of the at least one polymer based on the total weight of the second layer. In some embodiments, the second layer comprises 25% to 90% by weight of the at least one polymer based on the total weight of the second layer. In some embodiments, the second layer comprises 30% to 90% by weight of the at least one polymer based on the total weight of the second layer. In some embodiments, the second layer comprises 35% to 90% by weight of the at least one polymer based on the total weight of the second layer. In some embodiments, the second layer comprises 40% to 90% by weight of the at least one polymer based on the total weight of the second layer. In some embodiments, the second layer comprises 45% to 90% by weight of the at least one polymer based on the total weight of the second layer. In some embodiments, the second layer comprises 50% to 90% by weight of the at least one polymer based on the total weight of the second layer. In some embodiments, the second layer comprises 55% to 90% by weight of the at least one polymer based on the total weight of the second layer. In some embodiments, the second layer comprises 60% to 90% by weight of the at least one polymer based on the total weight of the second layer. In some embodiments, the second layer comprises 65% to 90% by weight of the at least one polymer based on the total weight of the second layer. In some embodiments, the second layer comprises 70% to 90% by weight of the at least one polymer based on the total weight of the second layer. In some embodiments, the second layer comprises 75% to 90% by weight of the at least one polymer based on the total weight of the second layer. In some embodiments, the second layer comprises 80% to 90% by weight of the at least one polymer based on the total weight of the second layer. In some embodiments, the second layer comprises 85% to 90% by weight of the at least one polymer based on the total weight of the second layer.

In some embodiments, the second layer comprises 20% to 90% by weight of the at least one polymer based on the total weight of the second layer. In some embodiments, the second layer comprises 20% to 80% by weight of the at least one polymer based on the total weight of the second layer. In some embodiments, the second layer comprises 20% to 70% by weight of the at least one polymer based on the total weight of the second layer. In some embodiments, the second layer comprises 30% to 90% by weight of the at least one polymer based on the total weight of the second layer. In some embodiments, the second layer comprises 30% to 80% by weight of the at least one polymer based on the total weight of the second layer. In some embodiments, the second layer comprises 30% to 70% by weight of the at least one polymer based on the total weight of the second layer. In some embodiments, the second layer comprises 40% to 90% by weight of the at least one polymer based on the total weight of the second layer. In some embodiments, the second layer comprises 40% to 80% by weight of the at least one polymer based on the total weight of the second layer. In some embodiments, the second layer comprises 40% to 70% by weight of the at least one polymer based on the total weight of the second layer. In some embodiments, the second layer comprises 40% to 60% by weight of the at least one polymer based on the total weight of the second layer. In some embodiments, the second layer comprises 20% to 80% by weight of the at least one polymer based on the total weight of the second layer. In some embodiments, the second layer comprises 30% to 80% by weight of the at least one polymer based on the total weight of the second layer. In some embodiments, the second layer comprises 40% to 80% by weight of the at least one polymer based on the total weight of the second layer. In some embodiments, the second layer comprises 50% to 80% by weight of the at least one polymer based on the total weight of the second layer.

In some embodiments, the second layer comprises at least one additive. In some embodiments, the at least one additive comprises at least one filler. In some embodiments, the at least one filler comprises at least one of limestone, glass, calcium carbonate, barium sulfate, calcium sulfate, talc, perlite, silica, fumed silica, precipitated silica, quartz, aluminum trihydrate, magnesium hydroxide, ammonium polyphosphate, colemanite, titanium dioxide, calcium sulfate, fly ash, graphene nanoparticles, carbon black, recycled materials (e.g., such as one or more of recycled rubber tires, recycled shingles, recycled thermoplastic resins), basalt, roofing granules, graphite, clay, or any combination thereof. In some embodiments, the at least one additive comprises at least one of group stabilizers, antioxidants, nucleating agents, colorants, pigments, dyes, coloring agents, mold release agents, dispersing agents, UV light absorbers, flame retardants, mold release agents, anti-static agents, or any combination thereof.

In some embodiments, the second layer comprises at least one colorant. In some embodiments, the at least one colorant comprises at least one dye. In some embodiments, the colorant comprises at least one pigment. In some embodiments, the second layer comprises at least one coloring agent. In some embodiments, the at least one colorant comprises at least one of infrared reflective pigments, infrared reflective dyes, phosphorescence pigments, phosphorescence dyes, fluorescence pigments, fluorescence dyes, color pigments, color dyes, reflective pigments, reflective dyes, or any combination thereof. In some embodiments, the at least one pigment comprises at least one of metallic pigments, metallic powders such as aluminum, heavy metal-based pigments, heavy-metal free pigments, organic pigments, or any combination thereof. In some embodiments, the at least one pigment comprises at least one of carbon black, titanium dioxide, chromium oxide, chromium iron oxide, titanium oxide, magnesium oxide, magnesium hydroxide, titanium dioxide, zinc oxide, calcium carbonate, black iron oxide, red iron oxide, yellow iron oxide, green iron oxide, mixed metal oxides, bismuth vanadate, phthalocyanine blue, phthalocyanine green, quinacridone reds, anthraquinone, perylene reds, polyazos, or any combination thereof.

An example of a metallic pigment includes, without limitation, Polybatch White P8555 SD, which is available from A. Schulman Inc. and which is identified as a white color concentrate having a coated rutile titanium dioxide concentration of 50% by weight in a propylene homopolymer carrier resin; Ampacet 110235, which is a white pigmented polyethylene concentrate available from the Ampacet Corporation; and Ampacet 110868. Examples of black pigments include, without limitation, various carbon blacks and organic concentrates, such as Ampacet 190303, which is a black pigmented polyethylene resin concentrate; and Ampacet 190671A, which is another black pigmented resin concentrate from Ampacet Corporation. In some embodiments, the pigments include a gray color obtained by mixing white pigment and black pigment to achieve a desired shade of gray. Examples of a commercially available gray concentrate include, without limitation, Ampacet 190697 and Ampacet 190870. Examples of organic pigment concentrates include, without limitation, Ampacet 150623, a red pigmented polyethylene resin concentrate; Ampacet 150380, a red pigment concentrate; Ampacet 150703 Red PE MB; Ampacet 150623 Red UV PE MB; Ampacet 130283 Yellow UV PE MB; Ampacet 140085 Orange PE MB; Ampacet Dark Green 170560; Ampacet Olympic Blue 160972; and Ampacet Sapphire Blue 160904. An example of a heavy metal containing pigment includes, without limitation, Ampacet LP20631 Orange PE MB which is identified as a lead molybdate/lead chromate pigment concentrate.

In some embodiments, the second layer does not comprise the at least one additive. In some embodiments, the second layer does not comprise at least one of the at least one additives.

In some embodiments, the second layer comprises 10% to 90% by weight of the at least one additive based on the total weight of the second layer. In some embodiments, the second layer comprises 10% to 85% by weight of the at least one additive based on the total weight of the second layer. In some embodiments, the second layer comprises 10% to 80% by weight of the at least one additive based on the total weight of the second layer. In some embodiments, the second layer comprises 10% to 75% by weight of the at least one additive based on the total weight of the second layer. In some embodiments, the second layer comprises 10% to 70% by weight of the at least one additive based on the total weight of the second layer. In some embodiments, the second layer comprises 10% to 65% by weight of the at least one additive based on the total weight of the second layer. In some embodiments, the second layer comprises 10% to 60% by weight of the at least one additive based on the total weight of the second layer. In some embodiments, the second layer comprises 10% to 55% by weight of the at least one additive based on the total weight of the second layer. In some embodiments, the second layer comprises 10% to 50% by weight of the at least one additive based on the total weight of the second layer. In some embodiments, the second layer comprises 10% to 45% by weight of the at least one additive based on the total weight of the second layer. In some embodiments, the second layer comprises 10% to 40% by weight of the at least one additive based on the total weight of the second layer. In some embodiments, the second layer comprises 10% to 35% by weight of the at least one additive based on the total weight of the second layer. In some embodiments, the second layer comprises 10% to 30% by weight of the at least one additive based on the total weight of the second layer. In some embodiments, the second layer comprises 10% to 25% by weight of the at least one additive based on the total weight of the second layer. In some embodiments, the second layer comprises 10% to 20% by weight of the at least one additive based on the total weight of the second layer. In some embodiments, the second layer comprises 10% to 15% by weight of the at least one additive based on the total weight of the second layer.

In some embodiments, the second layer comprises 15% to 90% by weight of the at least one additive based on the total weight of the second layer. In some embodiments, the second layer comprises 20% to 90% by weight of the at least one additive based on the total weight of the second layer. In some embodiments, the second layer comprises 25% to 90% by weight of the at least one additive based on the total weight of the second layer. In some embodiments, the second layer comprises 30% to 90% by weight of the at least one additive based on the total weight of the second layer. In some embodiments, the second layer comprises 35% to 90% by weight of the at least one additive based on the total weight of the second layer. In some embodiments, the second layer comprises 40% to 90% by weight of the at least one additive based on the total weight of the second layer. In some embodiments, the second layer comprises 45% to 90% by weight of the at least one additive based on the total weight of the second layer. In some embodiments, the second layer comprises 50% to 90% by weight of the at least one additive based on the total weight of the second layer. In some embodiments, the second layer comprises 55% to 90% by weight of the at least one additive based on the total weight of the second layer. In some embodiments, the second layer comprises 60% to 90% by weight of the at least one additive based on the total weight of the second layer. In some embodiments, the second layer comprises 65% to 90% by weight of the at least one additive based on the total weight of the second layer. In some embodiments, the second layer comprises 70% to 90% by weight of the at least one additive based on the total weight of the second layer. In some embodiments, the second layer comprises 75% to 90% by weight of the at least one additive based on the total weight of the second layer. In some embodiments, the second layer comprises 80% to 90% by weight of the at least one additive based on the total weight of the second layer. In some embodiments, the second layer comprises 85% to 90% by weight of the at least one additive based on the total weight of the second layer.

In some embodiments, the second layer comprises 20% to 90% by weight of the at least one additive based on the total weight of the second layer. In some embodiments, the second layer comprises 20% to 80% by weight of the at least one additive based on the total weight of the second layer. In some embodiments, the second layer comprises 20% to 70% by weight of the at least one additive based on the total weight of the second layer. In some embodiments, the second layer comprises 30% to 90% by weight of the at least one additive based on the total weight of the second layer. In some embodiments, the second layer comprises 30% to 80% by weight of the at least one additive based on the total weight of the second layer. In some embodiments, the second layer comprises 30% to 70% by weight of the at least one additive based on the total weight of the second layer. In some embodiments, the second layer comprises 40% to 90% by weight of the at least one additive based on the total weight of the second layer. In some embodiments, the second layer comprises 40% to 80% by weight of the at least one additive based on the total weight of the second layer. In some embodiments, the second layer comprises 40% to 70% by weight of the at least one additive based on the total weight of the second layer. In some embodiments, the second layer comprises 40% to 60% by weight of the at least one additive based on the total weight of the second layer. In some embodiments, the second layer comprises 20% to 80% by weight of the at least one additive based on the total weight of the second layer. In some embodiments, the second layer comprises 30% to 80% by weight of the at least one additive based on the total weight of the second layer. In some embodiments, the second layer comprises 40% to 80% by weight of the at least one additive based on the total weight of the second layer. In some embodiments, the second layer comprises 50% to 80% by weight of the at least one additive based on the total weight of the second layer.

In some embodiments, the second layer has a thickness of 10 mils to 50 mils. In some embodiments, the second layer has a thickness of 10 mils to 48 mils. In some embodiments, the second layer has a thickness of 10 mils to 46 mils. In some embodiments, the second layer has a thickness of 10 mils to 45 mils. In some embodiments, the second layer has a thickness of 10 mils to mils. In some embodiments, the second layer has a thickness of 10 mils to 44 mils. In some embodiments, the second layer has a thickness of 10 mils to 42 mils. In some embodiments, the second layer has a thickness of 10 mils to 40 mils. In some embodiments, the second layer has a thickness of 10 mils to 38 mils. In some embodiments, the second layer has a thickness of 10 mils to 36 mils. In some embodiments, the second layer has a thickness of 10 mils to 35 mils. In some embodiments, the second layer has a thickness of 10 mils to 34 mils. In some embodiments, the second layer has a thickness of 10 mils to 32 mils. In some embodiments, the second layer has a thickness of 10 mils to 30 mils. In some embodiments, the second layer has a thickness of 10 mils to 28 mils. In some embodiments, the second layer has a thickness of 10 mils to 26 mils. In some embodiments, the second layer has a thickness of 10 mils to 25 mils. In some embodiments, the second layer has a thickness of 10 mils to 24 mils. In some embodiments, the second layer has a thickness of 10 mils to 22 mils. In some embodiments, the second layer has a thickness of 10 mils to 20 mils. In some embodiments, the second layer has a thickness of 10 mils to 18 mils. In some embodiments, the second layer has a thickness of 10 mils to 16 mils. In some embodiments, the second layer has a thickness of 10 mils to 15 mils. In some embodiments, the second layer has a thickness of 10 mils to 14 mils. In some embodiments, the second layer has a thickness of 10 mils to 12 mils.

In some embodiments, the second layer has a thickness of 12 mils to 50 mils. In some embodiments, the second layer has a thickness of 14 mils to 50 mils. In some embodiments, the second layer has a thickness of 15 mils to 50 mils. In some embodiments, the second layer has a thickness of 16 mils to 50 mils. In some embodiments, the second layer has a thickness of 18 mils to 50 mils. In some embodiments, the second layer has a thickness of 20 mils to 50 mils. In some embodiments, the second layer has a thickness of 22 mils to 50 mils. In some embodiments, the second layer has a thickness of 24 mils to 50 mils. In some embodiments, the second layer has a thickness of 25 mils to 50 mils. In some embodiments, the second layer has a thickness of 26 mils to 50 mils. In some embodiments, the second layer has a thickness of 28 mils to 50 mils. In some embodiments, the second layer has a thickness of 30 mils to 50 mils. In some embodiments, the second layer has a thickness of 32 mils to 50 mils. In some embodiments, the second layer has a thickness of 34 mils to 50 mils. In some embodiments, the second layer has a thickness of 35 mils to 50 mils. In some embodiments, the second layer has a thickness of 36 mils to 50 mils. In some embodiments, the second layer has a thickness of 38 mils to 50 mils. In some embodiments, the second layer has a thickness of 40 mils to 50 mils. In some embodiments, the second layer has a thickness of 42 mils to 50 mils. In some embodiments, the second layer has a thickness of 44 mils to 50 mils. In some embodiments, the second layer has a thickness of 45 mils to 50 mils. In some embodiments, the second layer has a thickness of 46 mils to 50 mils. In some embodiments, the second layer has a thickness of 48 mils to 50 mils. In some embodiments, the second layer has a thickness of 20 mils to 40 mils. In some embodiments, the second layer has a thickness of 20 mils to 30 mils. In some embodiments, the second layer has a thickness of 30 mils to 40 mils. In some embodiments, the second layer has a thickness of 15 mils to 40 mils. In some embodiments, the second layer has a thickness of 15 mils to 30 mils.

In some embodiments, the second layer has a second color. In some embodiments, the second layer has a CIELAB color value comprising an L value range of $0 \leq L^* \leq 100$. In some embodiments, the second layer has a CIELAB color value comprising an L value range of $0 \leq L^* \leq 90$. In some embodiments, the second layer has a CIELAB color value comprising an L value range of $0 \leq L^* \leq 80$. In some embodiments, the second layer has a CIELAB color value comprising an L value range of $0 \leq L^* \leq 70$. In some embodiments, the second layer has a CIELAB color value comprising an L value range of $0 \leq L^* \leq 60$. In some embodiments, the second layer has a CIELAB color value comprising an L value range of $0 \leq L^* \leq 50$. In some embodiments, the second layer has a CIELAB color value comprising an L value range of $0 \leq L^* \leq 40$. In some embodiments, the second layer has a CIELAB color value comprising an L value range of $0 \leq L^* \leq 30$. In some embodiments, the second layer has a CIELAB color value comprising an L value range of $0 \leq L^* \leq 20$. In some embodiments, the second layer has a CIELAB color value comprising an L value range of $0 \leq L^* \leq 10$. In some embodiments, the second layer has a CIELAB color value comprising an L value range of $0 \leq L^* \leq 1$.

In some embodiments, the second layer has a CIELAB color value comprising an L value range of $10 \leq L^* \leq 100$. In some embodiments, the second layer has a CIELAB color value comprising an L value range of $20 \leq L^* \leq 100$. In some embodiments, the second layer has a CIELAB color value comprising an L value range of $30 \leq L^* \leq 100$. In some embodiments, the second layer has a CIELAB color value comprising an L value range of $40 \leq L^* \leq 100$. In some embodiments, the second layer has a CIELAB color value comprising an L value range of $50 \leq L^* \leq 100$. In some embodiments, the second layer has a CIELAB color value comprising an L value range of $60 \leq L^* \leq 100$. In some embodiments, the second layer has a CIELAB color value comprising an L value range of $70 \leq L^* \leq 100$. In some embodiments, the second layer has a CIELAB color value comprising an L value range of $80 \leq L^* \leq 100$. In some embodiments, the second layer has a CIELAB color value comprising an L value range of $90 \leq L^* \leq 100$.

In some embodiments, the second layer has a CIELAB color value comprising an L value range of $0 \leq L^* \leq 40$. In some embodiments, the second layer has a CIELAB color value comprising an L value range of $0 \leq L^* \leq 35$. In some embodiments, the second layer has a CIELAB color value comprising an L value range of $0 \leq L^* \leq 30$. In some embodiments, the second layer has a CIELAB color value comprising an L value range of $0 \leq L^* \leq 25$. In some embodiments, the second layer has a CIELAB color value comprising an L value range of $0 \leq L^* \leq 20$. In some embodiments, the second layer has a CIELAB color value comprising an L value range of $0 \leq L^* \leq 15$. In some embodiments, the second layer has a CIELAB color value comprising an L value range of $0 \leq L^* \leq 10$. In some embodiments, the second layer has a CIELAB color value comprising an L value range of $0 \leq L^* \leq 5$. In some embodiments, the second layer has a CIELAB color value comprising an L value range of $0 \leq L^* \leq 4$. In some embodiments, the second layer has a CIELAB color value comprising an L value range of $0 \leq L^* \leq 3$. In some embodiments, the second layer has a CIELAB color value comprising an L value range of $0 \leq L^* \leq 2$. In some embodiments, the second layer has a CIELAB color value comprising an L value range of $0 \leq L^* \leq 1$.

In some embodiments, the second layer has a CIELAB color value comprising an a* value of $-128 \leq a^* \leq 127$. In some embodiments, the second layer has a CIELAB color value comprising an b* value of $-128 \leq b^* \leq 127$.

In some embodiments, the second color of the second layer is different from the first color of the first layer. In some embodiments, the second color of the second layer is same as the first color of the first layer.

In some embodiments, the second layer has a plurality of openings extending through the second layer. For example, in some embodiments, the second layer has a plurality of openings extending through the second layer from a first surface of the second layer to a second surface of the second layer, wherein the second surface of the second layer is opposite the first surface of the second layer. In some embodiments, the second layer has a plurality of openings extending through the second layer, so as to define a plurality of roofing shingle tabs. In some embodiments, for example, the second layer is shaped in a form of a plurality of roofing shingle tabs (e.g., in the form of dragon teeth of a roofing shingle). In some embodiments, the plurality of roofing shingle tabs comprises one tab, two tabs, three tabs, four tabs, five tabs, or six or more tabs. In some embodiments, the plurality of openings extending through the second layer has at least one of a circular shape, an oval shape, an elliptical shape, a rectangular shape, a square shape, a quadrilateral shape, a triangular shape, or any combination thereof. In some embodiments, the second layer does not comprise any openings.

In some embodiments, at least one of the plurality of openings has a dimension in a range of 0.5 mm to 100 mm. In some embodiments, at least one of the plurality of openings has a dimension in a range of 0.5 mm to 95 mm. In some embodiments, at least one of the plurality of openings has a dimension in a range of 0.5 mm to 90 mm. In some embodiments, at least one of the plurality of openings has a dimension in a range of 0.5 mm to 85 mm. In some embodiments, at least one of the plurality of openings has a dimension in a range of 0.5 mm to 80 mm. In some embodiments, at least one of the plurality of openings has a dimension in a range of 0.5 mm to 75 mm. In some embodiments, at least one of the plurality of openings has a dimension in a range of 0.5 mm to 70 mm. In some embodiments, at least one of the plurality of openings has a dimension in a range of 0.5 mm to 65 mm. In some embodiments, at least one of the plurality of openings has a dimension in a range of 0.5 mm to 60 mm. In some embodiments, at least one of the plurality of openings has a dimension in a range of 0.5 mm to 55 mm. In some embodiments, at least one of the plurality of openings has a dimension in a range of 0.5 mm to 50 mm. In some embodiments, at least one of the plurality of openings has a dimension in a range of 0.5 mm to 45 mm. In some embodiments, at least one of the plurality of openings has a dimension in a range of 0.5 mm to 40 mm. In some embodiments, at least one of the plurality of openings has a dimension in a range of 0.5 mm to 35 mm. In some embodiments, at least one of the plurality of openings has a dimension in a range of 0.5 mm to 30 mm. In some embodiments, at least one of the plurality of openings has a dimension in a range of 0.5 mm to 25 mm. In some embodiments, at least one of the plurality of openings has a dimension in a range of 0.5 mm to 20 mm. In some embodiments, at least one of the plurality of openings has a dimension in a range of 0.5 mm to 15 mm. In some embodiments, at least one of the plurality of openings has a dimension in a range of 0.5 mm to 10 mm. In some embodiments, at least one of the plurality of openings has a dimension in a range of 0.5 mm to 5 mm.

In some embodiments, at least one of the plurality of openings has a dimension in a range of 1 mm to 100 mm. In some embodiments, at least one of the plurality of openings has a dimension in a range of 5 mm to 100 mm. In some embodiments, at least one of the plurality of openings has a dimension in a range of 10 mm to 100 mm. In some embodiments, at least one of the plurality of openings has a dimension in a range of 15 mm to 100 mm. In some embodiments, at least one of the plurality of openings has a dimension in a range of 20 mm to 100 mm. In some embodiments, at least one of the plurality of openings has a dimension in a range of 25 mm to 100 mm. In some embodiments, at least one of the plurality of openings has a dimension in a range of 30 mm to 100 mm. In some embodiments, at least one of the plurality of openings has a dimension in a range of 35 mm to 100 mm. In some embodiments, at least one of the plurality of openings has a dimension in a range of 40 mm to 100 mm. In some embodiments, at least one of the plurality of openings has a dimension in a range of 45 mm to 100 mm. In some embodiments, at least one of the plurality of openings has a dimension in a range of 50 mm to 100 mm. In some embodiments, at least one of the plurality of openings has a dimension in a range of 55 mm to 100 mm. In some embodiments, at least one of the plurality of openings has a dimension in a range of 60 mm to 100 mm. In some embodiments, at least one of the plurality of openings has a dimension in a range of 65 mm to 100 mm. In some embodiments, at least one of the plurality of openings has a dimension in a range of 70 mm to 100 mm. In some embodiments, at least one of the plurality of openings has a dimension in a range of 75 mm to 100 mm. In some embodiments, at least one of the plurality of openings has a dimension in a range of 80 mm to 100 mm. In some embodiments, at least one of the plurality of openings has a dimension in a range of 85 mm to 100 mm. In some embodiments, at least one of the plurality of openings has a dimension in a range of 90 mm to 100 mm. In some embodiments, at least one of the plurality of openings has a dimension in a range of 95 mm to 100 mm.

In some embodiments, at least one of the plurality of openings has a dimension in a range of 1 mm to 40 mm. In some embodiments, at least one of the plurality of openings has a dimension in a range of 1 mm to 35 mm. In some embodiments, at least one of the plurality of openings has a dimension in a range of 1 mm to 30 mm. In some embodiments, at least one of the plurality of openings has a dimension in a range of 1 mm to 25 mm. In some embodiments, at least one of the plurality of openings has a dimension in a range of 1 mm to 20 mm. In some embodiments, at least one of the plurality of openings has a dimension in a range of 1 mm to 15 mm. In some embodiments, at least one of the plurality of openings has a dimension in a range of 1 mm to 10 mm. In some embodiments, at least one of the plurality of openings has a dimension in a range of 5 mm to 40 mm. In some embodiments, at least one of the plurality of openings has a dimension in a range of 10 mm to 40 mm. In some embodiments, at least one of the plurality of openings has a dimension in a range of 15 mm to 40 mm. In some embodiments, at least one of the plurality of openings has a dimension in a range of 20 mm to 40 mm. In some embodiments, at least one of the plurality of openings has a dimension in a range of 25 mm to 40 mm. In some embodiments, at least one of the plurality of openings has a dimension in a range of 30 mm to 40 mm. In some embodiments, at least one of the plurality of openings has a dimension in a range of 35 mm to 40 mm. In some embodiments, at least one of the plurality of openings has a dimension in a range of 1 mm to 20 mm. In some embodiments, at least one of the plurality of openings has a dimension in a range of 3 mm to 15 mm.

In some embodiments, at least a portion of a layer of the roofing material is exposed when at least a portion of the layer is not covered. In some embodiments, at least a portion of a layer is exposed when at least a portion of the layer is not covered by another layer of the roofing material. In some embodiments, at least a portion of the layer is exposed when at least a portion of the layer is visible. In some embodiments, at least a portion of the layer is exposed when at least a portion of the layer is not visually obstructed. In some embodiments, at least a portion of the layer is directly exposed to an environment. For example, in some embodiments, at least a portion of the layer is directly exposed to an environment, when at least a portion of the layer is subjected to conditions of an environment (e.g., weather, precipitation, etc.). In some embodiments, at least a portion of the layer is exposed, when at least a portion of the is at least partially visible. For example, in some embodiments, at least a portion of the layer is exposed, when at least one of a clear coating, a transparent coating, a translucent coating, or any combination thereof, covers at least the exposed portion of the layer. In some embodiments, the portion of the layer that is exposed is at least a portion of a surface of the layer.

In some embodiments, at least a portion of the first layer of the roofing material is exposed when at least a portion of the first layer is not covered. In some embodiments, at least a portion of the first layer is exposed when at least a portion of the first layer is not covered by another layer of the roofing material. In some embodiments, at least a portion of the first layer is exposed when at least a portion of the first layer is visible. In some embodiments, at least a portion of the first layer is exposed when at least a portion of the first layer is not visually obstructed. In some embodiments, at least a portion of the first layer is directly exposed to an environment. For example, in some embodiments, at least a portion of the first layer is directly exposed to an environment, when at least a portion of the first layer is subjected to conditions of an environment (e.g., weather, precipitation, etc.). In some embodiments, at least a portion of the first layer is exposed, when at least a portion of the first layer is at least partially visible. For example, in some embodiments, at least a portion of the first layer is exposed, when at least one of a clear coating, a transparent coating, a translucent coating, or any combination thereof, covers at least the exposed portion of the first layer. In some embodiments, the portion of the first layer that is exposed is at least a portion of a surface of the first layer.

In some embodiments, at least a portion of the second layer of the roofing material is exposed when at least a portion of the second layer is not covered. In some embodiments, at least a portion of the second layer is exposed when at least a portion of the second layer is not covered by another layer of the roofing material. In some embodiments, at least a portion of the second layer is exposed when at least a portion of the second layer is visible. In some embodiments, at least a portion of the second layer is exposed when at least a portion of the second layer is not visually obstructed. In some embodiments, at least a portion of the second layer is directly exposed to an environment. For example, in some embodiments, at least a portion of the second layer is directly exposed to an environment, when at least a portion of the second layer is subjected to conditions of an environment (e.g., weather, precipitation, etc.). In some embodiments, at least a portion of the second layer is exposed, when at least a portion of the second layer is at least partially visible. For example, in some embodiments, at least a portion of the second layer is exposed, when at least one of a clear coating, a transparent coating, a translucent coating, or any combination thereof, covers at least the exposed portion of the second layer. In some embodiments, the portion of the second layer that is exposed is at least a portion of a surface of the second layer.

In some embodiments, at least a portion of the third layer of the roofing material is exposed when at least a portion of the third layer is not covered. In some embodiments, at least a portion of the third layer is exposed when at least a portion of the third layer is not covered by another layer of the roofing material. In some embodiments, at least a portion of the third layer is exposed when at least a portion of the third layer is visible. In some embodiments, at least a portion of the third layer is exposed when at least a portion of the third layer is not visually obstructed. In some embodiments, at least a portion of the third layer is directly exposed to an environment. For example, in some embodiments, at least a portion of the third layer is directly exposed to an environment, when at least a portion of the third layer is subjected to conditions of an environment (e.g., weather, precipitation, etc.). In some embodiments, at least a portion of the third layer is exposed, when at least a portion of the third layer is at least partially visible. For example, in some embodiments, at least a portion of the third layer is exposed, when at least one of a clear coating, a transparent coating, a translucent coating, or any combination thereof, covers at least the exposed portion of the third layer. In some embodiments, the portion of the third layer that is exposed is at least a portion of a surface of the third layer.

In some embodiments, at least a portion of the first layer is exposed through the plurality of openings of the second layer. In some embodiments, 10% to 90% of the first layer is exposed through the plurality of openings of the second layer. In some embodiments, 10% to 85% of the first layer is exposed through the plurality of openings of the second layer. In some embodiments, 10% to 80% of the first layer is exposed through the plurality of openings of the second layer. In some embodiments, 10% to 75% of the first layer is exposed through the plurality of openings of the second layer. In some embodiments, 10% to 70% of the first layer is exposed through the plurality of openings of the second layer. In some embodiments, 10% to 65% of the first layer is exposed through the plurality of openings of the second layer. In some embodiments, 10% to 60% of the first layer is exposed through the plurality of openings of the second layer. In some embodiments, 10% to 55% of the first layer is exposed through the plurality of openings of the second layer. In some embodiments, 10% to 50% of the first layer is exposed through the plurality of openings of the second layer. In some embodiments, 10% to 45% of the first layer is exposed through the plurality of openings of the second layer. In some embodiments, 10% to 40% of the first layer is exposed through the plurality of openings of the second layer. In some embodiments, 10% to 35% of the first layer is exposed through the plurality of openings of the second layer. In some embodiments, 10% to 30% of the first layer is exposed through the plurality of openings of the second layer. In some embodiments, 10% to 25% of the first layer is exposed through the plurality of openings of the second layer. In some embodiments, 10% to 20% of the first layer is exposed through the plurality of openings of the second layer. In some embodiments, 10% to 15% of the first layer is exposed through the plurality of openings of the second layer.

In some embodiments, 15% to 90% of the first layer is exposed through the plurality of openings of the second layer. In some embodiments, 20% to 90% of the first layer is exposed through the plurality of openings of the second layer. In some embodiments, 25% to 90% of the first layer is exposed through the plurality of openings of the second layer. In some embodiments, 30% to 90% of the first layer is exposed through the plurality of openings of the second layer. In some embodiments, 35% to 90% of the first layer is exposed through the plurality of openings of the second layer. In some embodiments, 40% to 90% of the first layer is exposed through the plurality of openings of the second layer. In some embodiments, 45% to 90% of the first layer is exposed through the plurality of openings of the second layer. In some embodiments, 50% to 90% of the first layer is exposed through the plurality of openings of the second layer. In some embodiments, 55% to 90% of the first layer is exposed through the plurality of openings of the second layer. In some embodiments, 60% to 90% of the first layer is exposed through the plurality of openings of the second layer. In some embodiments, 65% to 90% of the first layer is exposed through the plurality of openings of the second layer. In some embodiments, 70% to 90% of the first layer is exposed through the plurality of openings of the second layer. In some embodiments, 75% to 90% of the first layer is exposed through the plurality of openings of the second layer. In some embodiments, 80% to 90% of the first layer is exposed through the plurality of openings of the second layer. In some embodiments, 85% to 90% of the first layer is exposed through the plurality of openings of the second layer.

In some embodiments, the second layer comprises a plurality of thermoplastic polymer pieces. In some embodiments, the plurality of thermoplastic polymer pieces has at least one of the following shapes: a rectangular shape, a square shape, a circular shape, an oval shape, an elliptical shape, a quadrilateral shape, a triangular shape, a trapezoidal shape, or any combination thereof. It will be appreciated that the shape(s) of the plurality of thermoplastic polymer pieces is not particular limited and may include shapes other than those disclosed herein, without departing from the scope of this disclosure. In some embodiments, the plurality of thermoplastic polymer pieces of the second layer covers the first layer such that at least a portion of the first layer is exposed.

In some embodiments, the plurality of thermoplastic pieces has at least one dimension in a range of 0.5 mm to 100 mm. In some embodiments, the plurality of thermoplastic pieces has at least one dimension in a range of 0.5 mm to 95 mm. In some embodiments, the plurality of thermoplastic pieces has at least one dimension in a range of 0.5 mm to 90 mm. In some embodiments, the plurality of thermoplastic pieces has at least one dimension in a range of 0.5 mm to 85 mm. In some embodiments, the plurality of thermoplastic pieces has at least one dimension in a range of 0.5 mm to 80 mm. In some embodiments, the plurality of thermoplastic pieces has at least one dimension in a range of 0.5 mm to 75 mm. In some embodiments, the plurality of thermoplastic pieces has at least one dimension in a range of 0.5 mm to 70 mm. In some embodiments, the plurality of thermoplastic pieces has at least one dimension in a range of 0.5 mm to 65 mm. In some embodiments, the plurality of thermoplastic pieces has at least one dimension in a range of 0.5 mm to 60 mm. In some embodiments, the plurality of thermoplastic pieces has at least one dimension in a range of 0.5 mm to 55 mm. In some embodiments, the plurality of thermoplastic pieces has at least one dimension in a range of 0.5 mm to 50 mm. In some embodiments, the plurality of thermoplastic pieces has at least one dimension in a range of 0.5 mm to 45 mm. In some embodiments, the plurality of thermoplastic pieces has at least one dimension in a range of 0.5 mm to 40 mm. In some embodiments, the plurality of thermoplastic pieces has at least one dimension in a range of 0.5 mm to 35 mm. In some embodiments, the plurality of thermoplastic pieces has at least one dimension in a range of 0.5 mm to 30 mm. In some embodiments, the plurality of thermoplastic pieces has at least one dimension in a range of 0.5 mm to 25 mm. In some embodiments, the plurality of thermoplastic pieces has at least one dimension in a range of 0.5 mm to 20 mm. In some embodiments, the plurality of thermoplastic pieces has at least one dimension in a range of 0.5 mm to 15 mm. In some embodiments, the plurality of thermoplastic pieces has at least one dimension in a range of 0.5 mm to 10 mm. In some embodiments, the plurality of thermoplastic pieces has at least one dimension in a range of 0.5 mm to 5 mm.

In some embodiments, the plurality of thermoplastic pieces has at least one dimension in a range of 1 mm to 100 mm. In some embodiments, the plurality of thermoplastic pieces has at least one dimension in a range of 5 mm to 100 mm. In some embodiments, the plurality of thermoplastic pieces has at least one dimension in a range of 10 mm to 100 mm. In some embodiments, the plurality of thermoplastic pieces has at least one dimension in a range of 15 mm to 100 mm. In some embodiments, the plurality of thermoplastic pieces has at least one dimension in a range of 20 mm to 100 mm. In some embodiments, the plurality of thermoplastic pieces has at least one dimension in a range of 25 mm to 100 mm. In some embodiments, the plurality of thermoplastic pieces has at least one dimension in a range of 30 mm to 100 mm. In some embodiments, the plurality of thermoplastic pieces has at least one dimension in a range of 35 mm to 100 mm. In some embodiments, the plurality of thermoplastic pieces has at least one dimension in a range of 40 mm to 100 mm. In some embodiments, the plurality of thermoplastic pieces has at least one dimension in a range of 45 mm to 100 mm. In some embodiments, the plurality of thermoplastic pieces has at least one dimension in a range of 50 mm to 100 mm. In some embodiments, the plurality of thermoplastic pieces has at least one dimension in a range of 55 mm to 100 mm. In some embodiments, the plurality of thermoplastic pieces has at least one dimension in a range of 60 mm to 100 mm. In some embodiments, the plurality of thermoplastic pieces has at least one dimension in a range of 65 mm to 100 mm. In some embodiments, the plurality of thermoplastic pieces has at least one dimension in a range of 70 mm to 100 mm. In some embodiments, the plurality of thermoplastic pieces has at least one dimension in a range of 75 mm to 100 mm. In some embodiments, the plurality of thermoplastic pieces has at least one dimension in a range of 80 mm to 100 mm. In some embodiments, the plurality of thermoplastic pieces has at least one dimension in a range of 85 mm to 100 mm. In some embodiments, the plurality of thermoplastic pieces has at least one dimension in a range of 90 mm to 100 mm. In some embodiments, the plurality of thermoplastic pieces has at least one dimension in a range of 95 mm to 100 mm.

In some embodiments, the plurality of thermoplastic pieces has at least one dimension in a range of 1 mm to 40 mm. In some embodiments, the plurality of thermoplastic pieces has at least one dimension in a range of 1 mm to 35 mm. In some embodiments, the plurality of thermoplastic pieces has at least one dimension in a range of 1 mm to 30 mm. In some embodiments, the plurality of thermoplastic pieces has at least one dimension in a range of 1 mm to 25 mm. In some embodiments, the plurality of thermoplastic pieces has at least one dimension in a range of 1 mm to 20 mm. In some embodiments, the plurality of thermoplastic pieces has at least one dimension in a range of 1 mm to 15 mm. In some embodiments, the plurality of thermoplastic pieces has at least one dimension in a range of 1 mm to 10 mm. In some embodiments, the plurality of thermoplastic pieces has at least one dimension in a range of 5 mm to 40 mm. In some embodiments, the plurality of thermoplastic pieces has at least one dimension in a range of 10 mm to 40 mm. In some embodiments, the plurality of thermoplastic pieces has at least one dimension in a range of 15 mm to 40 mm. In some embodiments, the plurality of thermoplastic pieces has at least one dimension in a range of 20 mm to 40 mm. In some embodiments, the plurality of thermoplastic pieces has at least one dimension in a range of 25 mm to 40 mm. In some embodiments, the plurality of thermoplastic pieces has at least one dimension in a range of 30 mm to 40 mm. In some embodiments, the plurality of thermoplastic pieces has at least one dimension in a range of 35 mm to 40 mm. In some embodiments, the plurality of thermoplastic pieces has at least one dimension in a range of 1 mm to 20 mm. In some embodiments, the plurality of thermoplastic pieces has at least one dimension in a range of 3 mm to 15 mm.

In some embodiments, the second layer covers 10% to 90% of the first layer. In some embodiments, the second layer covers 10% to 85% of the first layer. In some embodiments, the second layer covers 10% to 80% of the first layer. In some embodiments, the second layer covers 10% to 75% of the first layer. In some embodiments, the second layer covers 10% to 70% of the first layer. In some embodiments, the second layer covers 10% to 65% of the first layer. In some embodiments, the second layer covers 10% to 60% of the first layer. In some embodiments, the second layer covers 10% to 55% of the first layer. In some embodiments, the second layer covers 10% to 50% of the first layer. In some embodiments, the second layer covers 10% to 45% of the first layer. In some embodiments, the second layer covers 10% to 40% of the first layer. In some embodiments, the second layer covers 10% to 35% of the first layer. In some embodiments, the second layer covers 10% to 30% of the first layer. In some embodiments, the second layer covers 10% to 25% of the first layer. In some embodiments, the second layer covers 10% to 20% of the first layer. In some embodiments, the second layer covers 10% to 15% of the first layer.

In some embodiments, the second layer covers 15% to 90% of the first layer. In some embodiments, the second layer covers 20% to 90% of the first layer. In some embodiments, the second layer covers 25% to 90% of the first layer. In some embodiments, the second layer covers 30% to 90% of the first layer. In some embodiments, the second layer covers 35% to 90% of the first layer. In some embodiments, the second layer covers 40% to 90% of the first layer. In some embodiments, the second layer covers 45% to 90% of the first layer. In some embodiments, the second layer covers 50% to 90% of the first layer. In some embodiments, the second layer covers 55% to 90% of the first layer. In some embodiments, the second layer covers 60% to 90% of the first layer. In some embodiments, the second layer covers 65% to 90% of the first layer. In some embodiments, the second layer covers 70% to 90% of the first layer. In some embodiments, the second layer covers 75% to 90% of the first layer. In some embodiments, the second layer covers 80% to 90% of the first layer. In some embodiments, the second layer covers 85% to 90% of the first layer.

In some embodiments, the roofing material comprises a third layer on the second layer. In some embodiments, the third layer is different from the second layer. In some embodiments, the third layer is different from the first layer.

In some embodiments, the third layer comprises at least one polymer. In some embodiments, the at least one polymer comprises at least one thermoplastic polymer. In some embodiments, the at least one polymer comprises at least one thermoplastic polyolefin (TPO). In some embodiments, the at least one polymer comprises at least one of polyethylene, polypropylene, any copolymer thereof, any homopolymer thereof, any polymer blend thereof, or any combination thereof. In some embodiments, the thermoplastic polyolefin comprises at least one of a copolymer of propylene and ethylene, a blend of propylene and ethylene, a copolymer of ethylene alpha-olefin, a propylene homopolymer, an ethylene homopolymer, a propylene block copolymer, an ethylene block copolymer, a propylene elastomer, an ethylene elastomer, or any combination thereof. In some embodiments, the thermoplastic polymer comprises at least one of a copolymer comprising ethylene and octene, a copolymer comprising ethylene and hexane, a copolymer comprising ethylene and butene, polyethylene (including raw and/or recycled low density polyethylene (LDPE)), linear low density polyethylene (LLDPE), high density polyethylene (HDPE)), polypropylenes (e.g., isotactic polypropylene (IPP) and/or atactic polypropylene (APP/IPP)), amorphous polyalpha olefins (APAO), amorphous polyolefins (APO), or any combination thereof. In some embodiments, the at least one polymer comprises polyethylene terephthalate (PET). In some embodiments, the at least one polymer comprises an acrylic polymer, such as, for example, polymethyl methacrylate. In some embodiments, the at least one polymer comprises ethylene tetrafluoroethylene (ETFE). In some embodiments, the at least one polymer of the third layer is the same as the at least one polymer of the first layer. In some embodiments, the at least one polymer of the third layer is the same as the at least one polymer of the second layer.

Examples of the at least one polymer include, for example and without limitation, at least one of Vistamaxx® 6102, Vistamaxx® 8880, both of which are polypropylenes (e.g., isotactic polypropylene (IPP)) that are available from ExxonMobil, Irving, Tex.; Elvalay®, which is a terpolymer that is available from Dow/DuPont, Wilmington, Del.; Fusabond®, which is a chemically modified ethylene acrylate copolymer and/or a modified polyethylene, that is available from Dow/DuPont, Wilmington, Del.; RT2304, which is an amorphous polyalpha olefin (APAO) that is available from Rextac APAO Polymers LLC, Odessa, Tex.; Eastoflex® P1023, which is an amorphous polyolefin (APO) that comprises a propylene homopolymer, and is available from Eastman Chemical Company, Kingsport, Tenn.; Eastoflex® E1060, which is an amorphous polyolefin (APO) that comprises a copolymer of propylene and ethylene, and is available from Eastman Chemical Company, Kingsport, Tenn.; Eastoflex® M1025, which is an amorphous polyolefin (APO) that comprises a blend of propylene homopolymer and copolymers of propylene and ethylene, and is available from Eastman Chemical Company, Kingsport, Tenn.; Engage® 7487, which is a polyolefin elastomer (POE) that is available from Dow Inc., Midland, Mich., or any combination thereof.

In some embodiments, the third layer comprises 10% to 90% by weight of the at least one polymer based on a total weight of the third layer. In some embodiments, the third layer comprises 10% to 85% by weight of the at least one polymer based on the total weight of the third layer. In some embodiments, the third layer comprises 10% to 80% by weight of the at least one polymer based on the total weight of the third layer. In some embodiments, the third layer comprises 10% to 75% by weight of the at least one polymer based on the total weight of the third layer. In some embodiments, the third layer comprises 10% to 70% by weight of the at least one polymer based on the total weight of the third layer. In some embodiments, the third layer comprises 10% to 65% by weight of the at least one polymer based on the total weight of the third layer. In some embodiments, the third layer comprises 10% to 60% by weight of the at least one polymer based on the total weight of the third layer. In some embodiments, the third layer comprises 10% to 55% by weight of the at least one polymer based on the total weight of the third layer. In some embodiments, the third layer comprises 10% to 50% by weight of the at least one polymer based on the total weight of the third layer. In some embodiments, the third layer comprises 10% to 45% by weight of the at least one polymer based on the total weight of the third layer. In some embodiments, the third layer comprises 10% to 40% by weight of the at least one polymer based on the total weight of the third layer. In some embodiments, the third layer comprises 10% to 35% by weight of the at least one polymer based on the total weight of the third layer. In some embodiments, the third layer comprises 10% to 30% by weight of the at least one polymer based on the total weight of the third layer. In some embodiments, the third layer comprises 10% to 25% by weight of the at least one polymer based on the total weight of the third layer. In some embodiments, the third layer comprises 10% to 20% by weight of the at least one polymer based on the total weight of the third layer. In some embodiments, the third layer comprises 10% to 15% by weight of the at least one polymer based on the total weight of the third layer.

In some embodiments, the third layer comprises 15% to 90% by weight of the at least one polymer based on the total weight of the third layer. In some embodiments, the third layer comprises 20% to 90% by weight of the at least one polymer based on the total weight of the third layer. In some embodiments, the third layer comprises 25% to 90% by weight of the at least one polymer based on the total weight of the third layer. In some embodiments, the third layer comprises 30% to 90% by weight of the at least one polymer based on the total weight of the third layer. In some embodiments, the third layer comprises 35% to 90% by weight of the at least one polymer based on the total weight of the third layer. In some embodiments, the third layer comprises 40% to 90% by weight of the at least one polymer based on the total weight of the third layer. In some embodiments, the third layer comprises 45% to 90% by weight of the at least one polymer based on the total weight of the third layer. In some embodiments, the third layer comprises 50% to 90% by weight of the at least one polymer based on the total weight of the third layer. In some embodiments, the third layer comprises 55% to 90% by weight of the at least one polymer based on the total weight of the third layer. In some embodiments, the third layer comprises 60% to 90% by weight of the at least one polymer based on the total weight of the third layer. In some embodiments, the third layer comprises 65% to 90% by weight of the at least one polymer based on the total weight of the third layer. In some embodiments, the third layer comprises 70% to 90% by weight of the at least one polymer based on the total weight of the third layer. In some embodiments, the third layer comprises 75% to 90% by weight of the at least one polymer based on the total weight of the third layer. In some embodiments, the third layer comprises 80% to 90% by weight of the at least one polymer based on the total weight of the third layer. In some embodiments, the third layer comprises 85% to 90% by weight of the at least one polymer based on the total weight of the third layer.

In some embodiments, the third layer comprises 20% to 90% by weight of the at least one polymer based on the total weight of the third layer. In some embodiments, the third layer comprises 20% to 80% by weight of the at least one polymer based on the total weight of the third layer. In some embodiments, the third layer comprises 20% to 70% by weight of the at least one polymer based on the total weight of the third layer. In some embodiments, the third layer comprises 30% to 90% by weight of the at least one polymer based on the total weight of the third layer. In some embodiments, the third layer comprises 30% to 80% by weight of the at least one polymer based on the total weight of the third layer. In some embodiments, the third layer comprises 30% to 70% by weight of the at least one polymer based on the total weight of the third layer. In some embodiments, the third layer comprises 40% to 90% by weight of the at least one polymer based on the total weight of the third layer. In some embodiments, the third layer comprises 40% to 80% by weight of the at least one polymer based on the total weight of the third layer. In some embodiments, the third layer comprises 40% to 70% by weight of the at least one polymer based on the total weight of the third layer. In some embodiments, the third layer comprises 40% to 60% by weight of the at least one polymer based on the total weight of the third layer. In some embodiments, the third layer comprises 20% to 80% by weight of the at least one polymer based on the total weight of the third layer. In some embodiments, the third layer comprises 30% to 80% by weight of the at least one polymer based on the total weight of the third layer. In some embodiments, the third layer comprises 40% to 80% by weight of the at least one polymer based on the total weight of the third layer. In some embodiments, the third layer comprises 50% to 80% by weight of the at least one polymer based on the total weight of the third layer.

In some embodiments, the third layer comprises at least one additive. In some embodiments, the at least one additive comprises at least one filler. In some embodiments, the at least one filler comprises at least one of limestone, glass, calcium carbonate, barium sulfate, calcium sulfate, talc, perlite, silica, fumed silica, precipitated silica, quartz, aluminum trihydrate, magnesium hydroxide, ammonium polyphosphate, colemanite, titanium dioxide, calcium sulfate, fly ash, graphene nanoparticles, carbon black, recycled materials (e.g., such as one or more of recycled rubber tires, recycled shingles, recycled thermoplastic resins), basalt, roofing granules, graphite, clay, or any combination thereof. In some embodiments, the at least one additive comprises at least one of group stabilizers, antioxidants, nucleating agents, colorants, pigments, dyes, coloring agents, mold release agents, dispersing agents, UV light absorbers, flame retardants, mold release agents, anti-static agents, or any combination thereof.

In some embodiments, the third layer comprises at least one colorant. In some embodiments, the at least one colorant comprises at least one dye. In some embodiments, the colorant comprises at least one pigment. In some embodiments, the third layer comprises at least one coloring agent. In some embodiments, the at least one colorant comprises at least one of infrared reflective pigments, infrared reflective dyes, phosphorescence pigments, phosphorescence dyes, fluorescence pigments, fluorescence dyes, color pigments, color dyes, reflective pigments, reflective dyes, or any combination thereof. In some embodiments, the at least one pigment comprises at least one of metallic pigments, metallic powders such as aluminum, heavy metal-based pigments, heavy-metal free pigments, organic pigments, or any combination thereof. In some embodiments, the at least one pigment comprises at least one of carbon black, titanium dioxide, chromium oxide, chromium iron oxide, titanium oxide, magnesium oxide, magnesium hydroxide, zinc oxide, calcium carbonate, black iron oxide, red iron oxide, yellow iron oxide, green iron oxide, mixed metal oxides, bismuth vanadate, phthalocyanine blue, phthalocyanine green, quinacridone reds, anthraquinone, perylene reds, polyazos, or any combination thereof.

An example of a metallic pigment includes, without limitation, Polybatch White P8555 SD, which is available from A. Schulman Inc. and which is identified as a white color concentrate having a coated rutile titanium dioxide concentration of 50% by weight in a propylene homopolymer carrier resin; Ampacet 110235, which is a white pigmented polyethylene concentrate available from the Ampacet Corporation; and Ampacet 110868. Examples of black pigments include, without limitation, various carbon blacks and organic concentrates, such as Ampacet 190303, which is a black pigmented polyethylene resin concentrate; and Ampacet 190671A, which is another black pigmented resin concentrate from Ampacet Corporation. In some embodiments, the pigments include a gray color obtained by mixing white pigment and black pigment to achieve a desired shade of gray. Examples of a commercially available gray concentrate include, without limitation, Ampacet 190697 and Ampacet 190870. Examples of organic pigment concentrates include, without limitation, Ampacet 150623, a red pigmented polyethylene resin concentrate; Ampacet 150380, a red pigment concentrate; Ampacet 150703 Red PE MB; Ampacet 150623 Red UV PE MB; Ampacet 130283 Yellow UV PE MB; Ampacet 140085 Orange PE MB; Ampacet Dark Green 170560; Ampacet Olympic Blue 160972; and Ampacet Sapphire Blue 160904. An example of a heavy metal containing pigment includes, without limitation, Ampacet LP20631 Orange PE MB which is identified as a lead molybdate/lead chromate pigment concentrate.

In some embodiments, the third layer does not comprise the at least one additive. In some embodiments, the third layer does not comprise at least one of the at least one additives.

In some embodiments, the third layer comprises 10% to 90% by weight of the at least one additive based on the total weight of the third layer. In some embodiments, the third layer comprises 10% to 85% by weight of the at least one additive based on the total weight of the third layer. In some embodiments, the third layer comprises 10% to 80% by weight of the at least one additive based on the total weight of the third layer. In some embodiments, the third layer comprises 10% to 75% by weight of the at least one additive based on the total weight of the third layer. In some embodiments, the third layer comprises 10% to 70% by weight of the at least one additive based on the total weight of the third layer. In some embodiments, the third layer comprises 10% to 65% by weight of the at least one additive based on the total weight of the third layer. In some embodiments, the third layer comprises 10% to 60% by weight of the at least one additive based on the total weight of the third layer. In some embodiments, the third layer comprises 10% to 55% by weight of the at least one additive based on the total weight of the third layer. In some embodiments, the third layer comprises 10% to 50% by weight of the at least one additive based on the total weight of the third layer. In some embodiments, the third layer comprises 10% to 45% by weight of the at least one additive based on the total weight of the third layer. In some embodiments, the third layer comprises 10% to 40% by weight of the at least one additive based on the total weight of the third layer. In some embodiments, the third layer comprises 10% to 35% by weight of the at least one additive based on the total weight of the third layer. In some embodiments, the third layer comprises 10% to 30% by weight of the at least one additive based on the total weight of the third layer. In some embodiments, the third layer comprises 10% to 25% by weight of the at least one additive based on the total weight of the third layer. In some embodiments, the third layer comprises 10% to 20% by weight of the at least one additive based on the total weight of the third layer. In some embodiments, the third layer comprises 10% to 15% by weight of the at least one additive based on the total weight of the third layer.

In some embodiments, the third layer comprises 15% to 90% by weight of the at least one additive based on the total weight of the third layer. In some embodiments, the third layer comprises 20% to 90% by weight of the at least one additive based on the total weight of the third layer. In some embodiments, the third layer comprises 25% to 90% by weight of the at least one additive based on the total weight of the third layer. In some embodiments, the third layer comprises 30% to 90% by weight of the at least one additive based on the total weight of the third layer. In some embodiments, the third layer comprises 35% to 90% by weight of the at least one additive based on the total weight of the third layer. In some embodiments, the third layer comprises 40% to 90% by weight of the at least one additive based on the total weight of the third layer. In some embodiments, the third layer comprises 45% to 90% by weight of the at least one additive based on the total weight of the third layer. In some embodiments, the third layer comprises 50% to 90% by weight of the at least one additive based on the total weight of the third layer. In some embodiments, the third layer comprises 55% to 90% by weight of the at least one additive based on the total weight of the third layer. In some embodiments, the third layer comprises 60% to 90% by weight of the at least one additive based on the total weight of the third layer. In some embodiments, the third layer comprises 65% to 90% by weight of the at least one additive based on the total weight of the third layer. In some embodiments, the third layer comprises 70% to 90% by weight of the at least one additive based on the total weight of the third layer. In some embodiments, the third layer comprises 75% to 90% by weight of the at least one additive based on the total weight of the third layer. In some embodiments, the third layer comprises 80% to 90% by weight of the at least one additive based on the total weight of the third layer. In some embodiments, the third layer comprises 85% to 90% by weight of the at least one additive based on the total weight of the third layer.

In some embodiments, the third layer comprises 20% to 90% by weight of the at least one additive based on the total weight of the third layer. In some embodiments, the third layer comprises 20% to 80% by weight of the at least one additive based on the total weight of the third layer. In some embodiments, the third layer comprises 20% to 70% by weight of the at least one additive based on the total weight of the third layer. In some embodiments, the third layer comprises 30% to 90% by weight of the at least one additive based on the total weight of the third layer. In some embodiments, the third layer comprises 30% to 80% by weight of the at least one additive based on the total weight of the third layer. In some embodiments, the third layer comprises 30% to 70% by weight of the at least one additive based on the total weight of the third layer. In some embodiments, the third layer comprises 40% to 90% by weight of the at least one additive based on the total weight of the third layer. In some embodiments, the third layer comprises 40% to 80% by weight of the at least one additive based on the total weight of the third layer. In some embodiments, the third layer comprises 40% to 70% by weight of the at least one additive based on the total weight of the third layer. In some embodiments, the third layer comprises 40% to 60% by weight of the at least one additive based on the total weight of the third layer. In some embodiments, the third layer comprises 20% to 80% by weight of the at least one additive based on the total weight of the third layer. In some embodiments, the third layer comprises 30% to 80% by weight of the at least one additive based on the total weight of the third layer. In some embodiments, the third layer comprises 40% to 80% by weight of the at least one additive based on the total weight of the third layer. In some embodiments, the third layer comprises 50% to 80% by weight of the at least one additive based on the total weight of the third layer.

In some embodiments, the third layer has a thickness of 10 mils to 50 mils. In some embodiments, the third layer has a thickness of 10 mils to 48 mils. In some embodiments, the third layer has a thickness of 10 mils to 46 mils. In some embodiments, the third layer has a thickness of 10 mils to 45 mils. In some embodiments, the third layer has a thickness of 10 mils to mils. In some embodiments, the third layer has a thickness of 10 mils to 44 mils. In some embodiments, the third layer has a thickness of 10 mils to 42 mils. In some embodiments, the third layer has a thickness of 10 mils to 40 mils. In some embodiments, the third layer has a thickness of 10 mils to 38 mils. In some embodiments, the third layer has a thickness of 10 mils to 36 mils. In some embodiments, the third layer has a thickness of 10 mils to 35 mils. In some embodiments, the third layer has a thickness of 10 mils to 34 mils. In some embodiments, the third layer has a thickness of 10 mils to 32 mils. In some embodiments, the third layer has a thickness of 10 mils to 30 mils. In some embodiments, the third layer has a thickness of 10 mils to 28 mils. In some embodiments, the third layer has a thickness of 10 mils to 26 mils. In some embodiments, the third layer has a thickness of 10 mils to 25 mils. In some embodiments, the third layer has a thickness of 10 mils to 24 mils. In some embodiments, the third layer has a thickness of 10 mils to 22 mils. In some embodiments, the third layer has a thickness of 10 mils to 20 mils. In some embodiments, the third layer has a thickness of 10 mils to 18 mils. In some embodiments, the third layer has a thickness of 10 mils to 16 mils. In some embodiments, the third layer has a thickness of 10 mils to 15 mils. In some embodiments, the third layer has a thickness of 10 mils to 14 mils. In some embodiments, the third layer has a thickness of 10 mils to 12 mils.

In some embodiments, the third layer has a thickness of 12 mils to 50 mils. In some embodiments, the third layer has a thickness of 14 mils to 50 mils. In some embodiments, the third layer has a thickness of 15 mils to 50 mils. In some embodiments, the third layer has a thickness of 16 mils to 50 mils. In some embodiments, the third layer has a thickness of 18 mils to 50 mils. In some embodiments, the third layer has a thickness of 20 mils to 50 mils. In some embodiments, the third layer has a thickness of 22 mils to 50 mils. In some embodiments, the third layer has a thickness of 24 mils to 50 mils. In some embodiments, the third layer has a thickness of 25 mils to 50 mils. In some embodiments, the third layer has a thickness of 26 mils to 50 mils. In some embodiments, the third layer has a thickness of 28 mils to 50 mils. In some embodiments, the third layer has a thickness of 30 mils to 50 mils. In some embodiments, the third layer has a thickness of 32 mils to 50 mils. In some embodiments, the third layer has a thickness of 34 mils to 50 mils. In some embodiments, the third layer has a thickness of 35 mils to 50 mils. In some embodiments, the third layer has a thickness of 36 mils to 50 mils. In some embodiments, the third layer has a thickness of 38 mils to 50 mils. In some embodiments, the third layer has a thickness of 40 mils to 50 mils. In some embodiments, the third layer has a thickness of 42 mils to 50 mils. In some embodiments, the third layer has a thickness of 44 mils to 50 mils. In some embodiments, the third layer has a thickness of 45 mils to 50 mils. In some embodiments, the third layer has a thickness of 46 mils to 50 mils. In some embodiments, the third layer has a thickness of 48 mils to 50 mils. In some embodiments, the third layer has a thickness of 20 mils to 40 mils. In some embodiments, the third layer has a thickness of 20 mils to 30 mils. In some embodiments, the third layer has a thickness of 30 mils to 40 mils. In some embodiments, the third layer has a thickness of 15 mils to 40 mils. In some embodiments, the third layer has a thickness of 15 mils to 30 mils.

In some embodiments, the third layer has a third color. In some embodiments, the third layer has a CIELAB color value comprising an L value range of $0 \leq L^* \leq 100$. In some embodiments, the third layer has a CIELAB color value comprising an L value range of $0 \leq L^* \leq 90$. In some embodiments, the third layer has a CIELAB color value comprising an L value range of $0 \leq L^* \leq 80$. In some embodiments, the third layer has a CIELAB color value comprising an L value range of $0 \leq L^* \leq 70$. In some embodiments, the third layer has a CIELAB color value comprising an L value range of $0 \leq L^* \leq 60$. In some embodiments, the third layer has a CIELAB color value comprising an L value range of $0 \leq L^* \leq 50$. In some embodiments, the third layer has a CIELAB color value comprising an L value range of $0 \leq L^* \leq 40$. In some embodiments, the third layer has a CIELAB color value comprising an L value range of $0 \leq L^* \leq 30$. In some embodiments, the third layer has a CIELAB color value comprising an L value range of $0 \leq L^* \leq 20$. In some embodiments, the third layer has a CIELAB color value comprising an L value range of $0 \leq L^* \leq 10$. In some embodiments, the third layer has a CIELAB color value comprising an L value range of $0 \leq L^* \leq 1$.

In some embodiments, the third layer has a CIELAB color value comprising an L value range of $10 \leq L^* \leq 100$. In some embodiments, the third layer has a CIELAB color value comprising an L value range of $20 \leq L^* \leq 100$. In some embodiments, the third layer has a CIELAB color value comprising an L value range of $30 \leq L^* \leq 100$. In some embodiments, the third layer has a CIELAB color value comprising an L value range of $40 \leq L^* \leq 100$. In some embodiments, the third layer has a CIELAB color value comprising an L value range of $50 \leq L^* \leq 100$. In some embodiments, the third layer has a CIELAB color value comprising an L value range of $60 \leq L^* \leq 100$. In some embodiments, the third layer has a CIELAB color value comprising an L value range of $70 \leq L^* \leq 100$. In some embodiments, the third layer has a CIELAB color value comprising an L value range of $80 \leq L^* \leq 100$. In some embodiments, the third layer has a CIELAB color value comprising an L value range of $90 \leq L^* \leq 100$.

In some embodiments, the third layer has a CIELAB color value comprising an L value range of $0 \leq L^* \leq 40$. In some embodiments, the third layer has a CIELAB color value comprising an L value range of $0 \leq L^* \leq 35$. In some embodiments, the third layer has a CIELAB color value comprising an L value range of $0 \leq L^* \leq 30$. In some embodiments, the third layer has a CIELAB color value comprising an L value range of $0 \leq L^* \leq 25$. In some embodiments, the third layer has a CIELAB color value comprising an L value range of $0 \leq L^* \leq 20$. In some embodiments, the third layer has a CIELAB color value comprising an L value range of $0 \leq L^* \leq 15$. In some embodiments, the third layer has a CIELAB color value comprising an L value range of $0 \leq L^* \leq 10$. In some embodiments, the third layer has a CIELAB color value comprising an L value range of $0 \leq L^* \leq 5$. In some embodiments, the third layer has a CIELAB color value comprising an L value range of $0 \leq L^* \leq 4$. In some embodiments, the third layer has a CIELAB color value comprising an L value range of $0 \leq L^* \leq 3$. In some embodiments, the third layer has a CIELAB color value comprising an L value range of $0 \leq L^* \leq 2$. In some embodiments, the third layer has a CIELAB color value comprising an L value range of $0 \leq L^* \leq 1$.

In some embodiments, the third layer has a CIELAB color value comprising an a* value of $-128 \leq a^* \leq 127$. In some embodiments, the third layer has a CIELAB color value comprising an b* value of $-128 \leq b^* \leq 127$.

In some embodiments, the third color of the third layer is different from the second color of the second layer. In some embodiments, the third color of the third layer is different from the first color of the first layer. In some embodiments, the third color of the third layer is same as the second color of the second layer. In some embodiments, the third color of the third layer is same as the first color of the first layer. In some embodiments, the first color is blue, black, or gray. In some embodiments, the second color is blue, black, or gray. In some embodiments, the third color is blue, black, or gray.

In some embodiments, the third layer has a plurality of openings extending through the third layer. For example, in some embodiments, the third layer has a plurality of openings extending through the third layer from a first surface of the third layer to a second surface of the third layer, wherein the second surface of the third layer is opposite the first surface of the third layer. In some embodiments, the third layer has a plurality of openings extending through the third layer, so as to define a plurality of roofing shingle tabs. In some embodiments, for example, the third layer is shaped in a form of a plurality of roofing shingle tabs (e.g., in the form of dragon teeth of a roofing shingle). In some embodiments, the plurality of roofing shingle tabs comprises one tab, two tabs, three tabs, four tabs, five tabs, or six or more tabs. In some embodiments, the plurality of openings extending through the third layer has at least one of a circular shape, an oval shape, an elliptical shape, a rectangular shape, a square shape, a quadrilateral shape, a triangular shape, or any combination thereof. In some embodiments, the third layer does not comprise any openings.

In some embodiments, at least one of the plurality of openings has a dimension in a range of 0.5 mm to 100 mm. In some embodiments, at least one of the plurality of openings has a dimension in a range of 0.5 mm to 95 mm. In some embodiments, at least one of the plurality of openings has a dimension in a range of 0.5 mm to 90 mm. In some embodiments, at least one of the plurality of openings has a dimension in a range of 0.5 mm to 85 mm. In some embodiments, at least one of the plurality of openings has a dimension in a range of 0.5 mm to 80 mm. In some embodiments, at least one of the plurality of openings has a dimension in a range of 0.5 mm to 75 mm. In some embodiments, at least one of the plurality of openings has a dimension in a range of 0.5 mm to 70 mm. In some embodiments, at least one of the plurality of openings has a dimension in a range of 0.5 mm to 65 mm. In some embodiments, at least one of the plurality of openings has a dimension in a range of 0.5 mm to 60 mm. In some embodiments, at least one of the plurality of openings has a dimension in a range of 0.5 mm to 55 mm. In some embodiments, at least one of the plurality of openings has a dimension in a range of 0.5 mm to 50 mm. In some embodiments, at least one of the plurality of openings has a dimension in a range of 0.5 mm to 45 mm. In some embodiments, at least one of the plurality of openings has a dimension in a range of 0.5 mm to 40 mm. In some embodiments, at least one of the plurality of openings has a dimension in a range of 0.5 mm to 35 mm. In some embodiments, at least one of the plurality of openings has a dimension in a range of 0.5 mm to 30 mm. In some embodiments, at least one of the plurality of openings has a dimension in a range of 0.5 mm to 25 mm. In some embodiments, at least one of the plurality of openings has a dimension in a range of 0.5 mm to 20 mm. In some embodiments, at least one of the plurality of openings has a dimension in a range of 0.5 mm to 15 mm. In some embodiments, at least one of the plurality of openings has a dimension in a range of 0.5 mm to 10 mm. In some embodiments, at least one of the plurality of openings has a dimension in a range of 0.5 mm to 5 mm.

In some embodiments, at least one of the plurality of openings has a dimension in a range of 1 mm to 100 mm. In some embodiments, at least one of the plurality of openings has a dimension in a range of 5 mm to 100 mm. In some embodiments, at least one of the plurality of openings has a dimension in a range of 10 mm to 100 mm. In some embodiments, at least one of the plurality of openings has a dimension in a range of 15 mm to 100 mm. In some embodiments, at least one of the plurality of openings has a dimension in a range of 20 mm to 100 mm. In some embodiments, at least one of the plurality of openings has a dimension in a range of 25 mm to 100 mm. In some embodiments, at least one of the plurality of openings has a dimension in a range of 30 mm to 100 mm. In some embodiments, at least one of the plurality of openings has a dimension in a range of 35 mm to 100 mm. In some embodiments, at least one of the plurality of openings has a dimension in a range of 40 mm to 100 mm. In some embodiments, at least one of the plurality of openings has a dimension in a range of 45 mm to 100 mm. In some embodiments, at least one of the plurality of openings has a dimension in a range of 50 mm to 100 mm. In some embodiments, at least one of the plurality of openings has a dimension in a range of 55 mm to 100 mm. In some embodiments, at least one of the plurality of openings has a dimension in a range of 60 mm to 100 mm. In some embodiments, at least one of the plurality of openings has a dimension in a range of 65 mm to 100 mm. In some embodiments, at least one of the plurality of openings has a dimension in a range of 70 mm to 100 mm. In some embodiments, at least one of the plurality of openings has a dimension in a range of 75 mm to 100 mm. In some embodiments, at least one of the plurality of openings has a dimension in a range of 80 mm to 100 mm. In some embodiments, at least one of the plurality of openings has a dimension in a range of 85 mm to 100 mm. In some embodiments, at least one of the plurality of openings has a dimension in a range of 90 mm to 100 mm. In some embodiments, at least one of the plurality of openings has a dimension in a range of 95 mm to 100 mm.

In some embodiments, at least one of the plurality of openings has a dimension in a range of 1 mm to 40 mm. In some embodiments, at least one of the plurality of openings has a dimension in a range of 1 mm to 35 mm. In some embodiments, at least one of the plurality of openings has a dimension in a range of 1 mm to 30 mm. In some embodiments, at least one of the plurality of openings has a dimension in a range of 1 mm to 25 mm. In some embodiments, at least one of the plurality of openings has a dimension in a range of 1 mm to 20 mm. In some embodiments, at least one of the plurality of openings has a dimension in a range of 1 mm to 15 mm. In some embodiments, at least one of the plurality of openings has a dimension in a range of 1 mm to 10 mm. In some embodiments, at least one of the plurality of openings has a dimension in a range of 5 mm to 40 mm. In some embodiments, at least one of the plurality of openings has a dimension in a range of 10 mm to 40 mm. In some embodiments, at least one of the plurality of openings has a dimension in a range of 15 mm to 40 mm. In some embodiments, at least one of the plurality of openings has a dimension in a range of 20 mm to 40 mm. In some embodiments, at least one of the plurality of openings has a dimension in a range of 25 mm to 40 mm. In some embodiments, at least one of the plurality of openings has a dimension in a range of 30 mm to 40 mm. In some embodiments, at least one of the plurality of openings has a dimension in a range of 35 mm to 40 mm. In some embodiments, at least one of the plurality of openings has a dimension in a range of 1 mm to 20 mm. In some embodiments, at least one of the plurality of openings has a dimension in a range of 3 mm to 15 mm.

In some embodiments, at least a portion of the first layer is exposed through the plurality of openings of the third layer. In some embodiments, 10% to 90% of the first layer is exposed through the plurality of openings of the third layer. In some embodiments, 10% to 85% of the first layer is exposed through the plurality of openings of the third layer. In some embodiments, 10% to 80% of the first layer is exposed through the plurality of openings of the third layer. In some embodiments, 10% to 75% of the first layer is exposed through the plurality of openings of the third layer. In some embodiments, 10% to 70% of the first layer is exposed through the plurality of openings of the third layer. In some embodiments, 10% to 65% of the first layer is exposed through the plurality of openings of the third layer. In some embodiments, 10% to 60% of the first layer is exposed through the plurality of openings of the third layer. In some embodiments, 10% to 55% of the first layer is exposed through the plurality of openings of the third layer. In some embodiments, 10% to 50% of the first layer is exposed through the plurality of openings of the third layer. In some embodiments, 10% to 45% of the first layer is exposed through the plurality of openings of the third layer. In some embodiments, 10% to 40% of the first layer is exposed through the plurality of openings of the third layer. In some embodiments, 10% to 35% of the first layer is exposed through the plurality of openings of the third layer. In some embodiments, 10% to 30% of the first layer is exposed through the plurality of openings of the third layer. In some embodiments, 10% to 25% of the first layer is exposed through the plurality of openings of the third layer. In some embodiments, 10% to 20% of the first layer is exposed through the plurality of openings of the third layer. In some embodiments, 10% to 15% of the first layer is exposed through the plurality of openings of the third layer.

In some embodiments, 15% to 90% of the first layer is exposed through the plurality of openings of the third layer. In some embodiments, 20% to 90% of the first layer is exposed through the plurality of openings of the third layer. In some embodiments, 25% to 90% of the first layer is exposed through the plurality of openings of the third layer. In some embodiments, 30% to 90% of the first layer is exposed through the plurality of openings of the third layer. In some embodiments, 35% to 90% of the first layer is exposed through the plurality of openings of the third layer. In some embodiments, 40% to 90% of the first layer is exposed through the plurality of openings of the third layer. In some embodiments, 45% to 90% of the first layer is exposed through the plurality of openings of the third layer. In some embodiments, 50% to 90% of the first layer is exposed through the plurality of openings of the third layer. In some embodiments, 55% to 90% of the first layer is exposed through the plurality of openings of the third layer. In some embodiments, 60% to 90% of the first layer is exposed through the plurality of openings of the third layer. In some embodiments, 65% to 90% of the first layer is exposed through the plurality of openings of the third layer. In some embodiments, 70% to 90% of the first layer is exposed through the plurality of openings of the third layer. In some embodiments, 75% to 90% of the first layer is exposed through the plurality of openings of the third layer. In some embodiments, 80% to 90% of the first layer is exposed through the plurality of openings of the third layer. In some embodiments, 85% to 90% of the first layer is exposed through the plurality of openings of the third layer.

In some embodiments, at least a portion of the second layer is exposed through the plurality of openings of the third layer. In some embodiments, 10% to 90% of the second layer is exposed through the plurality of openings of the third layer. In some embodiments, 10% to 85% of the second layer is exposed through the plurality of openings of the third layer. In some embodiments, 10% to 80% of the second layer is exposed through the plurality of openings of the third layer. In some embodiments, 10% to 75% of the second layer is exposed through the plurality of openings of the third layer. In some embodiments, 10% to 70% of the second layer is exposed through the plurality of openings of the third layer. In some embodiments, 10% to 65% of the second layer is exposed through the plurality of openings of the third layer. In some embodiments, 10% to 60% of the second layer is exposed through the plurality of openings of the third layer. In some embodiments, 10% to 55% of the second layer is exposed through the plurality of openings of the third layer. In some embodiments, 10% to 50% of the second layer is exposed through the plurality of openings of the third layer. In some embodiments, 10% to 45% of the second layer is exposed through the plurality of openings of the third layer. In some embodiments, 10% to 40% of the second layer is exposed through the plurality of openings of the third layer. In some embodiments, 10% to 35% of the second layer is exposed through the plurality of openings of the third layer. In some embodiments, 10% to 30% of the second layer is exposed through the plurality of openings of the third layer. In some embodiments, 10% to 25% of the second layer is exposed through the plurality of openings of the third layer. In some embodiments, 10% to 20% of the second layer is exposed through the plurality of openings of the third layer. In some embodiments, 10% to 15% of the second layer is exposed through the plurality of openings of the third layer.

In some embodiments, 15% to 90% of the second layer is exposed through the plurality of openings of the third layer. In some embodiments, 20% to 90% of the second layer is exposed through the plurality of openings of the third layer. In some embodiments, 25% to 90% of the second layer is exposed through the plurality of openings of the third layer. In some embodiments, 30% to 90% of the second layer is exposed through the plurality of openings of the third layer. In some embodiments, 35% to 90% of the second layer is exposed through the plurality of openings of the third layer. In some embodiments, 40% to 90% of the second layer is exposed through the plurality of openings of the third layer. In some embodiments, 45% to 90% of the second layer is exposed through the plurality of openings of the third layer. In some embodiments, 50% to 90% of the second layer is exposed through the plurality of openings of the third layer. In some embodiments, 55% to 90% of the second layer is exposed through the plurality of openings of the third layer. In some embodiments, 60% to 90% of the second layer is exposed through the plurality of openings of the third layer. In some embodiments, 65% to 90% of the second layer is exposed through the plurality of openings of the third layer. In some embodiments, 70% to 90% of the second layer is exposed through the plurality of openings of the third layer. In some embodiments, 75% to 90% of the second layer is exposed through the plurality of openings of the third layer. In some embodiments, 80% to 90% of the second layer is exposed through the plurality of openings of the third layer. In some embodiments, 85% to 90% of the second layer is exposed through the plurality of openings of the third layer.

In some embodiments, the third layer comprises a plurality of thermoplastic polymer pieces. In some embodiments, the plurality of thermoplastic polymer pieces has at least one of the following shapes: a rectangular shape, a square shape, a circular shape, an oval shape, an elliptical shape, a quadrilateral shape, a triangular shape, a trapezoidal shape, or any combination thereof. It will be appreciated that the shape(s) of the plurality of thermoplastic polymer pieces is not particular limited and may include shapes other than those disclosed herein, without departing from the scope of this disclosure. In some embodiments, the plurality of thermoplastic polymer pieces of the third layer covers the first layer such that at least a portion of the first layer is exposed. In some embodiments, the plurality of thermoplastic polymer pieces of the third layer covers the second layer such that at least a portion of the second layer is exposed.

In some embodiments, the plurality of thermoplastic pieces has at least one dimension in a range of 0.5 mm to 100 mm. In some embodiments, the plurality of thermoplastic pieces has at least one dimension in a range of 0.5 mm to 95 mm. In some embodiments, the plurality of thermoplastic pieces has at least one dimension in a range of 0.5 mm to 90 mm. In some embodiments, the plurality of thermoplastic pieces has at least one dimension in a range of 0.5 mm to 85 mm. In some embodiments, the plurality of thermoplastic pieces has at least one dimension in a range of 0.5 mm to 80 mm. In some embodiments, the plurality of thermoplastic pieces has at least one dimension in a range of 0.5 mm to 75 mm. In some embodiments, the plurality of thermoplastic pieces has at least one dimension in a range of 0.5 mm to 70 mm. In some embodiments, the plurality of thermoplastic pieces has at least one dimension in a range of 0.5 mm to 65 mm. In some embodiments, the plurality of thermoplastic pieces has at least one dimension in a range of 0.5 mm to 60 mm. In some embodiments, the plurality of thermoplastic pieces has at least one dimension in a range of 0.5 mm to 55 mm. In some embodiments, the plurality of thermoplastic pieces has at least one dimension in a range of 0.5 mm to 50 mm. In some embodiments, the plurality of thermoplastic pieces has at least one dimension in a range of 0.5 mm to 45 mm. In some embodiments, the plurality of thermoplastic pieces has at least one dimension in a range of 0.5 mm to 40 mm. In some embodiments, the plurality of thermoplastic pieces has at least one dimension in a range of 0.5 mm to 35 mm. In some embodiments, the plurality of thermoplastic pieces has at least one dimension in a range of 0.5 mm to 30 mm. In some embodiments, the plurality of thermoplastic pieces has at least one dimension in a range of 0.5 mm to 25 mm. In some embodiments, the plurality of thermoplastic pieces has at least one dimension in a range of 0.5 mm to 20 mm. In some embodiments, the plurality of thermoplastic pieces has at least one dimension in a range of 0.5 mm to 15 mm. In some embodiments, the plurality of thermoplastic pieces has at least one dimension in a range of 0.5 mm to 10 mm. In some embodiments, the plurality of thermoplastic pieces has at least one dimension in a range of 0.5 mm to 5 mm.

In some embodiments, the plurality of thermoplastic pieces has at least one dimension in a range of 1 mm to 100 mm. In some embodiments, the plurality of thermoplastic pieces has at least one dimension in a range of 5 mm to 100 mm. In some embodiments, the plurality of thermoplastic pieces has at least one dimension in a range of 10 mm to 100 mm. In some embodiments, the plurality of thermoplastic pieces has at least one dimension in a range of 15 mm to 100 mm. In some embodiments, the plurality of thermoplastic pieces has at least one dimension in a range of 20 mm to 100 mm. In some embodiments, the plurality of thermoplastic pieces has at least one dimension in a range of 25 mm to 100 mm. In some embodiments, the plurality of thermoplastic pieces has at least one dimension in a range of 30 mm to 100 mm. In some embodiments, the plurality of thermoplastic pieces has at least one dimension in a range of 35 mm to 100 mm. In some embodiments, the plurality of thermoplastic pieces has at least one dimension in a range of 40 mm to 100 mm. In some embodiments, the plurality of thermoplastic pieces has at least one dimension in a range of 45 mm to 100 mm. In some embodiments, the plurality of thermoplastic pieces has at least one dimension in a range of 50 mm to 100 mm. In some embodiments, the plurality of thermoplastic pieces has at least one dimension in a range of 55 mm to 100 mm. In some embodiments, the plurality of thermoplastic pieces has at least one dimension in a range of 60 mm to 100 mm. In some embodiments, the plurality of thermoplastic pieces has at least one dimension in a range of 65 mm to 100 mm. In some embodiments, the plurality of thermoplastic pieces has at least one dimension in a range of 70 mm to 100 mm. In some embodiments, the plurality of thermoplastic pieces has at least one dimension in a range of 75 mm to 100 mm. In some embodiments, the plurality of thermoplastic pieces has at least one dimension in a range of 80 mm to 100 mm. In some embodiments, the plurality of thermoplastic pieces has at least one dimension in a range of 85 mm to 100 mm. In some embodiments, the plurality of thermoplastic pieces has at least one dimension in a range of 90 mm to 100 mm. In some embodiments, the plurality of thermoplastic pieces has at least one dimension in a range of 95 mm to 100 mm.

In some embodiments, the plurality of thermoplastic pieces has at least one dimension in a range of 1 mm to 40 mm. In some embodiments, the plurality of thermoplastic pieces has at least one dimension in a range of 1 mm to 35 mm. In some embodiments, the plurality of thermoplastic pieces has at least one dimension in a range of 1 mm to 30 mm. In some embodiments, the plurality of thermoplastic pieces has at least one dimension in a range of 1 mm to 25 mm. In some embodiments, the plurality of thermoplastic pieces has at least one dimension in a range of 1 mm to 20 mm. In some embodiments, the plurality of thermoplastic pieces has at least one dimension in a range of 1 mm to 15 mm. In some embodiments, the plurality of thermoplastic pieces has at least one dimension in a range of 1 mm to 10 mm. In some embodiments, the plurality of thermoplastic pieces has at least one dimension in a range of 5 mm to 40 mm. In some embodiments, the plurality of thermoplastic pieces has at least one dimension in a range of 10 mm to 40 mm. In some embodiments, the plurality of thermoplastic pieces has at least one dimension in a range of 15 mm to 40 mm. In some embodiments, the plurality of thermoplastic pieces has at least one dimension in a range of 20 mm to 40 mm. In some embodiments, the plurality of thermoplastic pieces has at least one dimension in a range of 25 mm to 40 mm. In some embodiments, the plurality of thermoplastic pieces has at least one dimension in a range of 30 mm to 40 mm. In some embodiments, the plurality of thermoplastic pieces has at least one dimension in a range of 35 mm to 40 mm. In some embodiments, the plurality of thermoplastic pieces has at least one dimension in a range of 1 mm to 20 mm. In some embodiments, the plurality of thermoplastic pieces has at least one dimension in a range of 3 mm to 15 mm.

In some embodiments, the third layer covers 10% to 90% of the first layer. In some embodiments, the third layer covers 10% to 85% of the first layer. In some embodiments, the third layer covers 10% to 80% of the first layer. In some embodiments, the third layer covers 10% to 75% of the first layer. In some embodiments, the third layer covers 10% to 70% of the first layer. In some embodiments, the third layer covers 10% to 65% of the first layer. In some embodiments, the third layer covers 10% to 60% of the first layer. In some embodiments, the third layer covers 10% to 55% of the first layer. In some embodiments, the third layer covers 10% to 50% of the first layer. In some embodiments, the third layer covers 10% to 45% of the first layer. In some embodiments, the third layer covers 10% to 40% of the first layer. In some embodiments, the third layer covers 10% to 35% of the first layer. In some embodiments, the third layer covers 10% to 30% of the first layer. In some embodiments, the third layer covers 10% to 25% of the first layer. In some embodiments, the third layer covers 10% to 20% of the first layer. In some embodiments, the third layer covers 10% to 15% of the first layer.

In some embodiments, the third layer covers 15% to 90% of the first layer. In some embodiments, the third layer covers 20% to 90% of the first layer. In some embodiments, the third layer covers 25% to 90% of the first layer. In some embodiments, the third layer covers 30% to 90% of the first layer. In some embodiments, the third layer covers 35% to 90% of the first layer. In some embodiments, the third layer covers 40% to 90% of the first layer. In some embodiments, the third layer covers 45% to 90% of the first layer. In some embodiments, the third layer covers 50% to 90% of the first layer. In some embodiments, the third layer covers 55% to 90% of the first layer. In some embodiments, the third layer covers 60% to 90% of the first layer. In some embodiments, the third layer covers 65% to 90% of the first layer. In some embodiments, the third layer covers 70% to 90% of the first layer. In some embodiments, the third layer covers 75% to 90% of the first layer. In some embodiments, the third layer covers 80% to 90% of the first layer. In some embodiments, the third layer covers 85% to 90% of the first layer.

In some embodiments, the third layer covers 10% to 90% of the second layer. In some embodiments, the third layer covers 10% to 85% of the second layer. In some embodiments, the third layer covers 10% to 80% of the second layer. In some embodiments, the third layer covers 10% to 75% of the second layer. In some embodiments, the third layer covers 10% to 70% of the second layer. In some embodiments, the third layer covers 10% to 65% of the second layer. In some embodiments, the third layer covers 10% to 60% of the second layer. In some embodiments, the third layer covers 10% to 55% of the second layer. In some embodiments, the third layer covers 10% to 50% of the second layer. In some embodiments, the third layer covers 10% to 45% of the second layer. In some embodiments, the third layer covers 10% to 40% of the second layer. In some embodiments, the third layer covers 10% to 35% of the second layer. In some embodiments, the third layer covers 10% to 30% of the second layer. In some embodiments, the third layer covers 10% to 25% of the second layer. In some embodiments, the third layer covers 10% to 20% of the second layer. In some embodiments, the third layer covers 10% to 15% of the second layer.

In some embodiments, the third layer covers 15% to 90% of the second layer. In some embodiments, the third layer covers 20% to 90% of the second layer. In some embodiments, the third layer covers 25% to 90% of the second layer. In some embodiments, the third layer covers 30% to 90% of the second layer. In some embodiments, the third layer covers 35% to 90% of the second layer. In some embodiments, the third layer covers 40% to 90% of the second layer. In some embodiments, the third layer covers 45% to 90% of the second layer. In some embodiments, the third layer covers 50% to 90% of the second layer. In some embodiments, the third layer covers 55% to 90% of the second layer. In some embodiments, the third layer covers 60% to 90% of the second layer. In some embodiments, the third layer covers 65% to 90% of the second layer. In some embodiments, the third layer covers 70% to 90% of the second layer. In some embodiments, the third layer covers 75% to 90% of the second layer. In some embodiments, the third layer covers 80% to 90% of the second layer. In some embodiments, the third layer covers 85% to 90% of the second layer.

In some embodiments, the roofing material comprises at least one adhesive layer.

In some embodiments, the adhesive layer comprises at least one of a hot melt adhesive, a solvent-based adhesive, a pressure sensitive adhesive, a water-based adhesive, a UV cured or curable polymer, or any combination thereof. In some embodiments, the adhesive layer comprises at least one of thermosetting polyolefin, thermoplastic polyolefin (TPO), polyvinyl butyrate, silicone, polycarbonate, butyl rubber, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a hydrocarbon resin, a rosin resin, a natural wax, a petroleum wax, an oil, bitumen, a solvent, vinyl acetate, an acrylic polymers, an acrylic copolymer, (e.g., at least one of vinyl acetate acrylic, ethylene vinyl acetate, styrene acrylic, vinyl chloride acrylic, vinyl versatate, or any combination thereof), or any combination thereof. In some embodiments, the adhesive layer covers a portion of another layer. For example, in some embodiments, the adhesive layer comprises a plurality of adhesive islands.

In some embodiments, the adhesive layer has a thickness of 0.2 mm to 2 mm. In some embodiments, the adhesive layer has a thickness of 0.2 mm to 1.5 mm. In some embodiments, the adhesive layer has a thickness of 0.2 mm to 1 mm. In some embodiments, the adhesive layer has a thickness of 0.2 mm to 0.5 mm. In some embodiments, the adhesive layer has a thickness of 0.5 mm to 2 mm. In some embodiments, the adhesive layer has a thickness of 0.5 mm to 1.5 mm. In some embodiments, the adhesive layer has a thickness of 0.5 mm to 1 mm. In some embodiments, the adhesive layer has a thickness of 1 mm to 2 mm. In some embodiments, the adhesive layer has a thickness of 1 mm to 1.5 mm. In some embodiments, the adhesive layer has a thickness of 1.5 mm to 2 mm.

In some embodiments, the adhesive layer has a thickness of 0.2 mm. In some embodiments, the adhesive layer has a thickness of 0.3 mm. In some embodiments, the adhesive layer has a thickness of 0.4 mm. In some embodiments, the adhesive layer has a thickness of 0.45 mm. In some embodiments, the adhesive layer has a thickness of 0.5 mm. In some embodiments, the adhesive layer has a thickness of 1 mm. In some embodiments, the adhesive layer has a thickness of 1.5 mm. In some embodiments, the adhesive layer has a thickness of 2 mm. In some embodiments, the adhesive layer has a thickness of 2.5 mm. In some embodiments, the adhesive layer has a thickness of 3 mm. In some embodiments, the adhesive layer has a thickness of 3.5 mm. In some embodiments, the adhesive layer has a thickness of 4 mm.

In another embodiment, the adhesive layer has a thickness of 1 μm to 900 μm. In some embodiments, the adhesive layer has a thickness of 1 μm to 900 μm. In some embodiments, the adhesive layer has a thickness of 1 μm to 850 μm. In some embodiments, the adhesive layer has a thickness of 1 μm to 800 μm. In some embodiments, the adhesive layer has a thickness of 1 μm to 750 μm. In some embodiments, the adhesive layer has a thickness of 1 μm to 700 μm. In some embodiments, the adhesive layer has a thickness of 1 μm to 650 μm. In some embodiments, the adhesive layer has a thickness of 1 μm to 600 μm. In some embodiments, the adhesive layer has a thickness of 1 μm to 550 μm. In some embodiments, the adhesive layer has a thickness of 1 μm to 500 μm. In some embodiments, the adhesive layer has a thickness of 1 μm to 450 μm. In some embodiments, the adhesive layer has a thickness of 1 μm to 400 μm. In some embodiments, the adhesive layer has a thickness of 1 μm to 350 μm. In some embodiments, the adhesive layer has a thickness of 1 μm to 300 μm. In some embodiments, the adhesive layer has a thickness of 1 μm to 250 μm. In some embodiments, the adhesive layer has a thickness of 1 μm to 200 μm. In some embodiments, the adhesive layer has a thickness of 1 μm to 150 μm. In some embodiments, the adhesive layer has a thickness of 1 μm to 100 μm. In some embodiments, the adhesive layer has a thickness of 1 μm to 50 μm.

In some embodiments, the adhesive layer has a thickness of 50 μm to 900 μm. In some embodiments, the adhesive layer has a thickness of 50 μm to 850 μm. In some embodiments, the adhesive layer has a thickness of 50 μm to 800 μm. In some embodiments, the adhesive layer has a thickness of 50 μm to 750 μm. In some embodiments, the adhesive layer has a thickness of 50 μm to 700 μm. In some embodiments, the adhesive layer has a thickness of 50 μm to 650 μm. In some embodiments, the adhesive layer has a thickness of 50 μm to 600 μm. In some embodiments, the adhesive layer has a thickness of 50 μm to 550 μm. In some embodiments, the adhesive layer has a thickness of 50 μm to 500 μm. In some embodiments, the adhesive layer has a thickness of 50 μm to 450 μm. In some embodiments, the adhesive layer has a thickness of 50 μm to 400 μm. In some embodiments, the adhesive layer has a thickness of 50 μm to 350 μm. In some embodiments, the adhesive layer has a thickness of 50 μm to 300 μm. In some embodiments, the adhesive layer has a thickness of 50 μm to 250 μm. In some embodiments, the adhesive layer has a thickness of 50 μm to 200 μm. In some embodiments, the adhesive layer has a thickness of 50 μm to 150 μm. In some embodiments, the adhesive layer has a thickness of 50 μm to 100 μm.

In some embodiments, the adhesive layer has a thickness of 100 μm to 900 μm. In some embodiments, the adhesive layer has a thickness of 100 μm to 850 μm. In some embodiments, the adhesive layer has a thickness of 100 μm to 800 μm. In some embodiments, the adhesive layer has a thickness of 100 μm to 750 μm. In some embodiments, the adhesive layer has a thickness of 100 μm to 700 μm. In some embodiments, the adhesive layer has a thickness of 100 μm to 650 μm. In some embodiments, the adhesive layer has a thickness of 100 μm to 600 μm. In some embodiments, the adhesive layer has a thickness of 100 μm to 550 μm. In some embodiments, the adhesive layer has a thickness of 100 μm to 500 μm. In some embodiments, the adhesive layer has a thickness of 100 μm to 450 μm. In some embodiments, the adhesive layer has a thickness of 100 μm to 400 μm. In some embodiments, the adhesive layer has a thickness of 100 μm to 350 μm. In some embodiments, the adhesive layer has a thickness of 100 μm to 300 μm. In some embodiments, the adhesive layer has a thickness of 100 μm to 250 μm. In some embodiments, the adhesive layer has a thickness of 100 μm to 200 μm. In some embodiments, the adhesive layer has a thickness of 100 μm to 150 μm.

In some embodiments, the adhesive layer has a thickness of 150 μm to 900 μm. In some embodiments, the adhesive layer has a thickness of 150 μm to 850 μm. In some embodiments, the adhesive layer has a thickness of 150 μm to 800 μm. In some embodiments, the adhesive layer has a thickness of 150 μm to 750 μm. In some embodiments, the adhesive layer has a thickness of 150 μm to 700 μm. In some embodiments, the adhesive layer has a thickness of 150 μm to 650 μm. In some embodiments, the adhesive layer has a thickness of 150 μm to 600 μm. In some embodiments, the adhesive layer has a thickness of 150 μm to 550 μm. In some embodiments, the adhesive layer has a thickness of 150 μm to 500 μm. In some embodiments, the adhesive layer has a thickness of 150 μm to 450 μm. In some embodiments, the adhesive layer has a thickness of 150 μm to 400 μm. In some embodiments, the adhesive layer has a thickness of 150 μm to 350 μm. In some embodiments, the adhesive layer has a thickness of 150 μm to 300 μm. In some embodiments, the adhesive layer has a thickness of 150 μm to 250 μm. In some embodiments, the adhesive layer has a thickness of 150 μm to 200 μm.

In some embodiments, the adhesive layer has a thickness of 200 μm to 900 μm. In some embodiments, the adhesive layer has a thickness of 200 μm to 850 μm. In some embodiments, the adhesive layer has a thickness of 200 μm to 800 μm. In some embodiments, the adhesive layer has a thickness of 200 μm to 750 μm. In some embodiments, the adhesive layer has a thickness of 200 μm to 700 μm. In some embodiments, the adhesive layer has a thickness of 200 μm to 650 μm. In some embodiments, the adhesive layer has a thickness of 200 μm to 600 μm. In some embodiments, the adhesive layer has a thickness of 200 μm to 550 μm. In some embodiments, the adhesive layer has a thickness of 200 μm to 500 μm. In some embodiments, the adhesive layer has a thickness of 200 μm to 450 μm. In some embodiments, the adhesive layer has a thickness of 200 μm to 400 μm. In some embodiments, the adhesive layer has a thickness of 200 μm to 350 μm. In some embodiments, the adhesive layer has a thickness of 200 μm to 300 μm. In some embodiments, the adhesive layer has a thickness of 200 μm to 250 μm.

In some embodiments, the adhesive layer has a thickness of 250 μm to 900 μm. In some embodiments, the adhesive layer has a thickness of 250 μm to 850 μm. In some embodiments, the adhesive layer has a thickness of 250 μm to 800 μm. In some embodiments, the adhesive layer has a thickness of 250 μm to 750 μm. In some embodiments, the adhesive layer has a thickness of 250 μm to 700 μm. In some embodiments, the adhesive layer has a thickness of 250 μm to 650 μm. In some embodiments, the adhesive layer has a thickness of 250 μm to 600 μm. In some embodiments, the adhesive layer has a thickness of 250 μm to 550 μm. In some embodiments, the adhesive layer has a thickness of 250 μm to 500 μm. In some embodiments, the adhesive layer has a thickness of 250 μm to 450 μm. In some embodiments, the adhesive layer has a thickness of 250 μm to 400 μm. In some embodiments, the adhesive layer has a thickness of 250 μm to 350 μm. In some embodiments, the adhesive layer has a thickness of 250 μm to 300 μm.

In some embodiments, the adhesive layer has a thickness of 300 μm to 900 μm. In some embodiments, the adhesive layer has a thickness of 300 μm to 850 μm. In some embodiments, the adhesive layer has a thickness of 300 μm to 800 μm. In some embodiments, the adhesive layer has a thickness of 300 μm to 750 μm. In some embodiments, the adhesive layer has a thickness of 300 μm to 700 μm. In some embodiments, the adhesive layer has a thickness of 300 μm to 650 μm. In some embodiments, the adhesive layer has a thickness of 300 μm to 600 μm. In some embodiments, the adhesive layer has a thickness of 300 μm to 550 μm. In some embodiments, the adhesive layer has a thickness of 300 μm to 500 μm. In some embodiments, the adhesive layer has a thickness of 300 μm to 450 μm. In some embodiments, the adhesive layer has a thickness of 300 μm to 400 μm. In some embodiments, the adhesive layer has a thickness of 300 μm to 350 μm.

In some embodiments, the adhesive layer has a thickness of 350 μm to 900 μm. In some embodiments, the adhesive layer has a thickness of 350 μm to 850 μm. In some embodiments, the adhesive layer has a thickness of 350 µm to 800 µm. In some embodiments, the adhesive layer has a thickness of 350 µm to 750 µm. In some embodiments, the adhesive layer has a thickness of 350 µm to 700 µm. In some embodiments, the adhesive layer has a thickness of 350 µm to 650 µm. In some embodiments, the adhesive layer has a thickness of 350 µm to 600 µm. In some embodiments, the adhesive layer has a thickness of 350 µm to 550 µm. In some embodiments, the adhesive layer has a thickness of 350 µm to 500 µm. In some embodiments, the adhesive layer has a thickness of 350 µm to 450 µm. In some embodiments, the adhesive layer has a thickness of 350 µm to 400 µm.

In some embodiments, the adhesive layer has a thickness of 400 µm to 900 µm. In some embodiments, the adhesive layer has a thickness of 400 µm to 850 µm. In some embodiments, the adhesive layer has a thickness of 400 µm to 800 µm. In some embodiments, the adhesive layer has a thickness of 400 µm to 750 µm. In some embodiments, the adhesive layer has a thickness of 400 µm to 700 µm. In some embodiments, the adhesive layer has a thickness of 400 µm to 650 µm. In some embodiments, the adhesive layer has a thickness of 400 µm to 600 µm. In some embodiments, the adhesive layer has a thickness of 400 µm to 550 µm. In some embodiments, the adhesive layer has a thickness of 400 µm to 500 µm. In some embodiments, the adhesive layer has a thickness of 400 µm to 450 µm.

In some embodiments, the adhesive layer has a thickness of 450 µm to 900 µm. In some embodiments, the adhesive layer has a thickness of 450 µm to 850 µm. In some embodiments, the adhesive layer has a thickness of 450 µm to 800 µm. In some embodiments, the adhesive layer has a thickness of 450 µm to 750 µm. In some embodiments, the adhesive layer has a thickness of 450 µm to 700 µm. In some embodiments, the adhesive layer has a thickness of 450 µm to 650 µm. In some embodiments, the adhesive layer has a thickness of 450 µm to 600 µm. In some embodiments, the adhesive layer has a thickness of 450 µm to 550 µm. In some embodiments, the adhesive layer has a thickness of 450 µm to 500 µm.

In some embodiments, the adhesive layer has a thickness of 500 µm to 900 µm. In some embodiments, the adhesive layer has a thickness of 500 µm to 850 µm. In some embodiments, the adhesive layer has a thickness of 500 µm to 800 µm. In some embodiments, the adhesive layer has a thickness of 500 µm to 750 µm. In some embodiments, the adhesive layer has a thickness of 500 µm to 700 µm. In some embodiments, the adhesive layer has a thickness of 500 µm to 650 µm. In some embodiments, the adhesive layer has a thickness of 500 µm to 600 µm. In some embodiments, the adhesive layer has a thickness of 500 µm to 550 µm.

In some embodiments, the adhesive layer has a thickness of 550 µm to 900 µm. In some embodiments, the adhesive layer has a thickness of 550 µm to 850 µm. In some embodiments, the adhesive layer has a thickness of 550 µm to 800 µm. In some embodiments, the adhesive layer has a thickness of 550 µm to 750 µm. In some embodiments, the adhesive layer has a thickness of 550 µm to 700 µm. In some embodiments, the adhesive layer has a thickness of 550 µm to 650 µm. In some embodiments, the adhesive layer has a thickness of 550 µm to 600 µm.

In some embodiments, the adhesive layer has a thickness of 600 µm to 900 µm. In some embodiments, the adhesive layer has a thickness of 600 µm to 850 µm. In some embodiments, the adhesive layer has a thickness of 600 µm to 800 µm. In some embodiments, the adhesive layer has a thickness of 600 µm to 750 µm. In some embodiments, the adhesive layer has a thickness of 600 µm to 700 µm. In some embodiments, the adhesive layer has a thickness of 600 µm to 650 µm.

In some embodiments, the adhesive layer has a thickness of 650 µm to 900 µm. In some embodiments, the adhesive layer has a thickness of 650 µm to 850 µm. In some embodiments, the adhesive layer has a thickness of 650 µm to 800 µm. In some embodiments, the adhesive layer has a thickness of 650 µm to 750 µm. In some embodiments, the adhesive layer has a thickness of 650 µm to 700 µm. In some embodiments, the adhesive layer has a thickness of 700 µm to 900 µm. In some embodiments, the adhesive layer has a thickness of 700 µm to 850 µm. In some embodiments, the adhesive layer has a thickness of 700 µm to 800 µm. In some embodiments, the adhesive layer has a thickness of 700 µm to 750 µm. In some embodiments, the adhesive layer has a thickness of 750 µm to 900 µm. In some embodiments, the adhesive layer has a thickness of 750 µm to 850 µm. In some embodiments, the adhesive layer has a thickness of 750 µm to 800 µm. In some embodiments, the adhesive layer has a thickness of 800 µm to 900 µm. In some embodiments, the adhesive layer has a thickness of 800 µm to 850 µm. In some embodiments, the adhesive layer has a thickness of 850 µm to 900 µm.

In some embodiments, the adhesive layer has a thickness of 1 µm. In some embodiments, the adhesive layer has a thickness of 50 µm. In some embodiments, the adhesive layer has a thickness of 100 µm. In some embodiments, the adhesive layer has a thickness of 1 µm. In some embodiments, the adhesive layer has a thickness of 150 µm. In some embodiments, the adhesive layer has a thickness of 200 µm. In some embodiments, the adhesive layer has a thickness of 250 µm. In some embodiments, the adhesive layer has a thickness of 300 µm. In some embodiments, the adhesive layer has a thickness of 350 µm. In some embodiments, the adhesive layer has a thickness of 400 µm. In some embodiments, the adhesive layer has a thickness of 450 µm. In some embodiments, the adhesive layer has a thickness of 500 µm. In some embodiments, the adhesive layer has a thickness of 550 µm. In some embodiments, the adhesive layer has a thickness of 600 µm. In some embodiments, the adhesive layer has a thickness of 650 µm. In some embodiments, the adhesive layer has a thickness of 700 µm. In some embodiments, the adhesive layer has a thickness of 750 µm. In some embodiments, the adhesive layer has a thickness of 800 µm. In some embodiments, the adhesive layer has a thickness of 850 µm. In some embodiments, the adhesive layer has a thickness of 900 µm.

In some embodiments, the roofing material comprises at least one of the first layer, the second layer, the third layer, the adhesive layer, or any combination thereof. That is, in some embodiments, the roofing material is a single layer. In some embodiments, the roofing material comprises two layers. In some embodiments, the roofing material comprises three layers. In some embodiments, the roofing material comprises more than three layers. It will be appreciated that, in embodiments in which the roofing material has more than three layers, the disclosure herein with respect to the first layer, the second layer, and the third layer may be used for other layers, such as, for example and without limitation, a fourth layer, a fifth layer, a sixth layer, a seventh layer, an eighth layer, a ninth layer, a tenth layer, and so on. In some embodiments, the roofing material further comprises a release liner. In some embodiments, the release liner is adhered to at least one of the adhesive layers. In some embodiments, the roofing material does not comprise an adhesive layer.

In some embodiments, the roofing material comprises a first layer. In some embodiments, the roofing material comprises a second layer on the first layer. In some embodiments, the roofing material comprises a third layer on the second layer. In some embodiments, the roofing material comprises a fourth layer on the third layer. In some embodiments, the roofing material comprises a fifth layer on the fourth layer. In some embodiments, the roofing material comprises a sixth layer on the fifth layer. In some embodiments, the roofing material comprises a seventh layer on the sixth layer. In some embodiments, the roofing material comprises an eighth layer on the seventh layer. In some embodiments, the roofing material comprises a ninth layer on the eighth layer. In some embodiments, the roofing material comprises a tenth layer on the ninth layer.

In some embodiments, the roofing material comprises a second layer on the first layer. In some embodiments, the second layer is located above the first layer. In some embodiments, the second layer directly contacts the first layer. In some embodiments, the second layer is attached to the first layer by thermal bonding. In some embodiments, the second layer is attached to the first layer by an adhesive layer. In some embodiments, the second layer is extruded with the first layer. In some embodiments, the second layer is coextruded with the first layer. In some embodiments, the second layer is laminated to the first layer.

In some embodiments, the roofing material comprises a third layer on the second layer. In some embodiments, the third layer is located above the second layer. In some embodiments, the third layer directly contacts the second layer. In some embodiments, the third layer is attached to the second layer by thermal bonding. In some embodiments, the third layer is attached to the second layer by an adhesive layer. In some embodiments, the third layer is extruded with the second layer. In some embodiments, the third layer is coextruded with the second layer. In some embodiments, the third layer is laminated to the second layer.

In some embodiments, the roofing material comprises a fourth layer on the third layer. In some embodiments, the fourth layer is located above the third layer. In some embodiments, the fourth layer directly contacts the third layer. In some embodiments, the fourth layer is attached to the third layer by thermal bonding. In some embodiments, the fourth layer is attached to the third layer by an adhesive layer. In some embodiments, the fourth layer is extruded with the third layer. In some embodiments, the fourth layer is coextruded with the third layer. In some embodiments, the fourth layer is laminated to the third layer.

In some embodiments, the roofing material comprises a fifth layer on the fourth layer. In some embodiments, the fifth layer is located above the fourth layer. In some embodiments, the fifth layer directly contacts the fourth layer. In some embodiments, the fifth layer is attached to the fourth layer by thermal bonding. In some embodiments, the fifth layer is attached to the fourth layer by an adhesive layer. In some embodiments, the fifth layer is extruded with the fourth layer. In some embodiments, the fifth layer is coextruded with the fourth layer. In some embodiments, the fifth layer is laminated to the fourth layer.

In some embodiments, the roofing material comprises a sixth layer on the fifth layer. In some embodiments, the sixth layer is located above the fifth layer. In some embodiments, the sixth layer directly contacts the fifth layer. In some embodiments, the sixth layer is attached to the fifth layer by thermal bonding. In some embodiments, the sixth layer is attached to the fifth layer by an adhesive layer. In some embodiments, the sixth layer is extruded with the fifth layer. In some embodiments, the sixth layer is coextruded with the fifth layer. In some embodiments, the sixth layer is laminated to the fifth layer.

In some embodiments, the roofing material comprises a seventh layer on the sixth layer. In some embodiments, the seventh layer is located above the sixth layer. In some embodiments, the seventh layer directly contacts the sixth layer. In some embodiments, the seventh layer is attached to the sixth layer by thermal bonding. In some embodiments, the seventh layer is attached to the sixth layer by an adhesive layer. In some embodiments, the seventh layer is extruded with the sixth layer. In some embodiments, the seventh layer is coextruded with the sixth layer. In some embodiments, the seventh layer is laminated to the sixth layer.

In some embodiments, the roofing material comprises an eighth layer on the seventh layer. In some embodiments, the eighth layer is located above the seventh layer. In some embodiments, the eighth layer directly contacts the seventh layer. In some embodiments, the eighth layer is attached to the seventh layer by thermal bonding. In some embodiments, the eighth layer is attached to the seventh layer by an adhesive layer. In some embodiments, the eighth layer is extruded with the seventh layer. In some embodiments, the eighth layer is coextruded with the seventh layer. In some embodiments, the eighth layer is laminated to the seventh layer.

In some embodiments, the roofing material comprises a ninth layer on the eighth layer. In some embodiments, the ninth layer is located above the eighth layer. In some embodiments, the ninth layer directly contacts the eighth layer. In some embodiments, the ninth layer is attached to the eighth layer by thermal bonding. In some embodiments, the ninth layer is attached to the eighth layer by an adhesive layer. In some embodiments, the ninth layer is extruded with the eighth layer. In some embodiments, the ninth layer is coextruded with the eighth layer. In some embodiments, the ninth layer is laminated to the eighth layer.

In some embodiments, the roofing material comprises a tenth layer on the ninth layer. In some embodiments, the tenth layer is located above the ninth layer. In some embodiments, the tenth layer directly contacts the ninth layer. In some embodiments, the tenth layer is attached to the ninth layer by thermal bonding. In some embodiments, the tenth layer is attached to the ninth layer by an adhesive layer. In some embodiments, the tenth layer is extruded with the ninth layer. In some embodiments, the tenth layer is coextruded with the ninth layer. In some embodiments, the tenth layer is laminated to the ninth layer.

In some embodiments, the roofing material comprises one or more sheets. In some embodiments, each of the one or more sheets comprises at least two layers. In some embodiments, for example, each of the one or more sheets comprises at least two of the following: the first layer, the second layer, the third layer, the fourth layer, the fifth layer, the sixth layer, the seventh layer, the eighth layer, the ninth layer, the tenth layer, or any combination thereof. In some embodiments, the roofing material comprises a first sheet, a second sheet, and a third sheet between the first sheet and the second sheet. In some embodiments, the roofing material comprises a scrim. In some embodiments, at least one of the sheets comprises a scrim. In some embodiments, at least one of the layers comprises a scrim. In some embodiments, the roofing material comprises at least one of a sheet comprising laminated layers, a sheet comprising coextruded layers, a sheet comprising adhered layers, a sheet comprising bonded layers, a sheet comprising pressed layers, or any combination thereof.

In some embodiments, the roofing material has an aesthetic appearance of a roofing shingle. In some embodiments, roofing shingle comprises a first layer. In some embodiments, the roofing shingle comprises a second layer on the first layer. In some embodiments, the second layer comprises a headlap. In some embodiments, the second layer comprises a plurality of tabs extending from a side of the headlap. In some embodiments, the plurality of tabs comprises at least one of a first tab, a second tab, a third tab, a fourth tab, or any combination thereof. In some embodiments, the first layer underlies the plurality of tabs such that at least a portion of the first layer is exposed between the plurality of tabs.

In some embodiments, at least one of the first layer, the second layer, the third layer, or any combination thereof, is different. In some embodiments, at least one of the first thermoplastic polymer, the second thermoplastic polymer, the third thermoplastic polymer, or any combination thereof is different. In some embodiments, at least one of the first thermoplastic polymer, the second thermoplastic polymer, the third thermoplastic polymer, or any combination thereof is the same. It will be appreciated that any one or more of the features disclosed herein of at least one of the first layer, the second layer, the third layer, or any combination thereof, may be the same or different, without departing from the scope of this disclosure. In some embodiments, a roofing material comprises one or more first layers, one or more second layers, one or more third layers, or any combination thereof. In some embodiments, the second layer is a lower most layer of the roofing material. In some embodiments, the second layer is an upper most layer of the roofing material. In some embodiments, the first layer is an inner layer. For example, in some embodiments, the first layer is not an upper most layer. In some embodiments, the first layer is not a lower most layer.

Some embodiments relate to a roofing system. In some embodiments, the roofing system comprises a building structure. In some embodiments, the building structure comprises at least one of a roofing substrate. In some embodiments, the roofing substrate comprises at least one of at least one of a plywood substrate, a glass substrate, a cellulosic substrate, a roof shingle, a mat, a fabric, a glass mat, a fiberglass mat, an underlayment, a roofing membrane, a roof deck, a photovoltaic (PV) panel, a modified bitumen (MOD-BIT) substrate, a roll good, a board (such as but not limited to at least one of a foam board (e.g., a polyisocyanurate (ISO) foam board), a cover board, or any combination thereof), a pipe, a base sheet, a chimney, a wax paper, or any combination thereof. In some embodiments, the building structure comprises a contact surface, wherein the contact surface is formed of wood, metal, plastic, concrete, a polymer (e.g., polypropylene, polyethylene, thermoplastic polyolefin (TPO), polyvinyl chloride (PVC), poly(styrene-butadiene-styrene), or any combination thereof. In some embodiments, the roofing system comprises a roofing material. In some embodiments, the roofing material is located on the building structure. In some embodiments, the roofing material is located on the roofing substrate. In some embodiments, the roofing material comprises at least one of a roofing coating, a roofing membrane, a roofing shingle, a roofing substrate, a roofing accessory, or any combination thereof. In some embodiments, the roofing material directly contacts the building structure. In some embodiments, the roofing material directly contacts the roofing substrate. In some embodiments, an intervening layer is located between the roofing material and the building structure and/or the roofing substrate.

FIG. 1 is a schematic diagram of a cross-section of a roofing material 100, according to some embodiments. As shown in FIG. 1, in some embodiments, the roofing material 100 comprises at least one of a first layer 102, a second layer 104, a third layer 106, or any combination thereof. In some embodiments, the second layer 104 is on the first layer 102. In some embodiments, the third layer 106 is on the second layer 104. In some embodiments, the roofing material 100 comprises a fourth layer 108 between the first layer 102 and the second layer 104. In some embodiments, the roofing material 100 comprises a fifth layer 110 between the second layer 104 and the third layer 106.

In some embodiments, the first layer 102 comprises a continuous layer without any openings. In some embodiments, the second layer 104 comprises a plurality of openings, wherein each of the plurality of openings extends from a first surface of the second layer 104 to a second surface of the second layer 104, wherein the second surface of the second layer 104 is opposite the first surface of the second layer 104. In some embodiments, at least a portion of the first layer 102 is exposed through the plurality of openings of the second layer 104. In some embodiments, the second layer 104 comprises a plurality of thermoplastic polymer pieces. In some embodiments, the plurality of thermoplastic polymer pieces of the second layer 104 covers the first layer 102 such that at least a portion of the first layer 102 is exposed. In some embodiments, the second layer 104 directly contacts the first layer 102. In some embodiments, second layer 104 is attached to the first layer 102 by the fourth layer 108, wherein the fourth layer 108 comprises an adhesive layer. In some embodiments, the fourth layer 108 is not exposed through the second layer 104. In some embodiments, the roofing material 100 does not comprise the fourth layer 108.

In some embodiments, the third layer 106 comprises a plurality of openings, wherein each of the plurality of openings extends from a first surface of the third layer 106 to a second surface of the third layer 106, wherein the second surface of the third layer 106 is opposite the first surface of the third layer 106. In some embodiments, at least a portion of the first layer 102 is exposed through the plurality of openings of the third layer 106. In some embodiments, at least a portion of an upper surface of the first layer 102 is exposed through the plurality of openings of the third layer 106. In some embodiments, at least a portion of the second layer 104 is exposed through the plurality of openings of the third layer 106. In some embodiments, at least a portion of an upper surface of the second layer 104 is exposed through the plurality of openings of the third layer 106. In some embodiments, the third layer 106 comprises a plurality of thermoplastic polymer pieces. In some embodiments, the plurality of thermoplastic polymer pieces of the third layer 106 covers the first layer 102 such that at least a portion of the first layer 102 is exposed. In some embodiments, the plurality of thermoplastic polymer pieces of the third layer 106 covers the second layer 104 such that at least a portion of the second layer 104 is exposed. In some embodiments, the third layer 106 directly contacts the second layer 104. In some embodiments, third layer 106 is attached to the second layer 104 by the fifth layer 1110, wherein the fifth layer 110 comprises an adhesive layer. In some embodiments, the fourth layer 108 is not exposed through the third layer. In some embodiments, the fifth layer 110 is not exposed through the third layer. In some embodiments, the roofing material 100 does not comprise the fifth layer 110.

In some embodiments, the roofing material 100 comprises one or more additional layers. In some embodiments, the roofing material 100 has an aesthetic appearance of a roofing shingle. In some embodiments, the roofing material 100 has an aesthetic appearance of a photovoltaic shingle. In some embodiments, the roofing material 100 comprises a roofing membrane.

Figure 2:
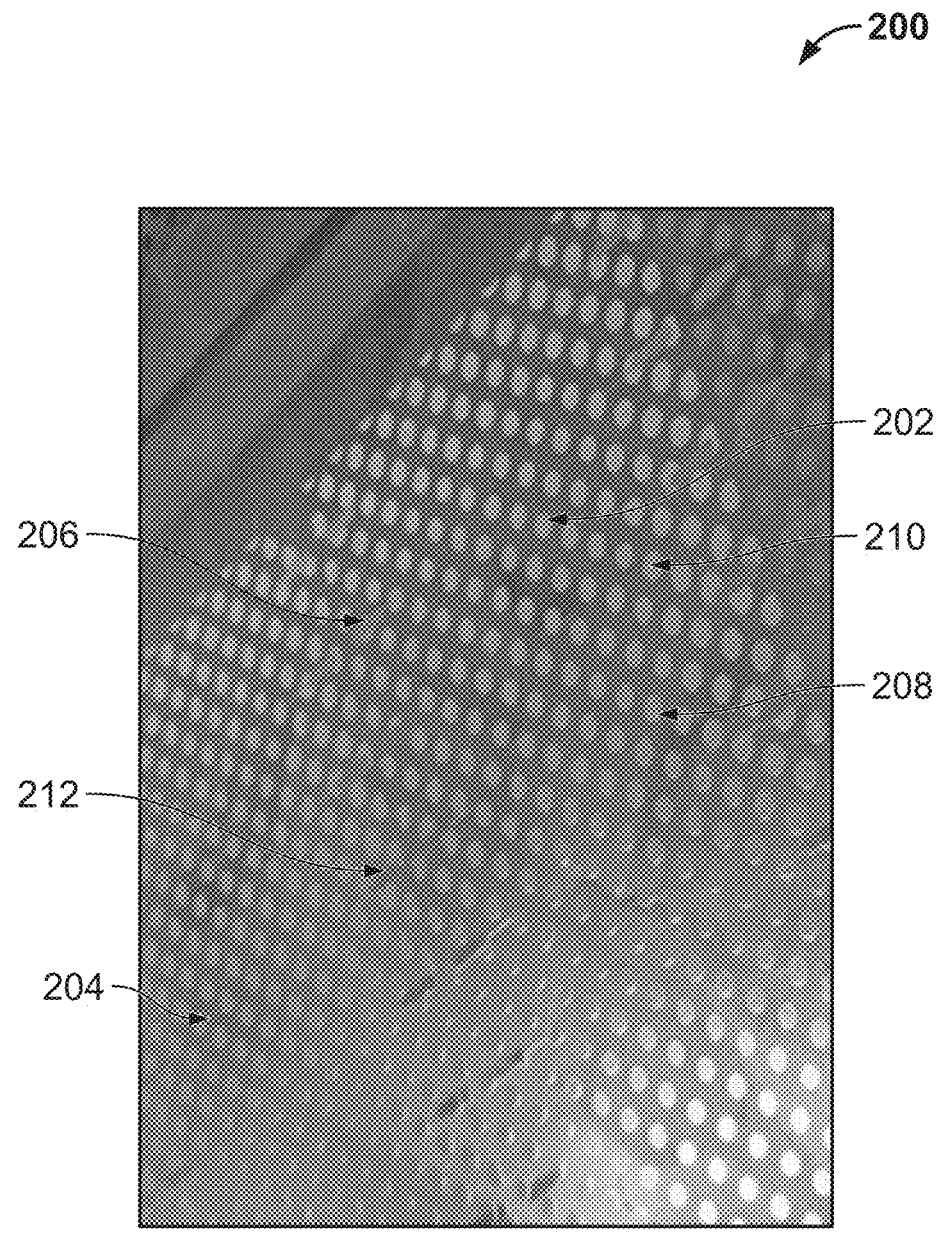
FIG. 2 is a schematic diagram of a roofing material, according to some embodiments.

FIG. 2 is a schematic diagram of a roofing material 200, according to some embodiments. As shown in FIG. 2, the roofing material 200 comprises a first layer 202, a second layer 204 on the first layer 202, and a third layer 206 on the second layer 204. In some embodiments, the second layer 204 comprises a plurality of circular openings 208 extending from a first surface of the second layer 204 to a second surface of the second layer 204, wherein the second surface of the second layer 204 is opposite the first surface of the second layer 204. In some embodiments, at least a portion 210 of the first layer 202 is exposed through the plurality of openings 208 of the second layer 204. In some embodiments, the third layer 206 comprises a plurality of rectangular thermoplastic polymer pieces 212. In some embodiments, the plurality of rectangular thermoplastic pieces 212 covers the first layer 202 such that at least a portion of the first layer 202 is exposed. In some embodiments, the plurality of rectangular thermoplastic pieces 212 covers the second layer 204 such that at least a portion of the second layer 204 is exposed. In some embodiments, an aesthetic appearance of the roofing material 200 is substantially similar to an aesthetic appearance of a photovoltaic module. In some embodiments, the photovoltaic module includes a structure, composition, components, and/or function similar to those of one or more embodiments of the photovoltaic modules disclosed in PCT International Patent Publication No. WO 2022/051593, Application No. PCT/US2021/049017, published Mar. 10, 2022, entitled "Building Integrated Photovoltaic System," owned by GAF Energy LLC, and U.S. Pat. No. 11,251,744 to Bunea et al., issued Feb. 15, 2022, entitled "Photovoltaic Shingles and Methods of Installing Same," the contents of each of which are incorporated by reference herein in their entirety.

Figure 3A:
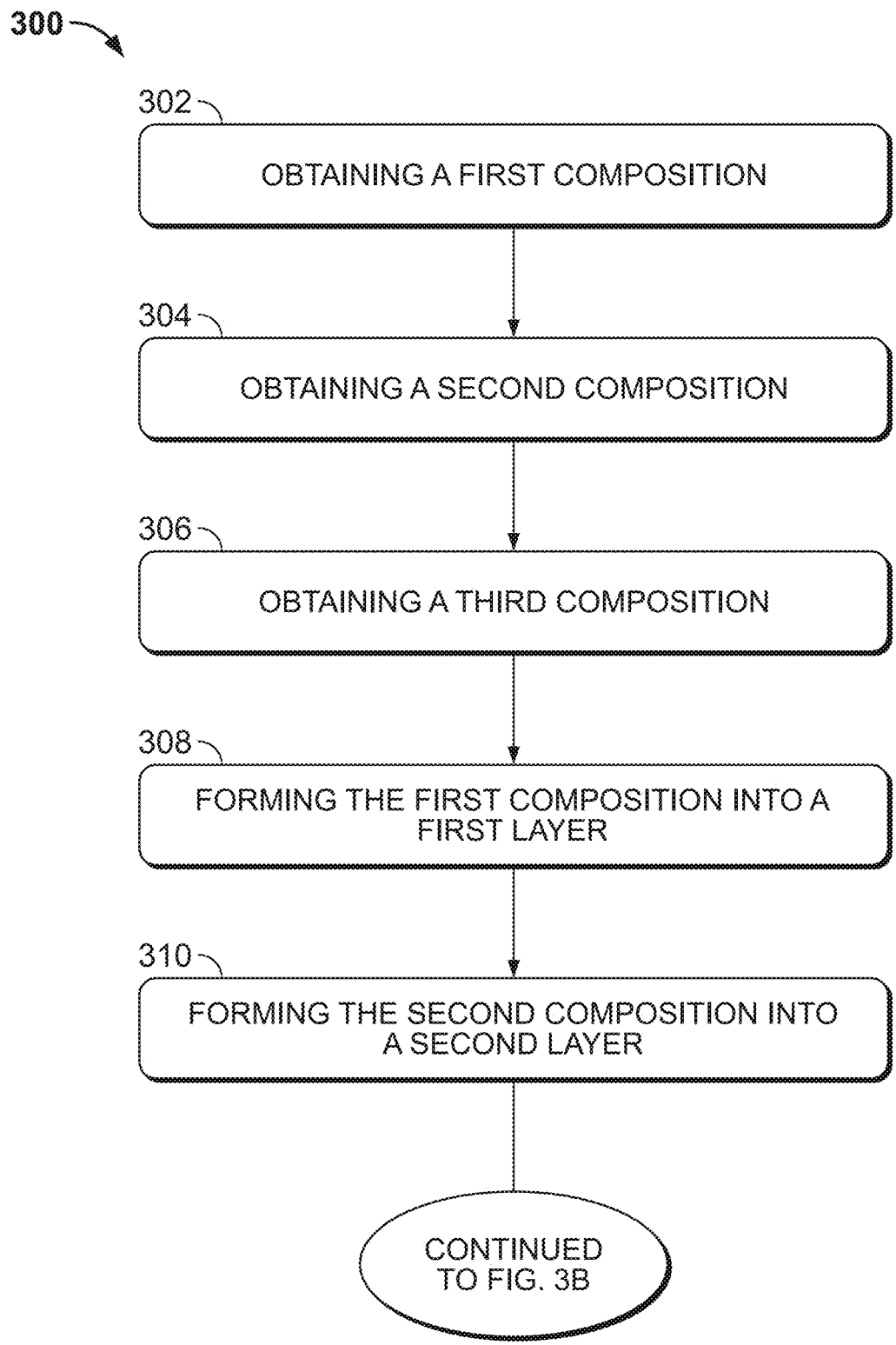
FIGS. 3A-3B are flowcharts of a method of manufacturing a roofing material, according to some embodiments.
Figure 3B:
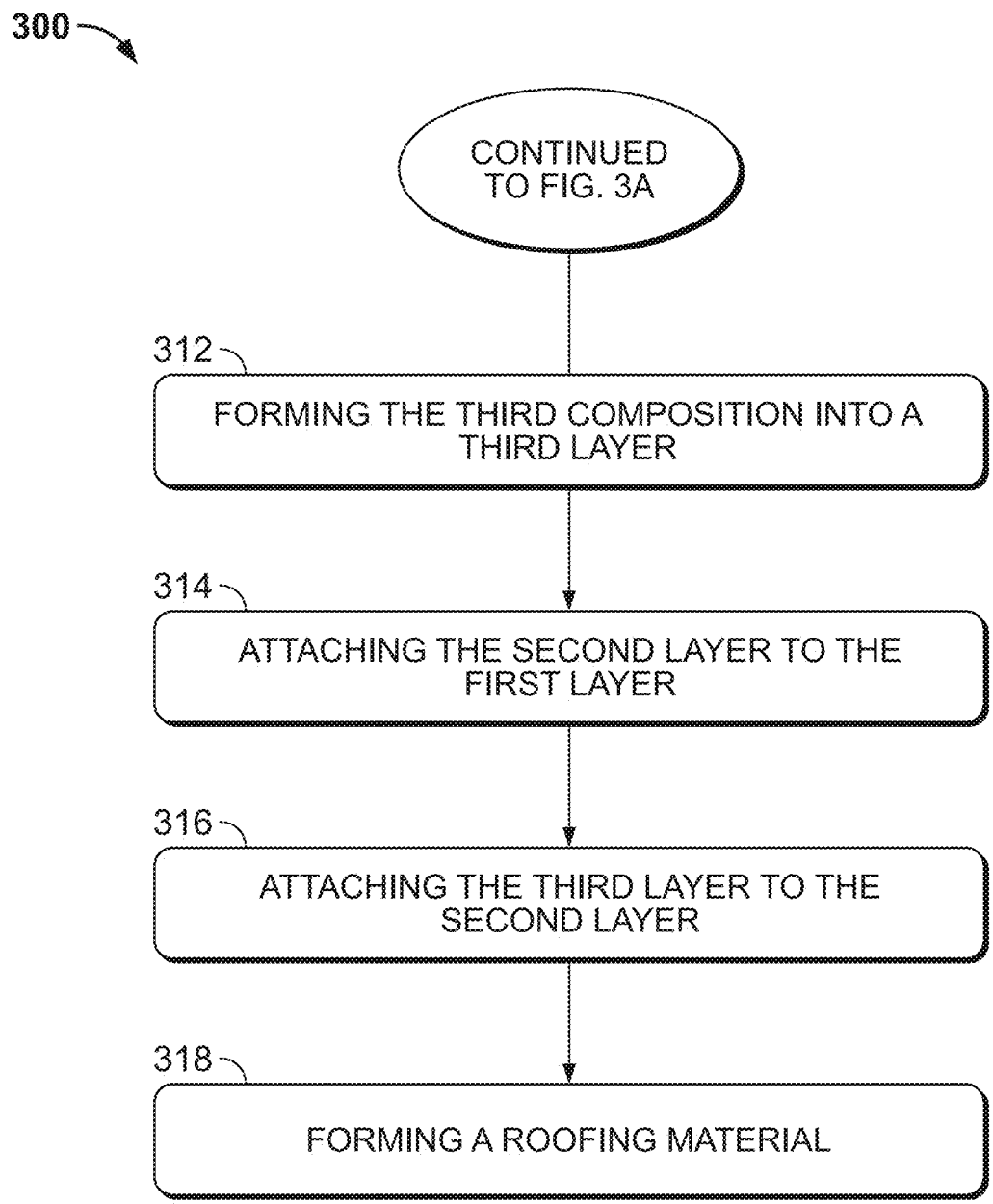

FIGS. 3A-3B are flowcharts of a method 300 of manufacturing a roofing material, according to some embodiments. As shown in FIGS. 3A-3B, in some embodiments, the method 300 of manufacturing a roofing material comprises one or more of the following steps, in any order: obtaining 302 obtaining a first composition comprising a first thermoplastic polymer; obtaining 304 a second composition comprising a second thermoplastic polymer; obtaining 306 a third composition comprising a third thermoplastic polymer; forming 308 the first composition into a first layer; forming 310 the second composition into a second layer; forming 312 the third composition into a third layer; attaching 314 the second layer to the first layer; attaching 316 the third layer to the second layer; and forming 318 a roofing material. It will be appreciated that the method 300 of manufacturing a roofing material may include one or more additional steps or one or more fewer steps in embodiments in which the roofing material comprises more than three layers or less than three layers, respectively, without departing from the scope of this disclosure.

At step 308, in some embodiments, the first composition is formed into a first layer. In some embodiments, the first composition is formed into the first layer by extruding the first composition through a first extrusion die, so as to form the first layer. In some embodiments, the first composition is formed into the first layer by forming a plurality of openings in the first layer. In some embodiments, the plurality of openings is formed in the first layer by cutting the first layer. In some embodiments, the plurality of openings is formed in the first layer by laser ablating the first layer. In some embodiments, the plurality of openings is formed in the first layer by punching holes through the first layer. In some embodiments, the plurality of openings is formed in the first layer by perforating the first layer. In some embodiments, the first composition is formed into a first layer by cutting the first layer into a desired shape (e.g., a roofing shingle comprising a headlap and a plurality of roofing shingle tabs extending from the headlap). In some embodiments, the first composition is formed into the first layer by molding the first layer into a desired shape. In some embodiments, the first composition is formed into a first layer by cutting the first layer into a plurality of thermoplastic polymer pieces.

At step 310, in some embodiments, the second composition is formed into a second layer. In some embodiments, the second composition is formed into the second layer by extruding the second composition through a second extrusion die, so as to form the second layer. In some embodiments, the second composition is formed into the second layer by forming a plurality of openings in the second layer. In some embodiments, the plurality of openings is formed in the second layer by cutting the second layer. In some embodiments, the plurality of openings is formed in the second layer by laser ablating the second layer. In some embodiments, the plurality of openings is formed in the second layer by punching holes through the second layer. In some embodiments, the plurality of openings is formed in the second layer by perforating the second layer. In some embodiments, the second composition is formed into the second layer by cutting the second layer into a desired shape. In some embodiments, the second composition is formed into the second layer by molding the second layer into a desired shape. In some embodiments, the second composition is formed into a second layer by cutting the second layer into a plurality of thermoplastic polymer pieces.

At step 312, in some embodiments, the third composition is formed into a third layer. In some embodiments, the third composition is formed into the third layer by extruding the third composition through a third extrusion die, so as to form the third layer. In some embodiments, the third composition is formed into the third layer by forming a plurality of openings in the third layer. In some embodiments, the plurality of openings is formed in the third layer by cutting the third layer. In some embodiments, the plurality of openings is formed in the third layer by laser ablating the third layer. In some embodiments, the plurality of openings is formed in the third layer by punching holes through the third layer. In some embodiments, the plurality of openings is formed in the third layer by perforating the third layer. In some embodiments, the third composition is formed into the third layer by cutting the third layer into a desired shape. In some embodiments, the third composition is formed into the third layer by molding the third layer into a desired shape. In some embodiments, the third composition is formed into a third layer by cutting the third layer into a plurality of thermoplastic polymer pieces.

At step 314, in some embodiments, the second layer is attached to the first layer. In some embodiments, the second layer is attached to the first layer by laminating the second layer to the first layer. In some embodiments, the second layer is attached to the first layer by bonding the second layer to the first layer. In some embodiments, the second layer is attached to the first layer by extruding the second layer onto the first layer. In some embodiments, the second layer is attached to the first layer by extruding the first layer onto the second layer. In some embodiments, the second layer is attached to the first layer by coextruding the second layer and the first layer. In some embodiments, the second layer is attached to the first layer by adhering the second layer to the first layer. In some embodiments, the second layer is attached to the first layer by pressing the second layer onto the first layer.

At step 316, in some embodiments, the third layer is attached to the second layer. In some embodiments, the third layer is attached to the second layer by laminating the third layer to the second layer. In some embodiments, the third layer is attached to the second layer by bonding the third layer to the second layer. In some embodiments, the third layer is attached to the second layer by extruding the third layer onto the second layer. In some embodiments, the third layer is attached to the second layer by extruding the second layer onto the third layer. In some embodiments, the third layer is attached to the second layer by coextruding the third layer and the second layer. In some embodiments, the third layer is attached to the second layer by adhering the third layer to the second layer. In some embodiments, the third layer is attached to the second layer by pressing the third layer onto the second layer.

At step 318, in some embodiments, the roofing material is formed. In some embodiments, forming the roofing material comprises cutting at least one layer into a desired shape. In some embodiments, forming the roofing material comprises cutting at least one layer into a roofing shingle. In some embodiments, forming the roofing material comprises cutting at least one layer into a photovoltaic shingle. In some embodiments, an aesthetic appearance of the roofing material is substantially similar to an aesthetic appearance of a photovoltaic shingle. In some embodiments, an aesthetic appearance of the roofing material is substantially similar to an aesthetic appearance of a roofing shingle. In some embodiments, an aesthetic appearance of the roofing material is substantially similar to an aesthetic appearance of a three-tab roofing shingle. In some embodiments, an aesthetic appearance of the roofing material is substantially similar to has an aesthetic appearance of a strip shingle. In some embodiments, an aesthetic appearance of the roofing material is substantially similar to an aesthetic appearance of a laminated shingle.

Figure 4:
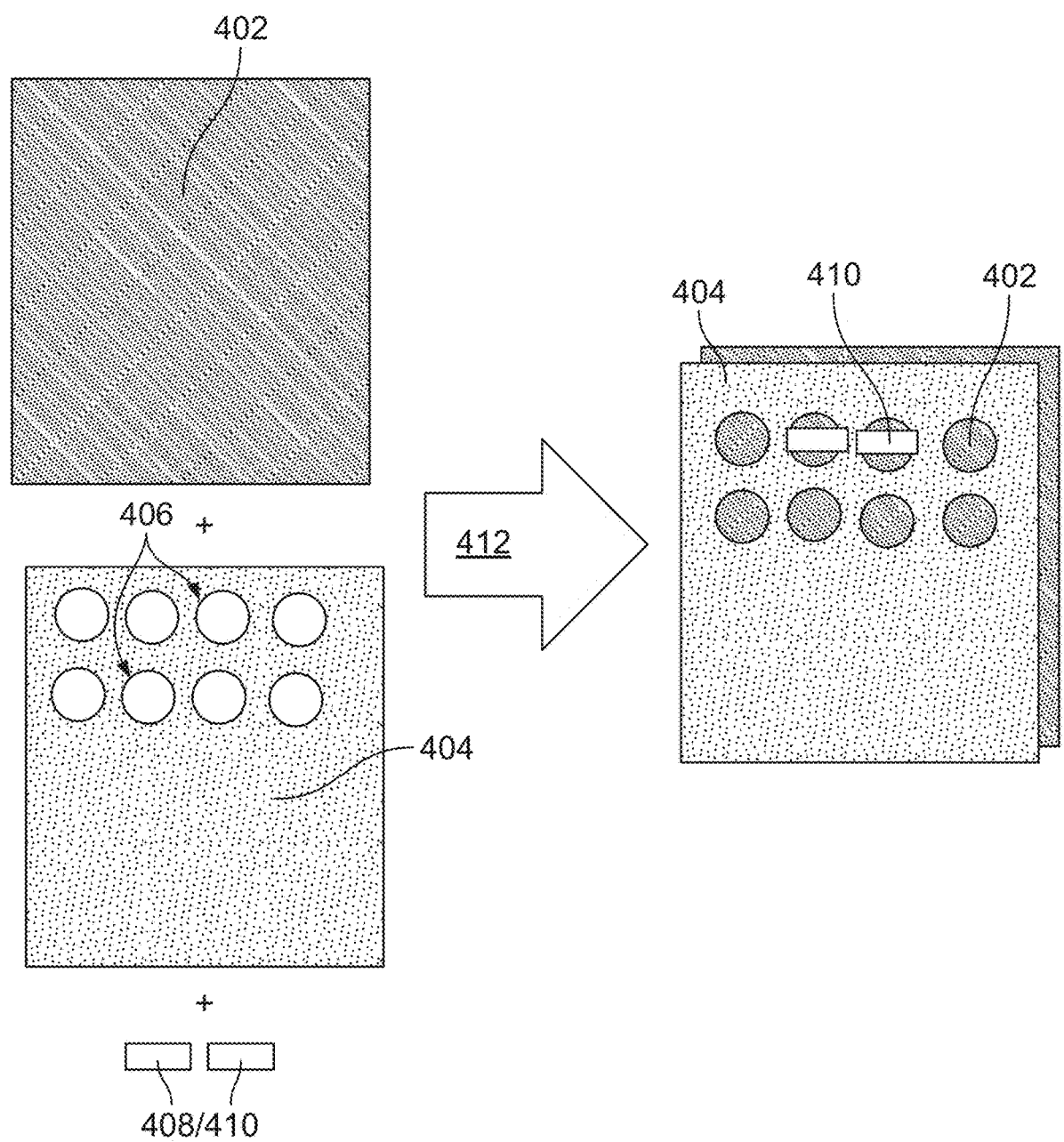
FIG. 4 is a schematic diagram of a flowchart of a method of manufacturing a roofing material, according to some embodiments.

FIG. 4 is a schematic diagram of a method 400 for manufacturing a roofing material, according to some embodiments. As shown in FIG. 4, in some embodiments, the method 400 for manufacturing a roofing material comprises obtaining a first layer 402. In some embodiments, the method 400 for manufacturing a roofing material comprises obtaining a second layer 404. In some embodiments, the second layer 404 comprises a plurality of openings 406 extending through the second layer 404 from a first surface of the second layer 404 to a second surface of the second layer 404, wherein the second surface of the second layer 404 is opposite the first surface of the second layer 404. In some embodiments, the method 400 for manufacturing a roofing material comprises obtaining a third layer 408, wherein the third layer 408 comprises a plurality of thermoplastic polymer pieces 410.

In some embodiments, the second layer 404 is attached 412 to the first layer 402, and the third layer 408 is attached 412 to the second layer 404. In some embodiments, the attaching 412 comprises pressing (e.g., thermal bonding) the second layer 404 on the first layer 402 at a temperature in a range of 100° C. to 250° C. In some embodiments, the attaching 412 comprises pressing the third layer 408 on the second layer 404 at a temperature in a range of 100° C. to 250° C. In some embodiments, the second layer 404 covers the first layer 402 such that at least a portion of the first layer 402 is exposed through the plurality of openings 406 of the second layer 404. In some embodiments, the third layer 408 covers the second layer 404 such that at least a portion of the second layer 404 is exposed. In some embodiments, the third layer 408 covers the first layer 402 such that at least a portion of the first layer 402 is exposed.

Figure 5:
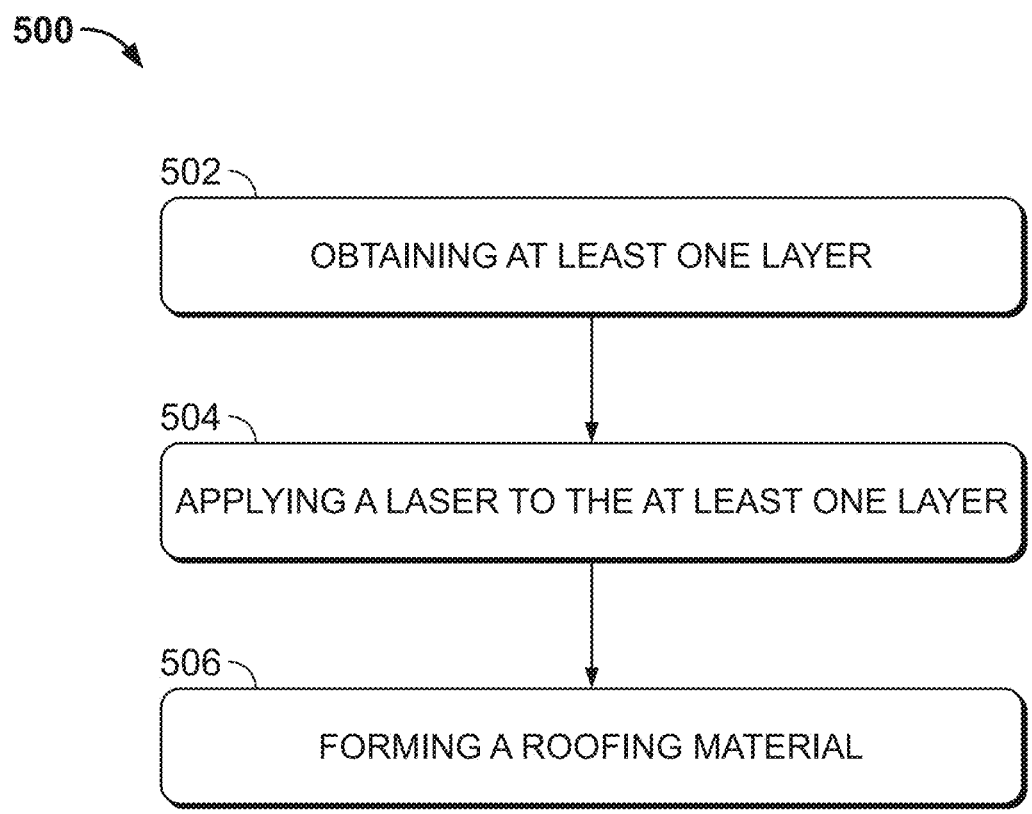
FIG. 5 is a flowchart of a method of manufacturing a roofing material, according to some embodiments.

FIG. 5 is a flowchart of a method 500 of manufacturing a roofing material, according to some embodiments. As shown in FIG. 5, the method 500 of manufacturing a roofing material comprises one or more of the following steps, in any order: obtaining 502 at least one layer; applying 504 a laser to the at least one layer; and forming 506 a roofing material.

At step 502, in some embodiments, at least one layer is obtained. In some embodiments, a sheet comprising at least one layer is obtained. In some embodiments, the at least one layer has a first color. some embodiments, the thermoplastic polymer(s), the additive(s), the combination of thermoplastic polymers, the combination of additives, the combination of the thermoplastic polymer(s) and the additive(s) is/are selected or adjusted to achieve a desired aesthetic appearance. For example, in some embodiments, the additives are selected or varied so as to achieve a desired color. In other words, in some embodiments, the at least layer may undergo different color changes depending on the additives present within the at least one layer. Accordingly, in some embodiments, the specific additive(s), the specific polymer(s), the weight percentage of the additive, the weight percentage of the polymer, or any combination thereof, may be selected, adjusted, or varied to achieve a desired color pattern, a desired aesthetic appearance, or any combination thereof.

At step 504, in some embodiments, a laser is applied to the at least one layer one or more times. In some embodiments, the step 504 of applying a laser to at least a portion of the at least one layer comprises setting at least one parameter. In some embodiments, the step 504 of applying a laser to at least a portion of the at least one layer comprises adjusting at least one parameter. In some embodiments, the step 504 of applying the laser to the at least one layer results in at least one of the following: at least a portion of the at least one layer undergoes a color change from the first color to a second color; at least a portion of the at least one layer is removed from the sheet so as to expose another layer; or any combination thereof.

In some embodiments, the laser is applied to the at least one layer under a first set of parameters. In some embodiments, the laser is applied to the at least one layer under a second set of parameters. In some embodiments, the laser is applied to the at least one layer under a third set of parameters. In some embodiments, the laser is applied to the at least one layer under one or more other sets of parameters, each of which may be the same or different. In some embodiments, each set of parameters comprises setting at least one of a pulse parameter, a power parameter, a wavelength parameter, or any combination thereof.

In some embodiments, the speed parameter comprises a speed in a range of 2 mm/s to 300 mm/s. In some embodiments, the speed parameter comprises a speed in a range of 5 mm/s to 300 mm/s. In some embodiments, the speed parameter comprises a speed in a range of 10 mm/s to 300 mm/s. In some embodiments, the speed parameter comprises a speed in a range of 25 mm/s to 300 mm/s. In some embodiments, the speed parameter comprises a speed in a range of 50 mm/s to 300 mm/s. In some embodiments, the speed parameter comprises a speed in a range of 75 mm/s to 300 mm/s. In some embodiments, the speed parameter comprises a speed in a range of 100 mm/s to 300 mm/s. In some embodiments, the speed parameter comprises a speed in a range of 125 mm/s to 300 mm/s. In some embodiments, the speed parameter comprises a speed in a range of 150 mm/s to 300 mm/s. In some embodiments, the speed parameter comprises a speed in a range of 175 mm/s to 300 mm/s. In some embodiments, the speed parameter comprises a speed in a range of 1100 mm/s to 300 mm/s. In some embodiments, the speed parameter comprises a speed in a range of 225 mm/s to 300 mm/s. In some embodiments, the speed parameter comprises a speed in a range of 250 mm/s to 300 mm/s. In some embodiments, the speed parameter comprises a speed in a range of 275 mm/s to 300 mm/s.

In some embodiments, the speed parameter comprises a speed in a range of 2 mm/s to 25 mm/s. In some embodiments, the speed parameter comprises a speed in a range of 2 mm/s to 50 mm/s. In some embodiments, the speed parameter comprises a speed in a range of 2 mm/s to 75 mm/s. In some embodiments, the speed parameter comprises a speed in a range of 2 mm/s to 100 mm/s. In some embodiments, the speed parameter comprises a speed in a range of 2 mm/s to 125 mm/s. In some embodiments, the speed parameter comprises a speed in a range of 2 mm/s to 150 mm/s. In some embodiments, the speed parameter comprises a speed in a range of 2 mm/s to 175 mm/s. In some embodiments, the speed parameter comprises a speed in a range of 2 mm/s to 200 mm/s. In some embodiments, the speed parameter comprises a speed in a range of 2 mm/s to 225 mm/s. In some embodiments, the speed parameter comprises a speed in a range of 2 mm/s to 250 mm/s. In some embodiments, the speed parameter comprises a speed in a range of 2 mm/s to 275 mm/s. In some embodiments, the speed parameter comprises a speed in a range of 2 mm/s to 300 mm/s.

In some embodiments, the power parameter comprises a power in a range of 1 W to 100 W. In some embodiments, the power parameter comprises a power in a range of 1 W to 90 W. In some embodiments, the power parameter comprises a power in a range of 1 W to 80 W. In some embodiments, the power parameter comprises a power in a range of 1 W to 70 W. In some embodiments, the power parameter comprises a power in a range of 1 W to 60 W. In some embodiments, the power parameter comprises a power in a range of 1 W to 50 W. In some embodiments, the power parameter comprises a power in a range of 1 W to 40 W. In some embodiments, the power parameter comprises a power in a range of 1 W to 30 W. In some embodiments, the power parameter comprises a power in a range of 1 W to 20 W. In some embodiments, the power parameter comprises a power in a range of 1 W to 10 W.

In some embodiments, the power parameter comprises a power in a range of 10 W to 100 W. In some embodiments, the power parameter comprises a power in a range of 20 W to 100 W. In some embodiments, the power parameter comprises a power in a range of 30 W to 100 W. In some embodiments, the power parameter comprises a power in a range of 40 W to 100 W. In some embodiments, the power parameter comprises a power in a range of 50 W to 100 W. In some embodiments, the power parameter comprises a power in a range of 60 W to 100 W. In some embodiments, the power parameter comprises a power in a range of 70 W to 100 W. In some embodiments, the power parameter comprises a power in a range of 80 W to 100 W. In some embodiments, the power parameter comprises a power in a range of 90 W to 100 W.

In some embodiments, the wavelength parameter comprises a wavelength in a range of 780 nm to 1064 nm. In some embodiments, the wavelength parameter comprises a wavelength in a range of 780 nm to 1050 nm. In some embodiments, the wavelength parameter comprises a wavelength in a range of 780 nm to 1025 nm. In some embodiments, the wavelength parameter comprises a wavelength in a range of 780 nm to 1000 nm. In some embodiments, the wavelength parameter comprises a wavelength in a range of 780 nm to 975 nm. In some embodiments, the wavelength parameter comprises a wavelength in a range of 780 nm to 950 nm. In some embodiments, the wavelength parameter comprises a wavelength in a range of 780 nm to 925 nm. In some embodiments, the wavelength parameter comprises a wavelength in a range of 780 nm to 900 nm. In some embodiments, the wavelength parameter comprises a wavelength in a range of 780 nm to 875 nm. In some embodiments, the wavelength parameter comprises a wavelength in a range of 780 nm to 850 nm. In some embodiments, the wavelength parameter comprises a wavelength in a range of 780 nm to 825 nm. In some embodiments, the wavelength parameter comprises a wavelength in a range of 780 nm to 800 nm.

In some embodiments, the wavelength parameter comprises a wavelength in a range of 800 nm to 1064 nm. In some embodiments, the wavelength parameter comprises a wavelength in a range of 825 nm to 1064 nm. In some embodiments, the wavelength parameter comprises a wavelength in a range of 850 nm to 1064 nm. In some embodiments, the wavelength parameter comprises a wavelength in a range of 875 nm to 1064 nm. In some embodiments, the wavelength parameter comprises a wavelength in a range of 900 nm to 1064 nm. In some embodiments, the wavelength parameter comprises a wavelength in a range of 925 nm to 1064 nm. In some embodiments, the wavelength parameter comprises a wavelength in a range of 950 nm to 1064 nm. In some embodiments, the wavelength parameter comprises a wavelength in a range of 975 nm to 1064 nm. In some embodiments, the wavelength parameter comprises a wavelength in a range of 1000 nm to 1064 nm. In some embodiments, the wavelength parameter comprises a wavelength in a range of 1025 nm to 1064 nm. In some embodiments, the wavelength parameter comprises a wavelength in a range of 1050 nm to 1064 nm.

In some embodiments, the step 504 of applying the laser to the at least one layer, for a given set of parameters, results in at least a portion of the at least one layer undergoing a color change from the first color to a second color. In some embodiments, when additional sets of parameters are employed, the step 504 of applying the laser to the at least one layer, for a given set of parameters, results in at least a portion of the at least one layer undergoing a color change from the first color to another color. For example, in some embodiments, the step 504 of applying the laser to the at least one layer, for a second set of parameters, results in at least a portion of the at least one layer undergoing a color change from the first color to a third color. In some embodiments, the step 504 of applying the laser to the at least one layer, for a third set of parameters, results in at least a portion of the at least one layer undergoing a color change from the first color to a fourth color. In some embodiments, the process of varying the set of parameters is repeated such that the at least one layer undergoes a plurality of color changes.

In some embodiments, the step 504 of applying the laser to the at least one layer removes at least a portion of the at least one layer. In some embodiments, the step 504 of applying the laser to the at least one layer removes at least a portion of the at least one layer so as to expose a portion of another layer. For example, in some embodiments, the sheet comprises a first layer, a second layer on the first layer, and a third layer on the second layer. In some embodiments, the step 504 of applying the laser to the at least one layer removes at least a portion of the third layer so as to expose at least a portion of the second layer. In some embodiments, the step 504 of applying the laser to the at least one layer removes at least a portion of the third layer and the second layer so as to expose at least a portion of the first layer. In some embodiments, the step 504 of applying the laser to the at least one layer removes at least a portion of the second layer so as to expose at least a portion of the first layer.

At step 506, a roofing material is formed. In some embodiments, the roofing material has an aesthetic appearance of a photovoltaic shingle. In some embodiments, the roofing material has an aesthetic appearance of a roofing shingle. In some embodiments, the roofing shingle has an aesthetic appearance of a three-tab roofing shingle. In some embodiments, the roofing shingle has an aesthetic appearance of a strip shingle. In some embodiments, the roofing shingle has an aesthetic appearance of a laminated shingle.

Figure 6:
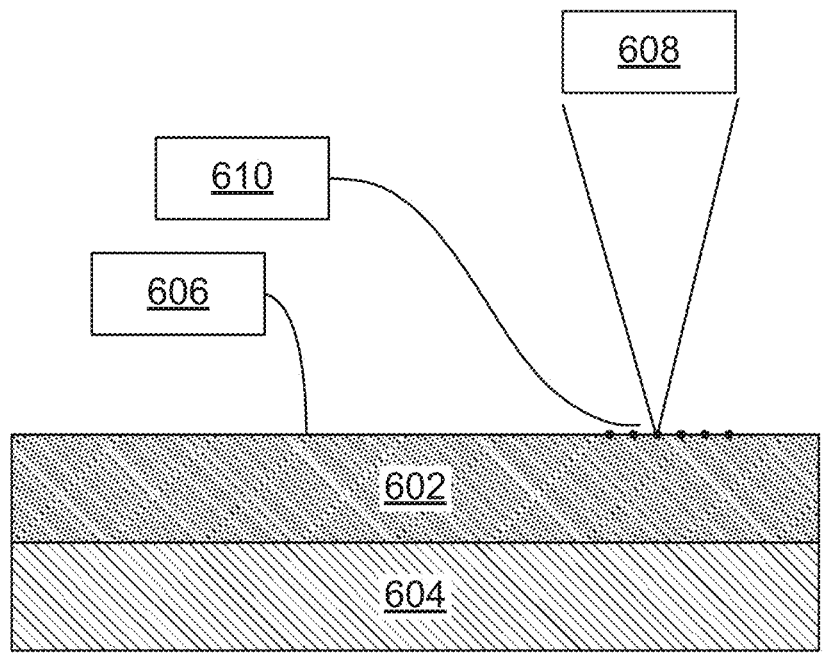
FIG. 6 is a schematic diagram of a laser etched roofing material, according to some embodiments.

FIG. 6 is a schematic diagram of a laser etched roofing material 600, according to some embodiments. In some embodiments, laser etching causes a material to undergo a color change. In some embodiments, laser etching does not comprise removal of a material by applying a laser. As shown in FIG. 6, the laser etched roofing material 600 comprises a first layer 602 on a second layer 604. In some embodiments, the first layer 602 has a first color 606. In some embodiments, applying a laser 608 to at least a portion of the first layer 602 is sufficient for at least a portion of the first layer 602 to undergo a color change from the first color 606 to a second color 610. In some embodiments, the second color 610 is different from the first color 606. In some embodiments, the first layer 602 undergoes the color change without the applied laser removing any of the first layer 602.

Figure 7:
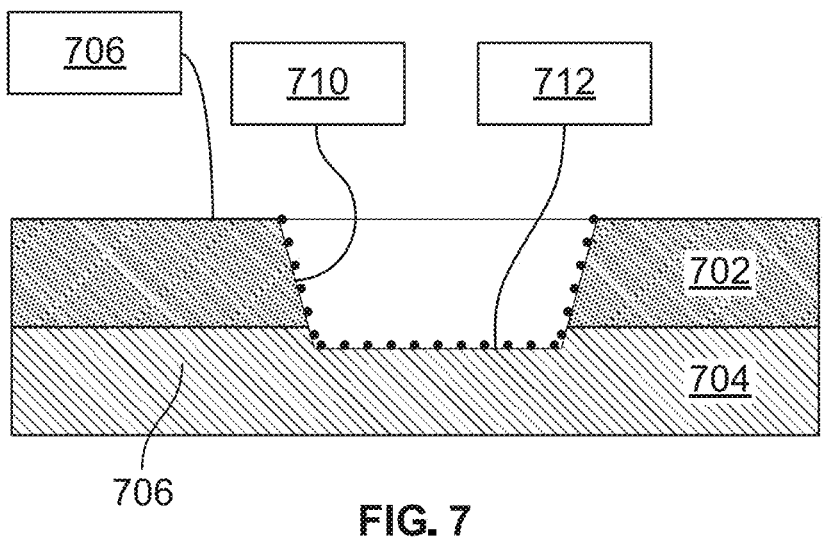
FIG. 7 is a schematic diagram of a laser ablated roofing material, according to some embodiments.

FIG. 7 is a schematic diagram of a laser ablated roofing material 700, according to some embodiments. In some embodiments, laser ablation comprises removal of a material by applying a laser. In some embodiments, laser ablation causes a material to undergo a color change. As shown in FIG. 7, in some embodiments, the laser ablated roofing material 700 comprises a first layer 702 on a second layer 704. In some embodiments, the first layer 702 has a first color 706. In some embodiments, the second layer 704 has a second color 708. In some embodiments, applying a laser to at least a portion of the first layer 702 is sufficient for at least a portion of the first layer 702 to be removed so as to expose the second layer 704. In some embodiments, applying the laser to at least a portion of the first layer 702 is sufficient for at least a portion of the first layer 602 to undergo a color change from the first color 706 to a third color 710. In some embodiments, applying a laser to at least a portion of the (now exposed) second layer 704 is sufficient for at least a portion of the second layer 704 to be removed so as to expose a greater portion of the second layer 704. In some embodiments, applying the laser to at least a portion of the second layer 704 is sufficient for at least a portion of the second layer 704 to undergo a color change from the second color 706 to a fourth color 712.

Some embodiments relate to a roofing material. In some embodiments, the roofing material comprises a first layer. In some embodiments, the first layer comprises a first thermoplastic polymer. In some embodiments, the first layer has a first color. In some embodiments, the roofing material comprises a second layer on the first layer. In some embodiments, the second layer comprises a second thermoplastic polymer. In some embodiments, the second layer has a second color. In some embodiments, the second layer comprises a plurality of openings. In some embodiments, each of the plurality of openings extends through the second layer, from a first surface of the second layer to a second surface of the second layer. In some embodiments, the second surface of the second layer is opposite the first surface of the second layer. In some embodiments, at least a portion of the first layer is exposed through the plurality of openings of the second layer. In some embodiments, at least a portion of an upper surface of the first layer is exposed through the plurality of openings of the second layer. In some embodiments, the roofing material comprises a third layer on the second layer. In some embodiments, the third layer comprises a third thermoplastic polymer. In some embodiments, the third layer has a third color. In some embodiments, the third layer comprises a plurality of thermoplastic polymer pieces. In some embodiments, the plurality of thermoplastic polymer pieces of the third layer covers the first layer and the second layer such that at least a portion of the first layer and at least a portion of the second layer are exposed.

In some embodiments, the first layer has a thickness of 10 mil to 50 mil.

In some embodiments, the first color has a CIELAB color value comprising: an L value of $0 \leq L^* \leq 100$; an a* value of $-128 \leq a^* \leq 127$; and a b* value of $-128 \leq b^* \leq 127$.

In some embodiments, the second layer has a thickness of 10 mil to 50 mil.

In some embodiments, the second color has a CIELAB color value comprising: an L value of $0 \leq L^* \leq 100$; an a* value of $-128 \leq a^* \leq 127$; and a b* value of $-128 \leq b^* \leq 127$.

In some embodiments, the second layer directly contacts the first layer.

In some embodiments, the second layer is attached to the first layer by thermal bonding.

In some embodiments, the second layer is attached to the first layer by an adhesive layer.

In some embodiments, the adhesive layer is not exposed through the plurality of openings of the second layer.

In some embodiments, the plurality of openings of the second layer has a dimension in a range of 0.5 mm to 100 mm.

In some embodiments, 10% to 90% of the first layer is exposed through the plurality of openings of the second layer.

In some embodiments, the plurality of thermoplastic polymer pieces of the third layer has at least one dimension in a range of 0.5 mm to 100 mm.

In some embodiments, the third layer directly contacts the second layer.

In some embodiments, the third layer is attached to the second layer by thermal bonding.

In some embodiments, the third layer is attached to the second layer by an adhesive layer.

In some embodiments, the adhesive layer is not an exposed layer.

In some embodiments, 10% to 90% of the first layer is exposed through the third layer.

In some embodiments, 10% to 90% of the second layer is exposed through the third layer.

Some embodiments relate to a roofing material. In some embodiments, the roofing material comprises a first layer. In some embodiments, the first layer comprises a first thermoplastic polymer. In some embodiments, the first layer has a first color. In some embodiments, the roofing material comprises a second layer on the first layer. In some embodiments, the second layer comprises a second thermoplastic polymer. In some embodiments, the second layer has a second color. In some embodiments, the second layer comprises a plurality of openings. In some embodiments, each of the plurality of openings extends through the second layer, from a first surface of the second layer to a second surface of the second layer. In some embodiments, the second surface of the second layer is opposite the first surface of the second layer. In some embodiments, at least a portion of the first layer is exposed through the plurality of openings of the second layer. In some embodiments, at least a portion of an upper surface of the first layer is exposed through the plurality of openings of the second layer.

In some embodiments, the first layer has a thickness of 10 mil to 50 mil.

In some embodiments, the second layer has a thickness of 10 mil to 50 mil.

In some embodiments, the second layer directly contacts the first layer.

In some embodiments, the second layer is attached to the first layer by thermal bonding.

In some embodiments, the second layer is attached to the first layer by an adhesive layer.

In some embodiments, the adhesive layer is not exposed through the plurality of openings of the second layer.

In some embodiments, the plurality of openings of the second layer has a dimension in a range of 0.5 mm to 100 mm.

In some embodiments, 10% to 90% of the first layer is exposed through the plurality of openings of the second layer. In some embodiments, 10% to 90% of an upper surface of the first layer is exposed through the plurality of openings of the second layer.

In some embodiments, the roofing material further comprises a third layer on the second layer. In some embodiments, the third layer comprises a third thermoplastic polymer. In some embodiments, the third layer has a third color. In some embodiments, the third layer comprises a plurality of thermoplastic polymer pieces. In some embodiments, the plurality of thermoplastic polymer pieces of the third layer covers the first layer, such that at least a portion of the first layer is exposed. In some embodiments, the plurality of thermoplastic polymer pieces of the third layer covers the second layer, such that at least a portion of the second layer is exposed.

In some embodiments, the plurality of thermoplastic polymer pieces of the third layer has at least one dimension in a range of 0.5 mm to 100 mm.

In some embodiments, the third layer directly contacts the second layer.

In some embodiments, the third layer is attached to the second layer by thermal bonding.

In some embodiments, the third layer is attached to the second layer by an adhesive layer.

In some embodiments, the adhesive layer is not an exposed layer.

In some embodiments, 10% to 90% of the first layer is exposed through the third layer.

In some embodiments, 10% to 90% of the second layer is exposed through the third layer.

In some embodiments, the roofing material further comprises a third layer on the second layer. In some embodiments, the third layer comprises a third thermoplastic polymer. In some embodiments, the third layer has a third color. In some embodiments, the third layer comprises a plurality of openings. In some embodiments, each of the plurality of openings extends from a first surface of the third layer to a second surface of the third layer. In some embodiments, the second surface of the third layer is opposite the first surface of the third layer. In some embodiments, at least a portion of the first layer is exposed through the plurality of openings of the third layer. In some embodiments, at least a portion of an upper surface of the first layer is exposed through the plurality of openings of the third layer. In some embodiments, at least a portion of the second layer is exposed through the plurality of openings of the third layer. In some embodiments, at least a portion of a upper surface of the second layer is exposed through the plurality of openings of the third layer.

In some embodiments, the third layer having a thickness of 10 mil to 50 mil.

In some embodiments, the third layer directly contacts the second layer.

In some embodiments, the third layer is attached to the second layer by thermal bonding.

In some embodiments, the third layer is attached to the second layer by an adhesive layer.

In some embodiments, the adhesive layer is not exposed through the plurality of openings of the third layer.

In some embodiments, the plurality of openings of the third layer has a dimension in a range of 0.5 mm to 100 mm.

In some embodiments, 10% to 90% of the first layer is exposed through the plurality of openings of the third layer.

In some embodiments, 10% to 90% of the second layer is exposed through the plurality of openings of the third layer.

Some embodiments relate to a method of manufacturing. In some embodiments, the method comprises obtaining a first layer. In some embodiments, the first layer comprises a first thermoplastic polymer. In some embodiments, the first layer has a first color. In some embodiments, the method comprises obtaining a second layer. In some embodiments, the second layer comprises a second thermoplastic polymer. In some embodiments, the second layer has a second color. In some embodiments, the second color of the second layer is different from the first color of the first layer. In some embodiments, the second layer comprises a plurality of openings. In some embodiments, each of the plurality of openings extends from a first surface of the second layer to a second surface of the second layer. In some embodiments, the second surface of the second layer is opposite the first surface of the second layer. In some embodiments, the method comprises attaching the second layer to the first layer. In some embodiments, the second layer covers the first layer, such that at least a portion of the first layer is exposed through the plurality of openings. In some embodiments, the second layer covers the first layer, such that at least a portion of an upper surface of the first layer is exposed through the plurality of openings. In some embodiments, the method comprises forming a roofing material.

In some embodiments, the first layer does not comprise any openings.

In some embodiments, the first layer has a thickness of 10 mil to 50 mil.

In some embodiments, the second layer has a thickness of 10 mil to 50 mil.

In some embodiments, the second layer directly contacts the first layer.

In some embodiments, 10% to 90% of the first layer is exposed through the plurality of openings of the second layer.

In some embodiments, the step of attaching comprises laminating the second layer to the first layer.

In some embodiments, the step of attaching comprises bonding the second layer to the first layer.

In some embodiments, the step of attaching comprises extruding the second layer onto the first layer.

In some embodiments, the method further comprises obtaining a first composition. In some embodiments, the first composition comprises a first thermoplastic polymer material. In some embodiments, the method further comprises forming the first composition into the first layer.

In some embodiments, the step of forming the first composition into the first layer comprises extruding the first composition through a first extrusion die, so as to form the first layer.

In some embodiments, the method further comprises obtaining a second composition. In some embodiments, the second composition comprises a second thermoplastic polymer material. In some embodiments, the method further comprises forming the second composition into the second layer.

In some embodiments, the step of forming the second composition into the second layer comprises extruding the second composition through a second extrusion die, so as to form the second layer.

In some embodiments, the step of forming the second composition into the second layer comprises forming a plurality of openings in the second layer. In some embodiments, each of the plurality of openings of the second layer extends from a first surface of the second layer to a second surface of the second layer. In some embodiments, the second surface of the second layer is opposite the first surface of the second layer.

In some embodiments, the method further comprises obtaining a third layer. In some embodiments, the third layer comprises a third thermoplastic polymer. In some embodiments, the third layer has a third color. In some embodiments, the third color of the third layer is different from the first color of the first layer. In some embodiments, the third color of the third layer is different from the second color of the second layer. In some embodiments, the third layer comprises a plurality of thermoplastic polymer pieces. In some embodiments, the method further comprises attaching the third layer to the second layer. In some embodiments, the third layer covers the first layer such that at least a portion of the first layer is exposed. In some embodiments, the third layer covers the second layer such that at least a portion of the second layer is exposed. In some embodiments, the third layer covers the first layer such that at least a portion of an upper surface of the first layer is exposed. In some embodiments, the third layer covers the second layer such that at least a portion of an upper surface of the second layer is exposed.

In some embodiments, the third layer has a thickness of 10 mil to 50 mil.

In some embodiments, the third layer directly contacts the second layer.

In some embodiments, 10% to 90% of the first layer is exposed through the plurality of thermoplastic polymer pieces of the third layer.

In some embodiments, 10% to 90% of the second layer is exposed through the plurality of thermoplastic polymer pieces of the third layer.

In some embodiments, the step of attaching comprises laminating the third layer to the second layer.

In some embodiments, the step of attaching comprises bonding the third layer to the second layer.

In some embodiments, the step of attaching comprises extruding the third layer onto the second layer.

In some embodiments, the method further comprises obtaining a third layer. In some embodiments, the third layer comprises a third thermoplastic polymer. In some embodiments, the third layer has a third color. In some embodiments, the third color of the third layer is different from the first color of the first layer. In some embodiments, the third color of the third layer is different from the second color of the second layer. In some embodiments, the third layer comprises a plurality of openings. In some embodiments, each of the plurality of openings extends from a first surface of the third layer to a second surface of the third layer. In some embodiments, the second surface of the third layer is opposite the first surface of the third layer. In some embodiments, the method further comprises attaching the third layer to the second layer. In some embodiments, at least a portion of the first layer is exposed through the plurality of openings of the third layer. In some embodiments, at least a portion of the second layer is exposed through the plurality of openings of the third layer. In some embodiments, at least a portion of an upper surface of the first layer is exposed through the plurality of openings of the third layer. In some embodiments, at least a portion of an upper surface of the second layer is exposed through the plurality of openings of the third layer.

In some embodiments, the third layer has a thickness of 10 mil to 50 mil.

In some embodiments, the third layer directly contacts the second layer.

In some embodiments, 10% to 90% of the first layer is exposed through the plurality of openings of the third layer.

In some embodiments, 10% to 90% of the second layer is exposed through the plurality of openings of the third layer.

In some embodiments, the step of attaching comprises laminating the third layer to the second layer.

In some embodiments, the step of attaching comprises bonding the third layer to the second layer.

In some embodiments, the step of attaching comprises extruding the third layer onto the second layer.

In some embodiments, the method further comprises obtaining a third composition. In some embodiments, the third composition comprises a third thermoplastic polymer material. In some embodiments, the method further comprises forming the third composition into the third layer.

In some embodiments, the step of forming the third composition into the third layer comprises extruding the third composition through a third extrusion die, so as to form the third layer.

In some embodiments, the step of forming the third composition into the third layer comprises forming a plurality of thermoplastic polymer pieces of the third layer.

In some embodiments, the step of forming the third composition into the third layer comprises forming a plurality of openings in the third layer, wherein each of the plurality of openings of the third layer extends from a first surface of the third layer to a second surface of the third layer, wherein the second surface of the third layer is opposite the first surface of the third layer.

Some embodiments relate to a method of manufacturing. In some embodiments, the method comprises obtaining at least one layer. In some embodiments, the at least one layer comprises: 10% to 90% by weight of at least one thermoplastic polymer based on a total weight of the at least one layer; 10% to 90% by weight of at least one additive based on the total weight of the at least one layer. In some embodiments, the at least one layer has a first color. In some embodiments, the method comprises applying a laser to the at least one layer such that: a) at least a portion of the at least one layer undergoes a color change from the first color to a second color; b) at least a portion of the at least one layer is removed from the at least one layer sufficient to expose at least a portion of another layer; or c) any combination thereof. In some embodiments, the method comprises forming a roofing material. In some embodiments, the roofing material having an aesthetic appearance of a photovoltaic shingle, a roofing shingle, or any combination thereof.

In some embodiments, the laser is applied at a power in a range of 1 W to 100 W.

In some embodiments, the laser is applied at a wavelength in a range of 780 nm to 1064 nm.

In some embodiments, the method further comprises adjusting at least one of a power parameter, a wavelength parameter, a speed parameter, or any combination thereof. In some embodiments, the method further comprises applying the laser to the at least one layer such that at least a portion of the at least one layer undergoes a color change from the first color to a third color.

Some embodiments relate to a roofing shingle. In some embodiments, the roofing shingle comprises a first layer. In some embodiments, the first layer comprises a first thermoplastic polymer. In some embodiments, the first layer has a first color. In some embodiments, the roofing shingle comprises a second layer on the first layer. In some embodiments, the second layer comprises a second thermoplastic polymer. In some embodiments, the second layer has a second color. In some embodiments, the second layer comprises a plurality of openings. In some embodiments, each of the plurality of openings extends through the second layer, from a first surface of the second layer to a second surface of the second layer. In some embodiments, the second surface of the second layer is opposite the first surface of the second layer. In some embodiments, at least a portion of the first layer is exposed through the plurality of openings of the second layer. In some embodiments, the roofing shingle has an aesthetic appearance of the roofing shingle is substantially similar to an aesthetic appearance of an asphalt roofing shingle.

In some embodiments, the asphalt roofing shingle is a laminated roofing shingle.

In some embodiments, the asphalt roofing shingle is a tabbed strip shingle.

Some embodiments relate to a roofing shingle. In some embodiments, the roofing shingle comprises a first layer. In some embodiments, the first layer comprises a first thermoplastic polymer. In some embodiments, the first layer has a first color. In some embodiments, the roofing shingle comprises a second layer on the first layer. In some embodiments, the second layer comprises a second thermoplastic polymer. In some embodiments, the second layer has a second color. In some embodiments, the second layer comprises a plurality of thermoplastic polymer pieces. In some embodiments, the plurality of thermoplastic polymer pieces of the second layer covers the first layer such that at least a portion of the first layer is exposed. In some embodiments, the roofing shingle has an aesthetic appearance of the roofing shingle is substantially similar to an aesthetic appearance of an asphalt roofing shingle.

In some embodiments, the roofing shingles are configured to be installed on a roof deck with one or more fasteners. In some embodiments, the fasteners comprise one or more of nails, screws, staples, rivets, and/or combinations thereof. In some embodiments, the roofing shingles are cuttable. In some embodiments, the roofing shingles includes a structure, composition and/or function of similar to those of more or one of the embodiments of the roofing modules disclosed in in U.S. application Ser. No. 17/831,307, filed Jun. 2, 2022, titled "Roofing Module System," and published under U.S. Patent Application Publication No. 2022-0393637 on Dec. 8, 2022; and/or U.S. application Ser. No. 18/169,718, filed Feb. 15, 2023, titled "Roofing Module System," and published under U.S. Patent Application Publication No. 2023-0203815 on Jun. 29, 2023; and/or U.S. application Ser. No. 18/352,894, filed Jul. 14, 2023, titled "Solar Roofing System with Fiber Composite Roofing Shingles," the disclosures of each of which are incorporated by reference herein in their entireties.

What is claimed is:

1. A roofing system comprising:
   a roofing substrate;
   a first roofing shingle on the roofing substrate, wherein the first roofing shingle comprises:
      a first layer,
         wherein the first layer comprises a first thermoplastic polymer through an entire thickness of the first layer; and
      a second layer on the first layer,
         wherein the second layer comprises a second thermoplastic polymer through an entire thickness of the second layer,
         wherein a plurality of openings is formed in the second layer,
            wherein each of the plurality of openings extends through the second layer, from a first surface of the second layer to a second surface of the second layer,
            wherein the second surface of the second layer is opposite the first surface of the second layer,
            wherein the second surface of the second layer is an upper surface of the second layer,
         wherein each of the plurality of openings does not extend to any outer edge of the second layer;
         wherein at least a portion of an upper surface of the first layer is exposed through the plurality of openings of the second layer; and
   a second roofing shingle on the roofing substrate,
      wherein the second roofing shingle is a photovoltaic shingle.

2. The roofing system of claim 1, wherein the second layer directly contacts the first layer.

3. The roofing system of claim 1, wherein the second layer is attached to the first layer by thermal bonding.

4. The roofing system of claim 1, wherein the second layer is attached to the first layer by an adhesive layer; wherein the adhesive layer is not exposed through the plurality of openings of the second layer.

5. The roofing system of claim 1, wherein 10% to 90% of the upper surface of the first layer is exposed through the plurality of openings of the second layer.

6. The roofing system of claim 1, further comprising:
   a third layer on the second layer,
      wherein the third layer comprises a third thermoplastic polymer,
      wherein the third layer comprises a plurality of thermoplastic polymer pieces,
         wherein the plurality of thermoplastic polymer pieces of the third layer covers the first layer and the second layer such that at least a portion of the upper surface of the first layer and at least a portion of the upper surface of the second layer are exposed.

7. The roofing system of claim 6, wherein the third layer directly contacts the second layer.

8. The roofing system of claim 6, wherein the third layer is attached to the second layer by thermal bonding.

9. The roofing system of claim 6, wherein the third layer is attached to the second layer by an adhesive layer.

10. The roofing system of claim 6, wherein 10% to 90% of the upper surface of the first layer is exposed through the third layer.

11. The roofing system of claim 10, wherein 10% to 90% of the upper surface of the second layer is exposed through the third layer.

12. The roofing system of claim 1, wherein the first layer has a first color; wherein the second layer has a second color; wherein the first color and the second color are different; wherein an aesthetic appearance of the first roofing shingle is substantially similar to an aesthetic appearance of an asphalt roofing shingle.

13. The roofing system of claim 1, wherein at least one of the plurality of openings has a dimension in a range of 0.5 mm to 50 mm.

14. A roofing shingle comprising:
a first layer,
wherein the first layer comprises a first thermoplastic polymer through an entire thickness of the first layer; and
a second layer on the first layer,
wherein the second layer comprises a second thermoplastic polymer through an entire thickness of the second layer,
wherein a plurality of openings is formed in the second layer,
wherein each of the plurality of openings extends through the second layer, from a first surface of the second layer to a second surface of the second layer,
wherein the second surface of the second layer is opposite the first surface of the second layer,
wherein the second surface of the second layer is an upper surface of the second layer,
wherein each of the plurality of openings does not extend to any outer edge of the second layer;
wherein at least a portion of an upper surface of the first layer is exposed through the plurality of openings of the second layer.

15. The roofing shingle of claim 14, wherein the second layer directly contacts the first layer.

16. The roofing shingle of claim 14, wherein the second layer is attached to the first layer by thermal bonding.

17. The roofing shingle of claim 14, wherein the second layer is attached to the first layer by an adhesive layer; wherein the adhesive layer is not exposed through the plurality of openings of the second layer.

18. The roofing shingle of claim 14, wherein 10% to 90% of the upper surface of the first layer is exposed through the plurality of openings of the second layer.

19. The roofing shingle of claim 14, wherein the first layer has a first color; wherein the second layer has a second color; wherein the first color and the second color are different; wherein an aesthetic appearance of the roofing shingle is substantially similar to an aesthetic appearance of an asphalt roofing shingle.

20. The roofing shingle of claim 14, wherein at least one of the plurality of openings has a dimension in a range of 0.5 mm to 50 mm.

* * * * *